US008602936B2

(12) United States Patent
Ichikawa et al.

(10) Patent No.: US 8,602,936 B2
(45) Date of Patent: Dec. 10, 2013

(54) AUTOMOBILE DRIVING SYSTEM AND CONTROL METHOD THEREOF

(75) Inventors: Kazuki Ichikawa, Wako (JP); Fumiyasu Suga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 13/225,399

(22) Filed: Sep. 2, 2011

(65) Prior Publication Data

US 2012/0058858 A1 Mar. 8, 2012

(30) Foreign Application Priority Data

Sep. 3, 2010 (JP) ................................. 2010-198021

(51) Int. Cl.
*F16H 3/70* (2006.01)
(52) U.S. Cl.
USPC ................ 475/170; 475/8; 475/162; 475/168
(58) Field of Classification Search
USPC ....................... 475/8, 162, 168, 170
See application file for complete search history.

(56) References Cited

U.S. PATENT DOCUMENTS

| 3,082,632 | A * | 3/1963 | Vulliez | 475/170 |
| 7,108,626 | B2 * | 9/2006 | Friedmann | 475/8 |
| 8,210,290 | B2 * | 7/2012 | Simon et al. | 180/65.225 |
| 8,449,426 | B2 * | 5/2013 | Nishimura | 475/170 |
| 2005/0039572 | A1 * | 2/2005 | Friedmann | 74/661 |
| 2012/0252630 | A1 * | 10/2012 | Sasaki | 477/80 |
| 2013/0048395 | A1 * | 2/2013 | Kobayashi et al. | 180/65.265 |
| 2013/0090207 | A1 * | 4/2013 | Ichikawa et al. | 477/6 |
| 2013/0090208 | A1 * | 4/2013 | Ichikawa et al. | 477/6 |
| 2013/0102437 | A1 * | 4/2013 | Ichikawa et al. | 477/5 |
| 2013/0116087 | A1 * | 5/2013 | Ichikawa et al. | 477/79 |

FOREIGN PATENT DOCUMENTS

| JP | 2005-502543 | | 1/2005 |
| JP | 2009197980 A | * | 9/2009 |
| JP | 2009197981 A | * | 9/2009 |
| JP | 2010025310 A | * | 2/2010 |
| JP | 2010025324 A | * | 2/2010 |
| JP | 2010038184 A | * | 2/2010 |

* cited by examiner

*Primary Examiner* — Derek D Knight
(74) *Attorney, Agent, or Firm* — Ditthavong Mori & Steiner, P.C.

(57) ABSTRACT

An automobile driving system includes an engine and a transmission. The transmission includes a variable gear ratio mechanism and a gear ratio of the transmission can be set to infinity. A one-way clutch is provided at an output portion of the transmission. At a time of a engine stopping controller controlling to stop the engine, a transmission-and-control device uses inertia from the engine up to an input member of the one-way clutch as assisting force for driving operations of the variable gear ratio mechanism to change the gear ratio at the transmission to infinity or close to infinity, before the engine actually stops.

7 Claims, 40 Drawing Sheets

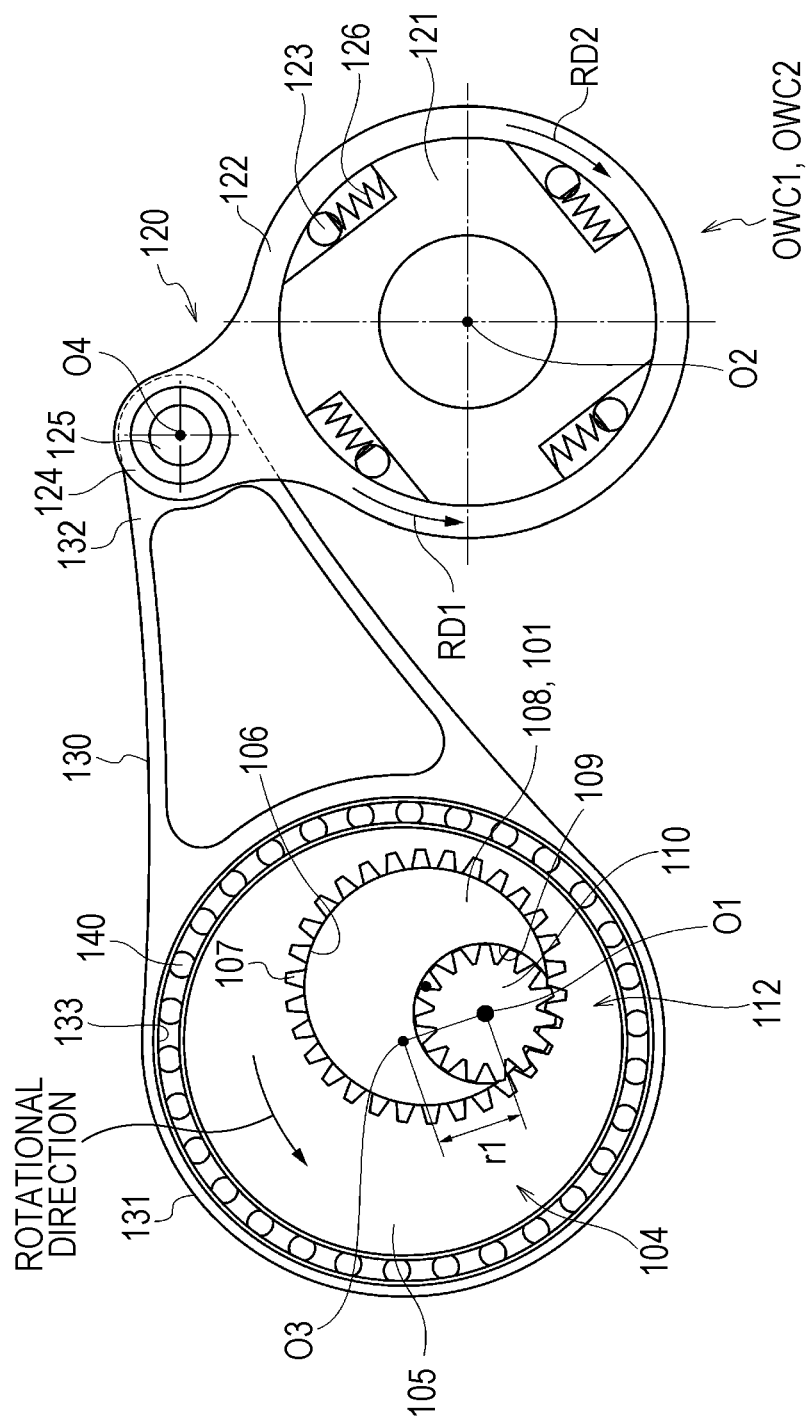

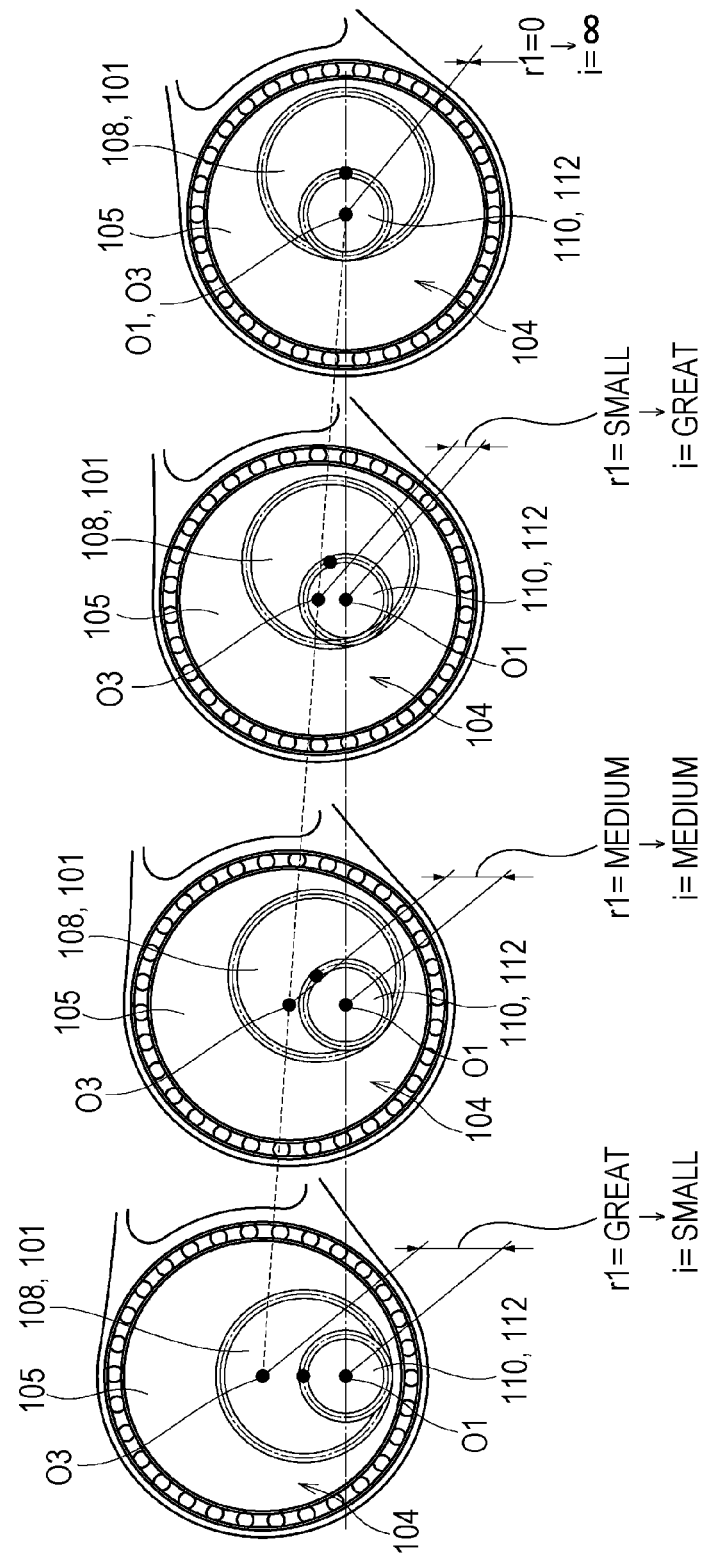

AUTOMOBILE DRIVING SYSTEM AND CONTROL METHOD THEREOF

CROSS-REFERENCE TO RELATED APPLICATIONS

The present application claims priority under 35 U.S.C. §119 to Japanese Patent Application No. 2010-198021, filed Sep. 3, 2010. The contents of this application are incorporated herein by reference in their entirety.

BACKGROUND OF THE INVENTION

1. Field of the Invention

The present invention relates to an automobile driving system and a control method thereof.

2. Discussion of the Background

As described in Japanese Unexamined Patent Application Publication (Translation of PCT Application) No. 2005-502543, there is known, as an automobile drive system of this type, a hybrid type drive system configured such that an engine and transmission and motor generator are combined, with a drive shaft of the transmission and a driven shaft are connected by an eccentric member driving device provided to the drive shaft and a one-way clutch provided to the driven shaft, so that output of the engine is supplied to the drive shaft of the transmission. Also, the motor generator is selectively connectable to the input side of the transmission or the output side of the one-way clutch via a clutch, or simultaneously connectable to the input side of the transmission and the output side of the one-way clutch.

With this drive system, engine driving using just the driving force of the engine, EV (electric vehicle) driving using just the driving force of the motor generator, and parallel driving using both the driving force of the engine and the driving force of the motor generator, can be performed. Also, using regenerative operations of the motor generator allows regenerative energy to be obtained when decelerating, and regenerative braking can be applied to the driving wheels as well. Further, the engine can be started with the motor generator.

SUMMARY OF THE INVENTION

According to one aspect of the present invention, an automobile driving system includes an engine to generate rotational force, a transmission to shift and output the rotational force generated by said engine, a one-way clutch provided at an output portion of said transmission, driving wheels, a rotationally driven member, an engine stopping controller, and a transmission-and-control device. The one-way clutch includes an input member, an output member, and an engaging member. The engaging member places said input member and said output member into a locked state or an unlocked state. In the event that positive rotational speed of said input member exceeds positive rotational speed of said output member upon receiving rotational force from said transmission, said input member and said output member are placed in a locked state to transmit the rotational force input to said input member to said output member. The rotationally driven member rotates integrally with said driving wheels and is connected to said output member of said one-way clutch to transmit the rotational force transmitted to said output member to said driving wheels. The engine stopping controller is configured to control to stop said engine in the event that an engine stopping request is generated.

The transmission includes a four-bar linkage mechanism infinity variable transmission. The four-bar linkage mechanism infinity variable transmission includes an input shaft, a plurality of first supporting points, a plurality of eccentric discs, the one-way clutch, a second supporting point, a plurality of linking members and a variable gear ratio mechanism.

The input shaft rotates on an input center axial line by receiving rotational force. The plurality of first supporting points are provided at equal intervals in a circumferential direction of said input shaft so as to rotate around said input center axial line along with said input shaft while each is maintaining a variable eccentricity as to said input center axial line. Each of the plurality of eccentric discs has said first supporting points as a center thereof to rotate around said input center axial line.

The one-way clutch includes the output member, the input member and the engaging member. The output member rotates around an output center axial line which is distanced from said input center axial line. The input member oscillates around said output center axial line by receiving external rotational force. The engaging member places said input member and said output member into a locked state or an unlocked state. In the event that positive rotational speed of said input member exceeds the positive rotational speed of said output member, the rotational force input to said input member is transmitted to said output member to convert oscillating motion of said input member into rotational motion of said output member.

The second supporting point is provided on said input member at a position distanced from said output center axial line. The plurality of linking members are rotatably linked at one end thereof to said first supporting points on the perimeter of said eccentric discs and another end is rotatably linked to said second supporting point provided on said input member of said one-way clutch, such that rotational motion provided from said input shaft to said eccentric discs is transmitted to said input member of said one-way clutch as oscillating motion of said input member. The variable gear ratio mechanism changes an angle of oscillation of oscillating motion transmitted from said eccentric discs to the input member of said one-way clutch by adjusting the eccentricity of said first supporting points as to said input center axial line, thereby changes a gear ratio at a time of rotational force input to said input shaft being transmitted to said output member of said one-way clutch via said eccentric discs and said linking members as rotational force.

The gear ratio of said transmission can be set to infinity by setting said eccentricity to zero. An output shaft of said engine is linked to the input shaft of said infinity variable transmission. Said one-way clutch which is a component of said infinity variable transmission also serves as said one-way clutch provided between said transmission and said rotationally driven member. At a time of said engine stopping controller controlling to stop said engine, said transmission-and-control device uses inertia from said engine up to the input member of said one-way clutch as assisting force for driving operations of said variable gear ratio mechanism to change the gear ratio at said transmission to infinity or close to infinity, before said engine actually stops.

According to another aspect of the present invention, an automobile driving system includes an engine to generate rotational force, a transmission to shift and output the rotational force generated by said engine, a one-way clutch provided at an output portion of said transmission, driving wheels, a rotationally driven member, a motor generator connected to an output shaft of said engine, a motor generator controller, an engine stopping controller, and a transmission-and-control device. The one-way clutch includes an input member, an output member, and an engaging member. The engaging member places said input member and said output member into a locked state or an unlocked state. In the event that positive rotational speed of said input member exceeds positive rotational speed of said output member upon receiving rotational force from said transmission, said input member and said output member are placed in a locked state to transmit the rotational force input to said input member to said output member. The rotationally driven member rotates integrally with said driving wheels and is connected to said output member of said one-way clutch to transmit the rotational force transmitted to said output member to said driving wheels. The engine stopping controller is configured to control to stop said engine in the event that an engine stopping request is generated.

The transmission includes a four-bar linkage mechanism infinity variable transmission. The four-bar linkage mechanism infinity variable transmission includes an input shaft, a plurality of first supporting points, a plurality of eccentric discs, the one-way clutch, a second supporting point, a plurality of linking members and a variable gear ratio mechanism.

The input shaft rotates on an input center axial line by receiving rotational force. The plurality of first supporting points are provided at equal intervals in a circumferential direction of said input shaft so as to rotate around said input center axial line along with said input shaft while each is maintaining a variable eccentricity as to said input center axial line. Each of the plurality of eccentric discs has said first supporting points as a center thereof to rotate around said input center axial line.

The one-way clutch includes the output member, the input member and the engaging member. The output member rotates around an output center axial line which is distanced from said input center axial line. The input member oscillates around said output center axial line by receiving external rotational force. The engaging member places said input member and said output member into a locked state or an unlocked state. In the event that positive rotational speed of said input member exceeds the positive rotational speed of said output member, the rotational force input to said input member is transmitted to said output member to convert oscillating motion of said input member into rotational motion of said output member.

The second supporting point is provided on said input member at a position distanced from said output center axial line. The plurality of linking members are rotatably linked at one end thereof to said first supporting points on the perimeter of said eccentric discs and another end is rotatably linked to said second supporting point provided on said input member of said one-way clutch, such that rotational motion provided from said input shaft to said eccentric discs is transmitted to said input member of said one-way clutch as oscillating motion of said input member. The variable gear ratio mechanism changes an angle of oscillation of oscillating motion transmitted from said eccentric discs to the input member of said one-way clutch by adjusting the eccentricity of said first supporting points as to said input center axial line, thereby changes a gear ratio at a time of rotational force input to said input shaft being transmitted to said output member of said one-way clutch via said eccentric discs and said linking members as rotational force.

The gear ratio of said transmission can be set to infinity by setting said eccentricity to zero. The output shaft of said engine is linked to the input shaft of said infinity variable transmission. Said one-way clutch which is a component of said infinity variable transmission also serves as said one-way clutch provided between said transmission and said rotationally driven member. At a time of said engine stopping controller controlling to stop said engine, said transmission-and-control device uses inertia from said engine up to the input member of said one-way clutch as assisting force for driving operations of said variable gear ratio mechanism to change the gear ratio at said transmission to infinity or close to infinity, and said motor generator controller regenerates electric energy from inertia from said engine up to the input member of said one-way clutch using said motor generator, before said engine actually stops.

According to further aspect of the present invention, A control method of an automobile driving system includes using inertia and regenerating electric energy. The automobile driving system includes an engine to generate rotational force, a transmission to shift and output the rotational force generated by said engine, a one-way clutch provided at an output portion of said transmission, driving wheels, a rotationally driven member, a motor generator connected to an output shaft of said engine, a motor generator controller, an engine stopping controller, and a transmission-and-control device. The one-way clutch includes an input member, an output member, and an engaging member. The engaging member places said input member and said output member into a locked state or an unlocked state. In the event that positive rotational speed of said input member exceeds positive rotational speed of said output member upon receiving rotational force from said transmission, said input member and said output member are placed in a locked state to transmit the rotational force input to said input member to said output member. The rotationally driven member rotates integrally with said driving wheels and is connected to said output member of said one-way clutch to transmit the rotational force transmitted to said output member to said driving wheels. The engine stopping controller is configured to control to stop said engine in the event that an engine stopping request is generated.

The transmission includes a four-bar linkage mechanism infinity variable transmission. The four-bar linkage mechanism infinity variable transmission includes an input shaft, a plurality of first supporting points, a plurality of eccentric discs, the one-way clutch, a second supporting point, a plurality of linking members and a variable gear ratio mechanism.

The input shaft rotates on an input center axial line by receiving rotational force. The plurality of first supporting points are provided at equal intervals in a circumferential direction of said input shaft so as to rotate around said input center axial line along with said input shaft while each is maintaining a variable eccentricity as to said input center axial line. Each of the plurality of eccentric discs has said first supporting points as a center thereof to rotate around said input center axial line.

The one-way clutch includes the output member, the input member and the engaging member. The output member rotates around an output center axial line which is distanced from said input center axial line. The input member oscillates around said output center axial line by receiving external rotational force. The engaging member places said input member and said output member into a locked state or an unlocked state. In the event that positive rotational speed of said input member exceeds the positive rotational speed of said output member, the rotational force input to said input member is transmitted to said output member to convert oscillating motion of said input member into rotational motion of said output member.

The second supporting point is provided on said input member at a position distanced from said output center axial line. The plurality of linking members are rotatably linked at one end thereof to said first supporting points on the perimeter of said eccentric discs and another end is rotatably linked to said second supporting point provided on said input member of said one-way clutch, such that rotational motion provided from said input shaft to said eccentric discs is transmitted to said input member of said one-way clutch as oscillating motion of said input member. The variable gear ratio mechanism changes an angle of oscillation of oscillating motion transmitted from said eccentric discs to the input member of said one-way clutch by adjusting the eccentricity of said first supporting points as to said input center axial line, thereby changes a gear ratio at a time of rotational force input to said input shaft being transmitted to said output member of said one-way clutch via said eccentric discs and said linking members as rotational force.

The gear ratio of said transmission can be set to infinity by setting said eccentricity to zero. The output shaft of said engine is linked to the input shaft of said infinity variable transmission. Said one-way clutch which is a component of said infinity variable transmission also serves as said one-way clutch provided between said transmission and said rotationally driven member.

With said transmission-and-control device, inertia from said engine up to the input member of said one-way clutch is used as assisting force for driving operations of said variable gear ratio mechanism to change the gear ratio at said transmission to infinity or close to infinity, at a time of said engine stopping controller controlling to stop said engine, before said engine actually stops. With said motor generator controller, electric energy is regenerated from inertia from said engine up to the input member of said one-way clutch using said motor generator, at the time of said engine stopping controller controlling to stop said engine, before said engine actually stops.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a side cross-sectional view of a part of the configuration of the transmission as viewed from the axial direction.

FIGS. 4A through 4D are explanatory diagrams of the first half of a transmission principle of an infinity variable transmission according to the transmission, wherein FIG. 4A is a diagram illustrating a state in which eccentricity as to an input center axis which is the center of rotation of a first point of support which is the center point of an eccentric disc is set to "great" and transmission gear ratio is set to "small", FIG. 4B is a diagram illustrating a state in which eccentricity is set to "medium" and transmission gear ratio is set to "medium", FIG. 4C is a diagram illustrating a state in which eccentricity is set to "small" and transmission gear ratio is set to "great", and FIG. 4D is a diagram illustrating a state in which eccentricity is set to "zero" and transmission gear ratio is set to "infinity".

FIGS. 5A through 5C are explanatory diagrams of the second half of a transmission principle of a infinity variable transmission according to the transmission, illustrating change to oscillation angle of an input member of the one-way clutch in the event that the eccentricity of the eccentric disc is changed and the transmission gear ratio is changed, wherein FIG. 5A is a diagram illustrating a state in which eccentricity is set to "great" and transmission gear ratio is set to "small", whereby the oscillation angle of the input member is "great", FIG. 5B is a diagram illustrating a state in which eccentricity is set to "medium" and transmission gear ratio is set to "medium", whereby the oscillation angle of the input member is "medium", and FIG. 5C is a diagram illustrating a state in which eccentricity is set to "small" and transmission gear ratio is set to "great", whereby the oscillation angle of the input member is "small".

DESCRIPTION OF THE EMBODIMENTS

Figure 1:
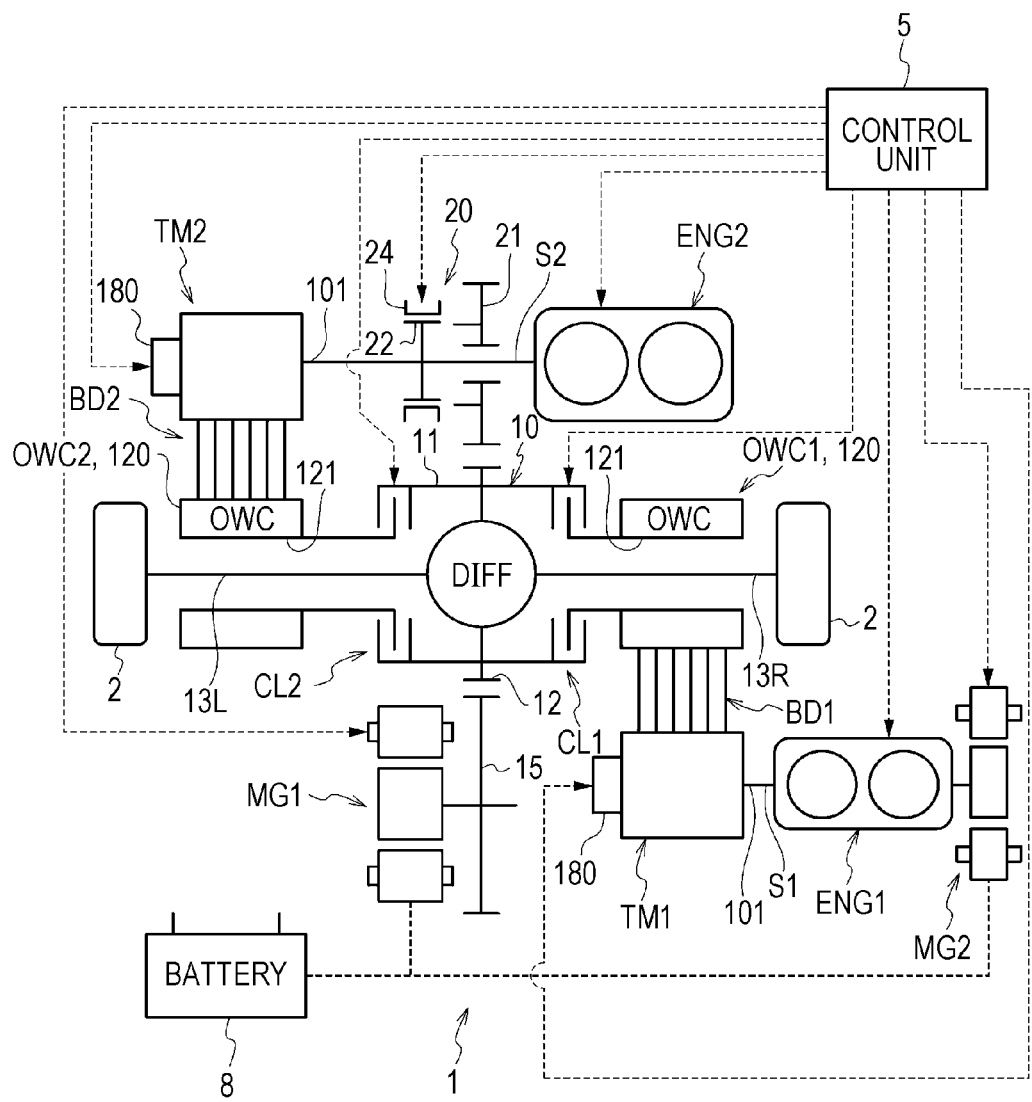
FIG. 1 is a skeleton drawing of an automobile drive system according to a first embodiment of the present invention.

The embodiments will now be described with reference to the accompanying drawings, wherein like reference numerals designate corresponding or identical elements throughout the various drawings.

First Embodiment

Figure 2:
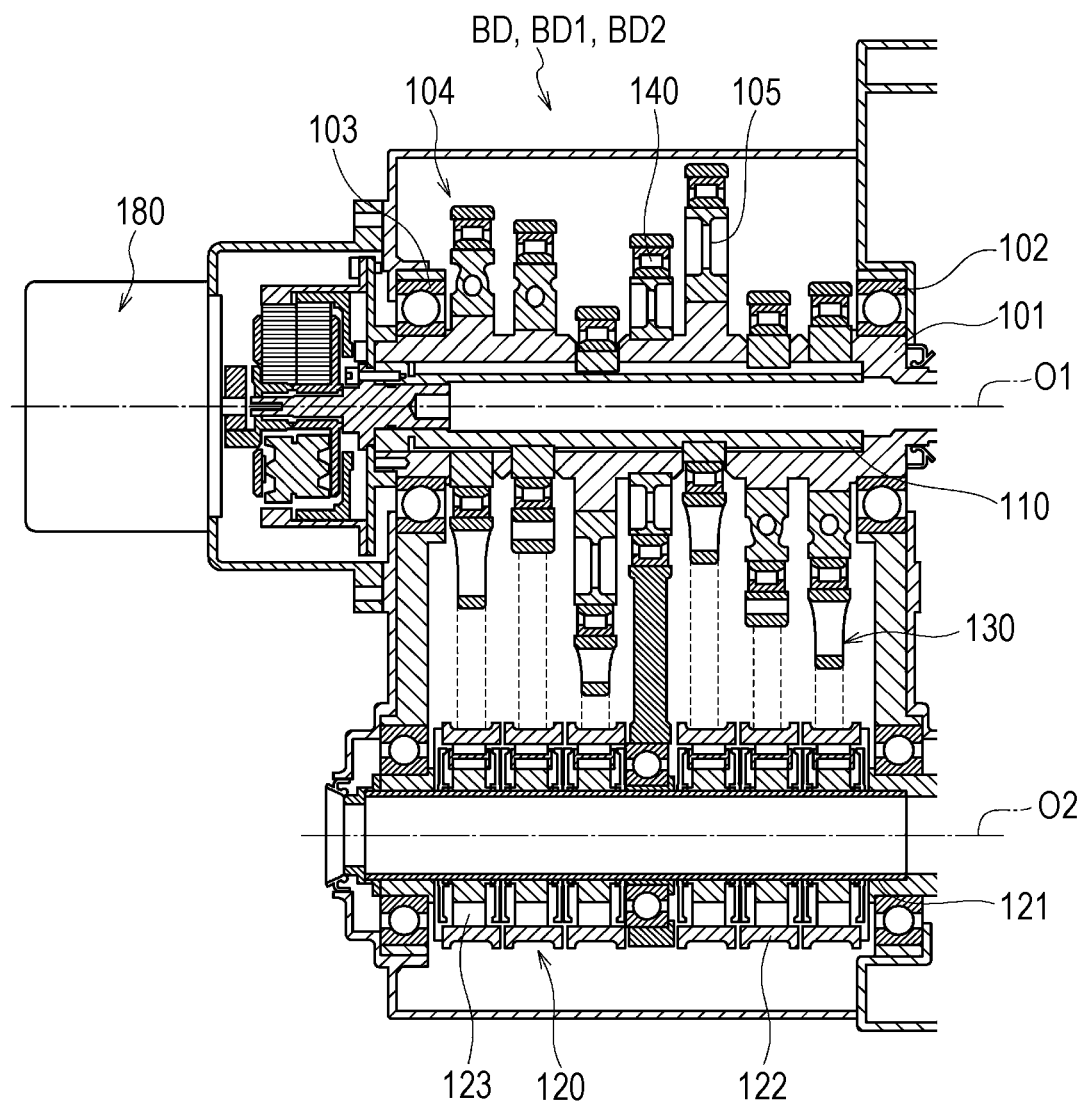
FIG. 2 is a cross-sectional diagram illustrating a specific configuration of an infinity variable transmission which is a primary component of the system.

A first embodiment of the present invention will be described with reference to the drawings. FIG. 1 is a skeleton drawing of an automobile drive system according to a first embodiment of the present invention, FIG. 2 is a cross-sectional diagram illustrating a specific configuration of an infinity variable transmission which is a primary component of the driving system, and FIG. 3 is a side cross-sectional view of a part of the configuration of the infinity variable transmission as viewed from the axial direction.

Overall Configuration

The automobile drive system 1 has two engines, which are first and second engines ENG1 and ENG2 which independently generate rotational force, first and second transmissions TM1 and TM2 provided downstream of the first and second engines ENG1 and ENG2, first and second one-way clutches OWC1 and OWC2 provided at the output portion of the transmissions TM1 and TM2, a rotationally driven member 11 which receives output rotations transmitted via the one-way clutches OWC1 and OWC2, a main motor generator MG1 connected to this rotationally driven member 11, a sub motor generator MG2 connected to an output shaft S1 of the first engine ENG1, a battery 8 which can exchange electric power with the main motor generator MG1 and/or sub motor generator MG2, and a control unit 5 which controls driving patterns and the like by controlling these components.

Each of the one-way clutches OWC1 and OWC2 includes an input member (clutch outer) 122, an output member (clutch inner) 121, multiple rollers (engaging members) 123 disposed between the input member 122 and output member 121 so as to place the members 122 and 121 in a mutually locked state or unlocked state, and a pressing member 126 for pressing the rollers 123 in a direction realizing locking. In the event that the positive direction (direction of arrow RD1) rotational speed of the input member 122 which receives rotational forces from the first transmission TM1 and second transmission TM2 exceeds the rotational speed of the output member 121 in the positive direction, the input member 122 and output member 121 are in a mutually locked state, and the rotational force input to the input member 122 is transmitted to the output member 121.

The first and second one-way clutches OWC1 and OWC2 are disposed across a differential device 10, one on the right side and the other on the left, and the output members 121 of the first and second one-way clutches OWC1 and OWC2 are each linked together with a rotationally driven member 11 via separate first and second clutch mechanisms CL1 and CL2, respectively. The first and second clutch mechanisms CL1 and CL2 are provided for controlling transmitting and cutting off of force between the output members 121 of the first and second one-way clutches OWC1 and OWC2 and the rotationally driven member 11. Other types of clutches such as friction clutches or the like may be used for the first and second clutch mechanisms CL1 and CL2, but dog clutches are used here due to the small loss in transmission.

The rotationally driven member 11 is configured of a differential case of the differential device 10, with rotational force transmitted to the output members 121 of the first and second one-way clutches OWC1 and OWC2 transmitted to left and right drive wheels 2 via the differential device 10 and left and right axle shafts 13L and 13R. The differential case (rotationally driven member 11) of the differential device 10 has a differential pinion and side gears, which are not shown in the drawings, attached thereto, with the left and right axle shafts 13L and 13R linked to the left and right side gears, such that the left and right axle shafts 13L and 13R rotate differentially.

The first and second engines ENG1 and ENG2 are engines which have different high-efficiency running points, with the first engine ENG1 being an engine with a smaller engine displacement and the second engine ENG2 being an engine with greater displacement than the first engine ENG1. For example, the displacement of the first engine ENG1 is 500 cc, the displacement of the second engine ENG2 is 1000 cc, so the total displacement is 1500 cc. The combination of engine displacement is optional, of course.

The main motor generator MG1 and the rotationally driven member 11 are connected so as to be capable of transmitting force, by a drive gear 15 attached to the output shaft of the main motor generator MG1 and the drive gear 12 provided to the rotationally driven member 11 meshing. For example, in the event that the main motor generator MG1 functions as a motor, driving force is transmitted from the main motor generator MG1 to the rotationally driven member 11. Also, when the main motor generator MG1 functions as a generator, force is input to the main motor generator MG1 from the rotationally driven member 11, and mechanical energy is converted into electric energy. At the same time, regenerative braking force acts on the rotationally driven member 11 from the main motor generator MG1.

Also, the sub motor generator MG2 is directly connected to an output shaft S1 of the first engine ENG1, so as to mutually transmit force with the output shaft S1. In this case as well, in the event of the sub motor generator MG2 functioning as a motor, driving force is transmitted from the sub motor generator MG2 to the output shaft S1 of the first engine ENG1. Also, in the event that the sub motor generator MG2 functions as a generator, force is transmitted from the output shaft S1 of the first engine ENG1 to the sub motor generator MG2.

With the automobile drive system 1 having the above components, the rotational force which the first engine ENG1 and second engine ENG2 generate are input to the first one-way clutch OWC1 and second one-way clutch OWC2 via the first transmission TM1 and the second transmission TM2, and the rotational force is input to the rotationally driven member 11 via the first one-way clutch OWC1 and second one-way clutch OWC2.

Also, with this automobile drive system 1, a synch mechanism 20 (a clutching unit also called a "star clutch") is provided between an output shaft S2 of the second engine ENG2 and the rotationally driven member 11, so as to be capable of breaking off transmission of force between the rotationally driven member 11 and the output shaft S2 which is different from force transmission via the second transmission TM2. The synch mechanism 20 has a first gear 21 which constantly meshes with a drive gear 12 provided to the rotationally driven member 11 and is rotatably provided on the periphery of the output shaft S2 of the second engine ENG2, a second gear 22 provided on the periphery of the output shaft S2 of the second engine ENG2 so as to integrally rotate with the output shaft S2, and a sleeve 24 which is operated by sliding in the axial direction so as to engage or disengage the first gear 21 and the second gear 22. That is to say, the synch mechanism 20 forms a force transmission path which is different from the force transmission path via the second transmission TM2 and clutch mechanism CL2, and can cut off force transmission on this force transmission path.

Configuration of Transmission

Next, the first and second transmissions TM1 and TM2 used with the automobile drive system 1 will be described. The first and second transmissions TM1 and TM2 are configured of variable transmissions with almost the same configuration. The variable transmissions in this case are configured of infinity variable transmissions BD (BD1, BD2) which are each an infinity variable transmission (also abbreviated to "IVT", a transmission of a type where the gear ration can be set to infinity and the output rotations set to zero without using a clutch). With IVTs, the gear ratio (ratio=1) can be changed variably and the maximum value of the gear ratio can be set to infinity ($\infty$).

As illustrated in the configurations in FIGS. 2 and 3, this infinity variable transmission BD includes an input shaft 101, which rotates on an input center axial line O1 under rotational force from the engines ENG1 and ENG2, and has both ends thereof borne by bearings 102 and 103, multiple eccentric discs 104 integrally rotating with the input shaft 101, linking members 130 of a number equal to that of the eccentric discs 104, to connect the input side and output side, and a one-way clutch 120 provided on the output side.

The multiple eccentric discs 104 are each formed circularly with a first support point O3 as the center. The first support points O3 are provided at equal intervals in the circumferential direction of the input shaft 101, the eccentricity r1 of each as to the input center axial line O1 being changeable, so as to rotate around the input center axial line O1 along with the input shaft 101 while maintaining the eccentricity r1. Accordingly, the multiple eccentric discs 104 are provided so as to eccentrically rotate around the input center axial line O1 in accordance with the rotation of the input shaft 101, while each maintaining the eccentricity r1.

An eccentric disc 104 is configured of an outer circumference side disc 105, and an inner circumference side disc 108 which is integrally formed with the input shaft 101. The inner circumference side disc 108 is formed as a thick disc, with the center thereof displaced by a certain eccentric distance as to the input center axial line O1 which is the center axial line of the input shaft 101. The outer circumference side disc 105 is formed as a thick disc centered on the first support point O3, and has a first circular hole 106 of which the center is away from the center of the outer circumference side disc 105, i.e., away from the first support point O3. The outer circumference of the inner circumference side disc 108 rotatably fits with the inner circumference of the first circular hole 106.

Also, a second circular hole 109 is formed to the inner circumference side disc 108, being centered on the input center axial line O1 and having a portion in the circumferential direction thereof opened to the outer circumference of the of the inner circumference side disc 108. A pinion 110 is rotatably contained within the second circular hole 109. The teeth of the pinion 110 mesh with an annular gear 107 formed on the inner circumference of the first circular hole 106 of the outer circumference side disc 105, through the opening on the outer circumference of the second circular hole 109.

This pinion 110 is provided so as to rotate coaxially with the input center axial line O1 which is the center axial line of the input shaft 101. That is to say, the center of rotation of the pinion 110 and the input center axial line O1 which is the center axial line of the input shaft 101 match. As shown in FIG. 2, the pinion 110 is rotated within the second circular hole 109 by an actuator 180 configured of a DC motor and a reducer. Normally, the pinion 110 is rotated synchronously with the rotation of the input shaft 101, and with the synchronized revolutions as a reference, the pinion 110 is caused to rotate relative to the input shaft 101 by providing the pinion 110 with revolutions greater than or less than the revolutions of the input shaft 101. For example, this is realized by the pinion 110 and output shaft of the actuator 180 being situated so as to be mutually linked, and in the event that there is rotational difference between the rotations of the actuator 180 as to the rotations of the input shaft 101, a reducer (e.g., a planetary gear) is used whereby the relative angle between the input shaft 101 and the pinion 110 changes by an amount equivalent to the rotational difference multiplied by the ratio of reduction. At this time, in the event that the actuator 180 and the input shaft 101 are synchronized with no rotational difference, the eccentricity r1 does not change.

Accordingly, by turning the pinion 110, the annular gear 107 with which the teeth of the pinion 110 mesh, i.e., the outer circumference side disc 105, rotates relative to the inner circumference side disc 108, whereby the distance between the center of the pinion 110 (input center axial line O1) and the center of the outer circumference side disc 105 (first support point O3), i.e., the eccentricity r1 of the eccentric disc 104 changes.

Settings have been made such that, in this case, the center of the outer circumference side disc 105 (first support point O3) can be made to match with the center of the pinion 110 (input center axial line O1) by rotating the pinion 110, and by matching these centers, the eccentricity r1 of the eccentric disc 104 can be set to zero.

Also, the one-way clutch 120 includes an output member (clutch inner) 121 which rotates around an output center axial line O2 which is away from the input center axial line O1, a ring-shaped input member (clutch outer) 122 which oscillates around the output center axial line O2 upon external force in the rotational direction be applied thereupon, multiple rollers (engaging units) 123 inserted between the input member 122 and output member 121 to place the input member 122 and the output member 121 in a mutually locked state or unlocked state, and pressing members 126 which press the rollers 123 in a direction realizing a locked state. In the event that the rotational speed of the input member 122 in the positive direction (e.g., the direction indicated by arrow RD1 in FIG. 3) exceeds the rotational speed of the output member 121 in the positive direction, the rotational force input to the input member 122 is transmitted to the output member 121, and accordingly the oscillating motion of the input member 122 can be converted into rotational motion of the output member 121.

As shown in FIG. 2, the output member 121 of the one-way clutch 120 is configured as a member integrally continuing in the axial direction, but the input member 122 is divided into multiple pieces in the axial direction, the number thereof being the same as the number of the eccentric discs 104 and linking members 130, with each being capable of independently oscillating in the axial direction. The rollers 123 are inserted between input member 122 and output member 121 at each input member 122.

One protruding portion 124 is provided in the circumferential direction on the ring-shaped input member 122, with a second supporting point O4 distanced from the output center axial line O2 being provided to the protruding portion 124. A pin 125 is situated on the second supporting point O4 of each input member 122, and a tip (other end portion) 132 of the linking member 130 is rotatably linked to the input member 122 by the pin 125.

The linking member 130 has a ring portion 131 at one end side, with the inner circumference of a circular opening 133 of the ring portion 131 rotatably fitting the outer circumference of the eccentric disc 104 via a bearing 140. Accordingly, one end of the linking member 130 is rotatably linked to the outer circumference of the eccentric disc 104, and the other end of the linking member 130 is rotatably linked to the second supporting point O4 provided on the input member 122 of the one-say clutch 120, whereby a four-bar linkage mechanism, with the four joints of input center axial line O1, first support point O3, output center axial line O2, and second supporting point O4 serving as turning points being, is configured. Rotational motion applied from the input shaft 101 to the eccentric disc 104 is transmitted to the input member 122 of the one-way clutch 120 as oscillating motion of the input member 122, and the oscillating motion of the input member 122 is converted into the rotational motion of the output member 121.

At this time, the eccentricity r1 of the eccentric disc 104 can be changed by moving, with the actuator 180, the pinion 110 of a variable gear ratio mechanism 112, configured of the pinion 110, the inner circumference side disc 108 having the second circular hole 109 containing the pinion 110, the outer circumference side disc 105 having the first circular hole 106 for rotatably containing the inner circumference side disc 108, and so forth. By changing the eccentricity r1, the oscillation angle θ2 of the input member 122 of the one-way clutch 120 can be changed, and accordingly, the ratio of revolutions (gear ratio, also written as "ratio i") of the output member 121 as to the rotations of the input shaft 101 can be changed. That is to say, by adjusting the eccentricity r1 of the first support point O3 as to the input center axial line O1, the oscillation angle θ2 of the oscillation motion transmitted from the eccentric disc 104 to the input member 122 of the one-way clutch 120 is changed, whereby the gear ratio at the time of the rotational force input to the input shaft 101 being transmitted to the output member 121 of the one-way clutch 120 as rotational force via the eccentric disc 104 and linking members 130 can be changed.

In this case, the output shafts S1 and S2 of the first and second engines ENG1 and ENG2 are integrally linked to the input shaft 101 of the infinity variable transmission BD (BD1, BD2). The one-way clutch 120 which is a component of the infinity variable transmission BD (BD1, BD2), serves as each of the first one-way clutch OWC1 and second one-way clutch OWC2 provided between the first transmission TM1 and second transmission TM2 and the rotationally driven member 11.

FIGS. 4A through 5C are explanatory diagrams of a transmission principle with the variable gear ratio mechanism 112 at the infinity variable transmission BD (BD1, BD2). As shown in FIGS. 4A through 5C, the eccentricity r1 of the eccentric disc 104 as to the input center axial line O1 (center of rotation of the pinion 110) can be adjusted by rotating the pinion 110 of the variable gear ratio mechanism 112 to rotate the outer circumference side disc 105 as to the inner circumference side disc 108.

Figure 5A:
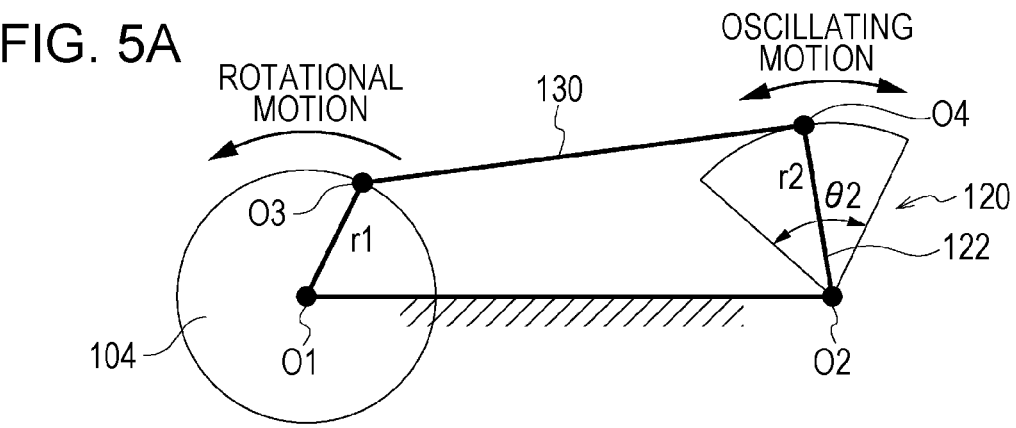
Figure 5B:
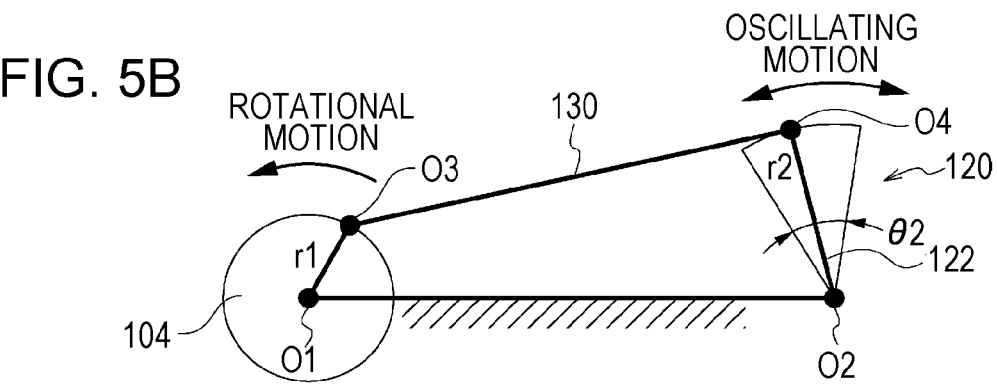
Figure 5C:
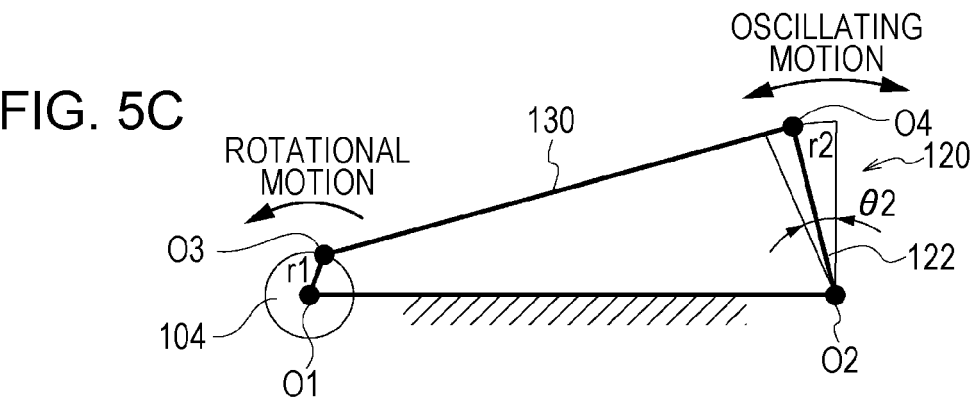

For example, as shown in FIGS. 4A and 5A, in the event that the eccentricity r1 of the eccentric disc 104 is set to "great", the oscillation angle θ2 of the input member 122 of the one-way clutch 120 can be made greater, so a small gear ratio i can be realized. Also, as shown in FIGS. 4B and 5B, in the event that the eccentricity r1 of the eccentric disc 104 is set to "medium", the oscillation angle θ2 of the input member 122 of the one-way clutch 120 can be set to "medium", so a medium level gear ratio i can be realized. Further, as shown in FIGS. 4C and 5C, in the event that the eccentricity r1 of the eccentric disc 104 is set to "small", the oscillation angle θ2 of the input member 122 of the one-way clutch 120 can be made smaller, so a great gear ratio i can be realized. Moreover, as shown in FIG. 4D, in the event that the eccentricity r1 of the eccentric disc 104 is set to "zero", the oscillation angle θ2 of the input member 122 of the one-way clutch 120 can be set to "zero", so a gear ratio i of infinity (∞) can be realized.

Figure 6:
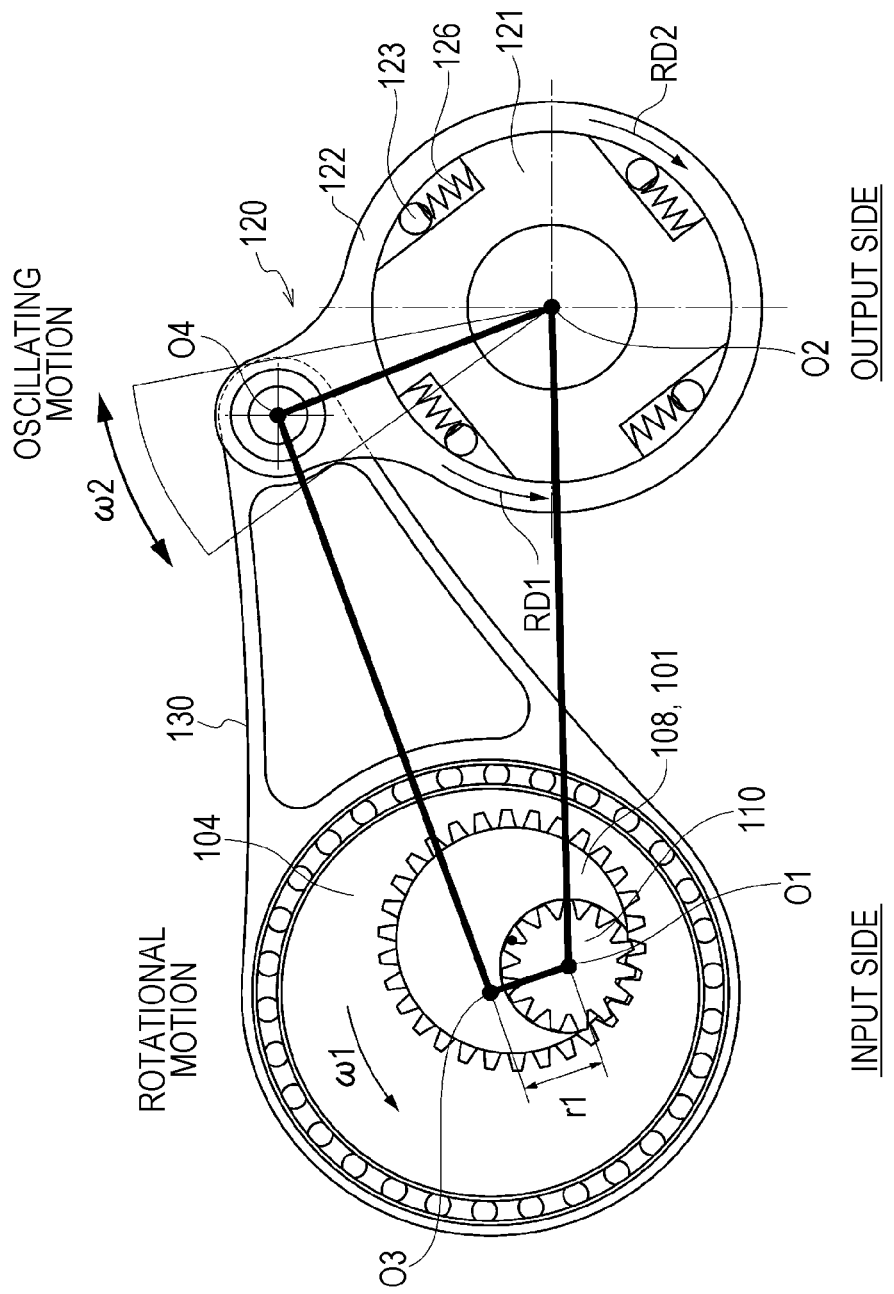
FIG. 6 is an explanatory diagram of the driving force transmission principle of the infinity variable transmission configured as a four-bar linkage mechanism.
Figure 7:
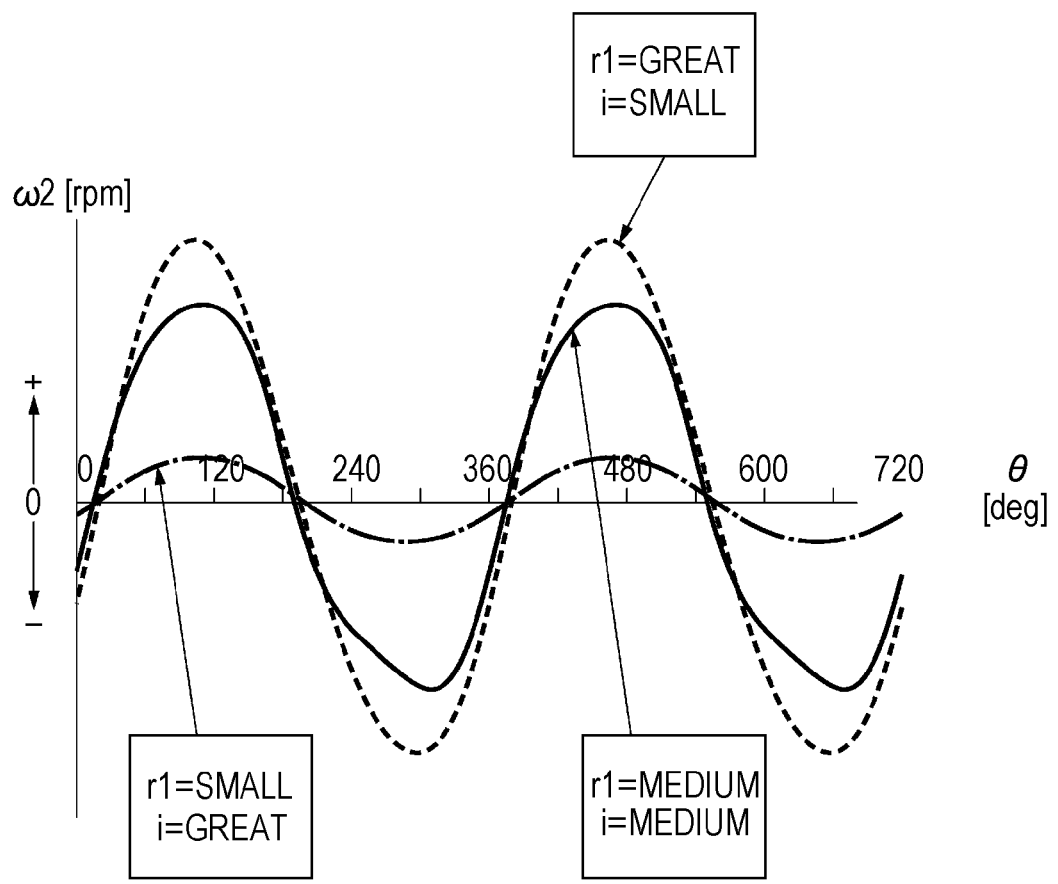
FIG. 7 is a diagram illustrating the relation between rotational angle of the input shaft and angular speed of the input member of the one-way clutch, in a case of varying the eccentricity (transmission gear ratio) of the eccentric disc rotating at the same speed with the input shaft between "great", "medium", and "small", with the transmission.
Figure 8:
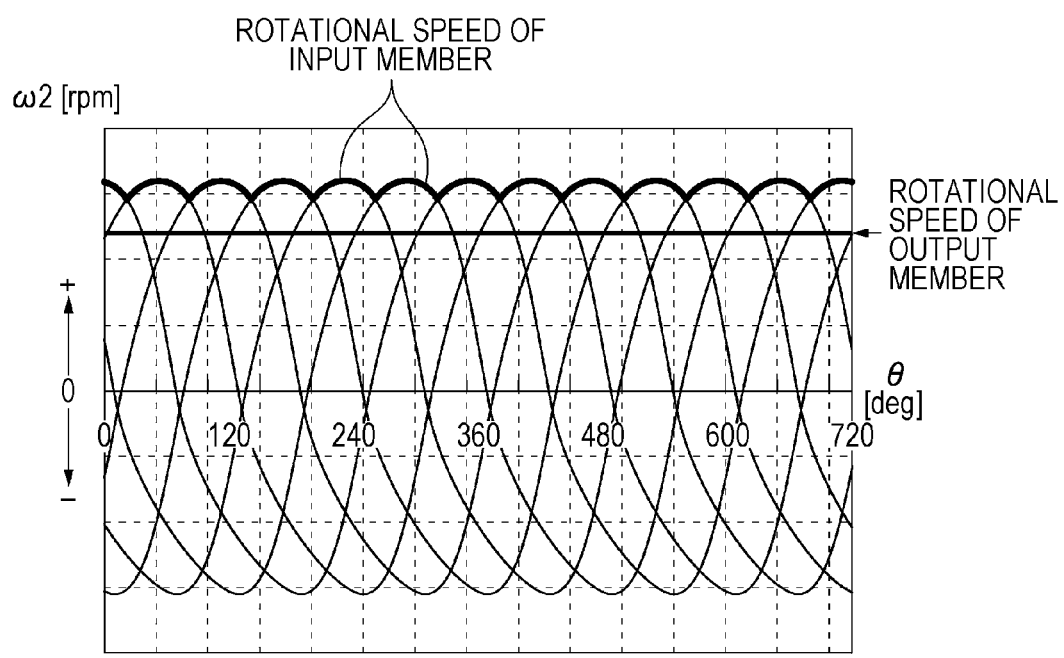
FIG. 8 is a diagram for describing a principle of obtaining output when power is transmitted from the input side (input shaft and eccentric disc) to the output side (output member of the one-way clutch) by multiple link members, with the transmission.

FIG. 6 is an explanatory diagram of the driving force transmission principle of the infinity variable transmission BD (BD1, BD2) configured as a four-bar linkage mechanism, FIG. 7 is a diagram illustrating the relation between rotational angle θ of the input shaft 101 and angular speed ω2 of the input member 122 of the one-way clutch 120, in a case of varying the eccentricity r1 (gear ratio i) of the eccentric disc 104 rotating at the same speed with the input shaft 101 between "great", "medium", and "small", with the infinity variable transmission BD (BD1, BD2), and FIG. 8 is a diagram for describing a principle of obtaining output when power is transmitted from the input side (input shaft 101 and eccentric disc 104) to the output side (output member 121 of the one-way clutch 120) by multiple linking members 130, with the infinity variable transmission BD (BD1, BD2).

As shown in FIG. 6, the input member 122 of the one-way clutch 120 exhibits oscillating motion due to the force applied thereto from the eccentric disc 104 via the linking members 130. When the input shaft 101 rotating the eccentric disc 104 makes one rotation, the input member 122 of the one-way clutch 120 makes one reciprocal oscillation. The oscillation cycle of the input member 122 of the one-way clutch 120 is constant, regardless of the value of the eccentricity r1 of the eccentric disc 104, as shown in FIG. 7. The angular speed ω2 of the input member 122 is determined by the rotational angular speed ω1 of the eccentric disc 104 (input shaft 101) and eccentricity r1.

The multiple linking members 130 connecting the input shaft 101 with the one-way clutch 120 have one end (ring portion 131) rotatably linked to the eccentric discs 104 disposed at equal intervals in the circumferential direction around the input center axial line O1, so oscillating motion brought about at the input member 122 of the one-way clutch 120 by the rotational motion of the eccentric discs 104 occurs in order with a certain phase, as shown in FIG. 8.

At this time, transmission of the force (torque) from the input member 122 of the one-way clutch 120 to the output member 121 is performed only under the condition that the rotational speed of the input member 122 in the positive direction (the direction of the arrow RD1 in FIG. 3) has exceeded the rotational speed of the output member 121 in the positive direction. That is to say, with the one-way clutch 120, meshing (locking) by way of the rollers 123 occurs only in the event that the rotational speed of the input member 122 exceeds the rotational speed of the output member 121, with the force of the input member 122 being transmitted to the output member 121 by the linking member 130 and driving force is generated.

After driving by one linking member 130 has ended, the rotational speed of the input member 122 drops below the rotational speed of the output member 121, and also the locking by the rollers 123 is disengaged by the driving force of another linking member 130, thus returning to a free state (spinning state). By this being performed by all of the linking members 130 in order, the oscillating motion is converted into one-directional rotational motion. Accordingly, only the force of the input member 122 at a timing at which the rotational speed of the output member 121 is exceeded is transmitted to the output member 121 in order, and rotational force smoothed to being nearly flat is provided to the output member 121.

Also, with the infinity variable transmission BD (BD1, BD2) with this four-bar linkage mechanism, the gear ratio (the ratio indicating how many rotations the rotationally driven member can be given for one rotation of the crankshaft) can be determined by changing the eccentricity r1 of the eccentric disc 104. In this case, setting the eccentricity r1 to zero allows the gear ratio i to be set to infinity, so that the oscillating angle θ2 transmitted to the input member 122 being zero regardless of the engine running.

Also, with the infinity variable transmission BD (BD1, BD2) with this four-bar linkage mechanism, settings are made such that, in the event that the rotation of the input shaft 101 thereof is relatively faster than the rotation of the pinion 110 (in the event that the revolutions of the input shaft fall below the rotations of the pinion), the eccentricity r1 of the eccentric disc 104 changes so as to become smaller and the gear ratio i changes toward infinity (under drive, hereinafter also referred to as "UD side"), and in the event of being changed all the way to infinity, the gear ratio is fixed by action of an unshown stopper at the position of infinity.

Note that in the event that the gear ratio reaches infinity, there is no long oscillating motion of the eccentric disc 104, so there is no longer transmission of force from the infinity variable transmission BD (BD1, BD2) to the one-way clutches OWC1 and OWC2. Also, settings are made such that, in the event that the rotation of the input shaft 101 is relatively slower than the rotation of the pinion 110 (in the event that the revolutions of the input shaft surpass the revolutions of the pinion), the eccentricity r1 of the eccentric disc 104 changes in the direction of increasing, and the gear ratio i changes in the direction of decreasing (over drive, hereinafter also referred to as "OD side"). In this case as well, the gear ratio is fixed by action of an unshown stopper at the position that the eccentricity r1 becomes maximum.

Accordingly, in the event of performing stopping control of the engines ENG1 and ENG2 (here, this means control for stopping supply of fuel) when decelerating the vehicle or the like, performing deceleration control such that the rotation of the actuator 180 is either zero or a value close to zero allows automatic establishment of the relation of revolutions of input shaft 101>revolutions of pinion 110 between the input shaft 101 continuing rotation due to inertia and the pinion 110 rotationally driven by the actuator 180, due to internal friction within the actuator 180 or deceleration torque, and accordingly, the gear ratio can be transitioned in the direction of infinity.

Thus, the gear ratio can be automatically changed in the direction of infinity simply by stopping or reducing the rotations of the actuator 180 along with the stopping control of the engines ENG1 and ENG2, so the inertia force from the engines to the input member 122 of the one-way clutches OWC1 and OWC2 up to the point of the engines actually stopping can be used as assisting force for operating the actuator 180 to change the gear ratio in the direction of infinity.

Principle Operations of Control Unit

Next, the control that is executed at this automobile drive system 1 will be described. As shown in FIG. 1, the control unit 5 sends control signals to the first and second engines ENG1 and ENG2, main motor generator MG1, sub motor generator MG2, the actuator 180 of the infinity variable transmissions BD1 and BD2 making up first and second transmissions TM1 and TM2, the clutch mechanisms CL1 and CL2, synch mechanism 20, and so forth, so as to control these components, thereby performing various types of driving pattern (also referred to as "operation pattern") control. Also, engine stopping control is performed when decelerating or when switching engines, and further, variable gear ratio control of the infinity variable transmissions BD1 and BD2, and regeneration driving control are performed. Moreover, input to the control unit 5 are signals from a later-described request output detection unit, rotation detection units of various components, and other detection units. The following is a description of representative types of control performed.

The control unit 5 has a function of selectively executing an EV driving control mode wherein EV driving using the driving force of the main motor generator MG1 alone is controlled, an engine driving control mode wherein engine driving using the first engine ENG1 and/or second engine ENG2 alone is controlled, and a series driving control mode wherein series driving is controlled in which the sub motor generator MG2 is driven as a generator by the first engine ENG1, the electricity generated thereby is supplied to the main motor generator MG1 and/or battery 8, while motor driving by the driving force of the main motor generator MG1 is performed. The control unit 5 also has a function of executing a parallel driving mode in which both the driving force of the main motor generator MG1 and the driving force of the first engine ENG1 are used for driving. Also, EV driving, series driving, engine driving, and parallel driving are selectively executed in accordance with requested driving force and the remaining electrical power (also referred to as SOC (State Of Charge)) of the battery 8.

Now, series driving is executed between EV driving and engine driving at the time of switching the driving mode from EV driving to engine driving. When performing series driving, the revolutions of the first engine ENG1 and/or the gear ratio of the first transmission TM1 are controlled such that the rotational speed input to the input member of the first one-way clutch OWC1 is controlled below the rotational speed of the output member 121.

Also, at the time of switching from series driving to engine driving, the rotations of the first engine ENG1 and/or the gear ratio of the first transmission TM1 are controlled such that the rotational speed input to the input member 122 of the first one-way clutch OWC1 exceeds the rotational speed of the output member 121, so as to transition from series driving to engine driving.

In the event of starting the first engine ENG1 while performing EV driving, the first engine ENG1 is started using the driving force of the sub motor generator MG2 with the gear ratio of the first transmission TM1 set in a state in which the input revolutions of the first one-way clutch OWC1 are set so as to not exceed the output revolutions (a state in which primarily the gear ratio is set to infinity, to minimize the rotational load). After having switched the driving mode from series driving to engine driving, generating by the sub motor generator MG2 is stopped. Note however, that in the event that the remaining power (SOC) of the battery 8 is within a first predetermined value (a reference value, e.g., reference SOCt=35%) after having switched the driving mode from series driving to engine driving, charging of the battery 8 by the sub motor generator MG2 generating electricity is continued.

During EV driving, the clutch mechanisms CL1 and CL2 are maintained in a disengaged state. Accordingly, drag torque loss at the one-way clutches OWC1 and OWC2 can be done away with, and energy efficiency can be improved.

Next, at the time of starting the second engine ENG2, one way is to, for example, control the gear ratio of the second transmission TM2 to a finite value (a value as close to a target value as possible) where the force from the second engine ENG2 can be transmitted to the second one-way clutch OWC2 (i≠∞), and where the rotational speed of the input member 122 of the second one-way clutch OWC2 is lower than the rotational speed of the output member 121. Alternatively, another method is to, at the time of starting the second engine ENG2, set the gear ratio of the second transmission TM2 to infinity (∞) and control the rotational speed of the input member 122 of the second one-way clutch OWC2 so as to be lower than the rotational speed of the output member 121. After the second engine ENG2 has started, the gear ratio of the second transmission TM2 is changed to the finite value (target value), thereby controlling the rotational speed input to the second one-way clutch OWC2.

Now, in the event of starting the second engine ENG2 using the driving force of the rotationally driven member 11, in a state where the automobile is traveling using the driving force of the first engine ENG1 and main motor generator MG1, the synch mechanism 20 provided between the output shaft S2 of the second engine ENG2 and the rotationally driven member 11 is put into a connected state whereby force can be transmitted, and the second engine ENG2 is cranked (turned over to start) using the force of the rotationally driven member 11, whereby the second engine ENG2 is started.

In the event of starting the second engine ENG2 and switching the driving source from the first engine ENG1 to the second engine ENG2, in a state where force generated by the first engine ENG1 is being input to the rotationally driven member 11 via the first one-way clutch OWC1, the revolutions of the second engine ENG2 and/or the gear ratio of the second transmission TM2 are changed such that the revolutions input to the input member 122 of the second one-way clutch OWC2 exceed the revolutions of the output member 121. Thus, the engine being used as the driving source can be smoothly switched from the first engine ENG1 to the second engine ENG2.

Also, in the event of combining the driving forces of both the first engine ENG1 and second engine ENG2 to be transmitted to the rotationally driven member 11, synchronizing control is performed to control the revolutions of both the first and second engines ENG1 and ENG2 and/or the gear ratio of the first and second transmissions TM1 and TM2, such that the rotational speed input to both input members 122 of the first one-way clutch OWC1 and second one-way clutch OWC2 synchronously exceed the rotational speed of the output members.

In this case, when accelerating, both engines ENG1 and ENG2 are not unconditionally run, rather, in a state of one (first engine ENG1) being fixed at a high-efficiency running point, the output of the outer engine (second engine ENG2) is raised, thereby handling demand for output.

Specifically, in a state in which the revolutions of the first and second engines ENG1 and ENG2 and/or the gear ratio of the first and second transmissions TM1 and TM2 are controlled such that the rotational speed input to the input members 122 of the first one-way clutch OWC1 and second one-way clutch OWC2 exceeds the rotational speed of the output member 121, the driving conditions are fixed to a certain range such that the revolutions and/or torque of the first engine ENG1 are in a high-efficiency running region, in which state the first engine ENG1 and/or first transmission TM1 are controlled, and output demand exceeding the output obtained by these fixed driving conditions is handled by controlling the second engine ENG2 and second transmission TM2.

Alternatively, as a different control method from that described above, the driving conditions of the second engine ENG2 with greater engine displacement may be set to the fixed side depending on demand for output, such that for example, in the event that the demanded output is a predetermined level or higher, the first engine ENG1 is set to the side with the driving conditions fixed, and in the event that the demanded output is a predetermined level or lower, the second engine ENG2 is set to the side with the driving conditions fixed.

Also, in the event of driving in reverse, the clutch mechanisms CL1 and CL2 are set in a disengaged state, such that the state incapacitating reverse driving due to locking of the first and second transmissions TM1 and TM2 is disengaged. On the other hand, for uphill starts, at least one of the clutch mechanisms CL1 and CL2 is in a connected state.

Also, at the time of deceleration of the vehicle, the inertia of the vehicle is regenerated at the main motor generator MG1. Particularly, in the event of decelerating in a state of having been traveling with the driving force of the first engine ENG1, control is performed where fuel supply to the first engine ENG1 is stopped to conserve fuel, but in this case the drop in revolutions of the first engine ENG1 leads to the revolutions of the input member 122 of the first one-way clutch OWC1 dropping blow the revolutions of the output member 121, so the first one-way clutch OWC1 is in a disengaged state, and the input member 122 side is cut off from the output member 121 side. Accordingly, the range from the first engine ENG1 to the input member 122 of the first one-way clutch OWC1 rotates without transmitting power until the first engine ENG1 actually stops.

The control unit 5 at this time stops the actuator 180 from rotating, or reduces the rotation thereof so as to be lower than the rotation of the output shaft of the first engine ENG1. Thus, the revolutions of the pinion 110 are lower than the rotation of the input shaft 101 (and accordingly the output shaft of the engine), whereby, as shown in FIG. 4D, the eccentricity reaches zero due to the input center axial line O1 and first support point O3 matching, and the gear ratio reaches infinity.

Accordingly, in the event that the gear ratio has been established at a certain finite value before issuing the engine stop command, this means that the eccentric disc 104 at the input shaft 101 side has been performing eccentric rotation and the load on the bearings bearing the input shaft are increased according to the amount of eccentricity, but changing the gear ratio to infinity or a value close to infinity allows the load on the bearings to be reduced, and energy which had been discarded as friction loss can be recovered.

The flow thereof will be described with reference to the flowchart in FIG. 9 and the time chart in FIG. 10. With the present embodiment, regeneration of inertia of the vehicle at the time of deceleration is performed at the main motor generator MG1, and regeneration of inertia at the force transmission system from the crankshaft S1 of the first engine ENG1 to the input member 122 of the first one-way clutch OWC1 is performed at the sub motor generator MG2.

Figure 9:
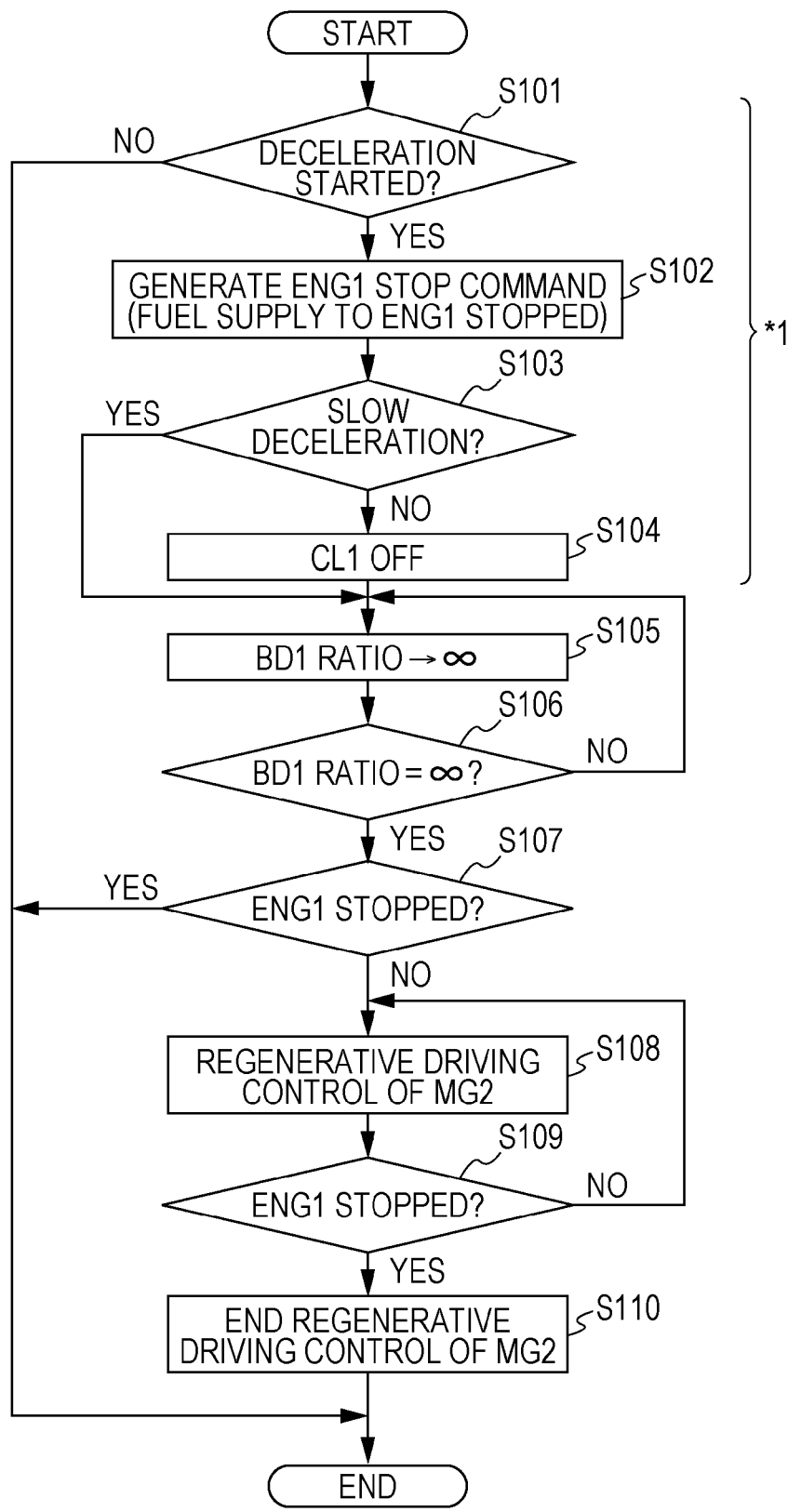
FIG. 9 is a flowchart illustrating control performed when decelerating, that is executed with the drive system.

The flowchart in FIG. 9 illustrates the control performed regarding the driving system at the first engine ENG1 side when the vehicle decelerates.

In step S101 which is the first step, confirmation is made regarding whether or not deceleration has been started. Whether or not deceleration has been started is determined by, for example, the opening angle of the throttle, whether or not the brake pedal has been depressed, and so forth. In the event the deceleration has not been started, the processing ends. In the event that deceleration has been started, the flow advances to step S102.

In step S102, a stop command is generated for the first engine ENG1. Examples of a stop command for the first engine ENG1 includes a command to stop supplying fuel to the first engine ENG1.

In step S103, determination is made regarding whether the degree of deceleration is slow or rapid. In the event of rapid deceleration, the flow advances to step S104.

In step S104, the first clutch mechanism CL1 is turned off, and the flow advances to step S105.

On the other hand, in the event that determination is made in step S103 that deceleration is slow, there is a high chance that demand for driving will come quickly, so step S104 in which the first clutch mechanism CL1 is turned off is skipped, and the flow advances to step S105.

Thus, in the event of disengaging the clutch mechanism CL1, the upstream side of the clutch mechanism CL1 can be cut off from the downstream side thereof. Accordingly, friction loss due to having to drive the drive transmission members (e.g., output member 121 of the one-way clutch) between the first one-way clutch OWC1 to the clutch mechanism CL1 can be reduced, and the energy recovery efficiency by the main motor generator MG1 can be improved.

Also, instead of completely disengaging the clutch mechanism CL1 whenever there is a deceleration request, avoiding disengaging the clutch mechanism CL1 in the event of slow deceleration from which there is a high chance that the accelerator will be applied again right away allows the amount of time for reconnecting the clutch mechanism CL1 in response to the accelerator being applied again can be reduced, thereby raising response.

In step S105, processing is performed to change the gear ratio of the first infinity variable transmission BD1 to infinity. As described above, the gear ratio of the first infinity variable transmission BD1 is changed to infinity by using the inertia of the force transmitting components from the first engine ENG1 to the first one-way clutch OWC1 as assisting force, as described earlier.

In step S106 determination is made regarding whether or not the gear ratio of the first infinity variable transmission BD1 has reached infinity. In the event that determination is made that the gear ratio of the first infinity variable transmission BD1 has reached infinity, the flow advances to step S107. Otherwise, the flow returns to step S105.

In step S107, determination is made regarding whether or not the first engine ENG1 has actually stopped and is no longer rotating. In the event that determination is made that the first engine ENG1 has not stopped and is still rotating, the flow advances to step S108. Otherwise, the flow ends.

Steps S108 and S109 form a loop where the inertia of the force driving components from the first engine ENG1 to the input member 122 of the first one-way clutch OWC1 is regenerated as electric energy by the sub motor generator MG2 until the rotation of the first engine ENG1 completely stops, so as to recover the inertia of the first engine ENG1 as long as it is rotating. Upon confirmation being made in step S109 that the first engine ENG1 has completely stopped, the flow advances to step S110.

In step S110, regenerative driving by the sub motor generator MG2 is stopped, since the first engine ENG1 has actually stopped.

Figure 10:
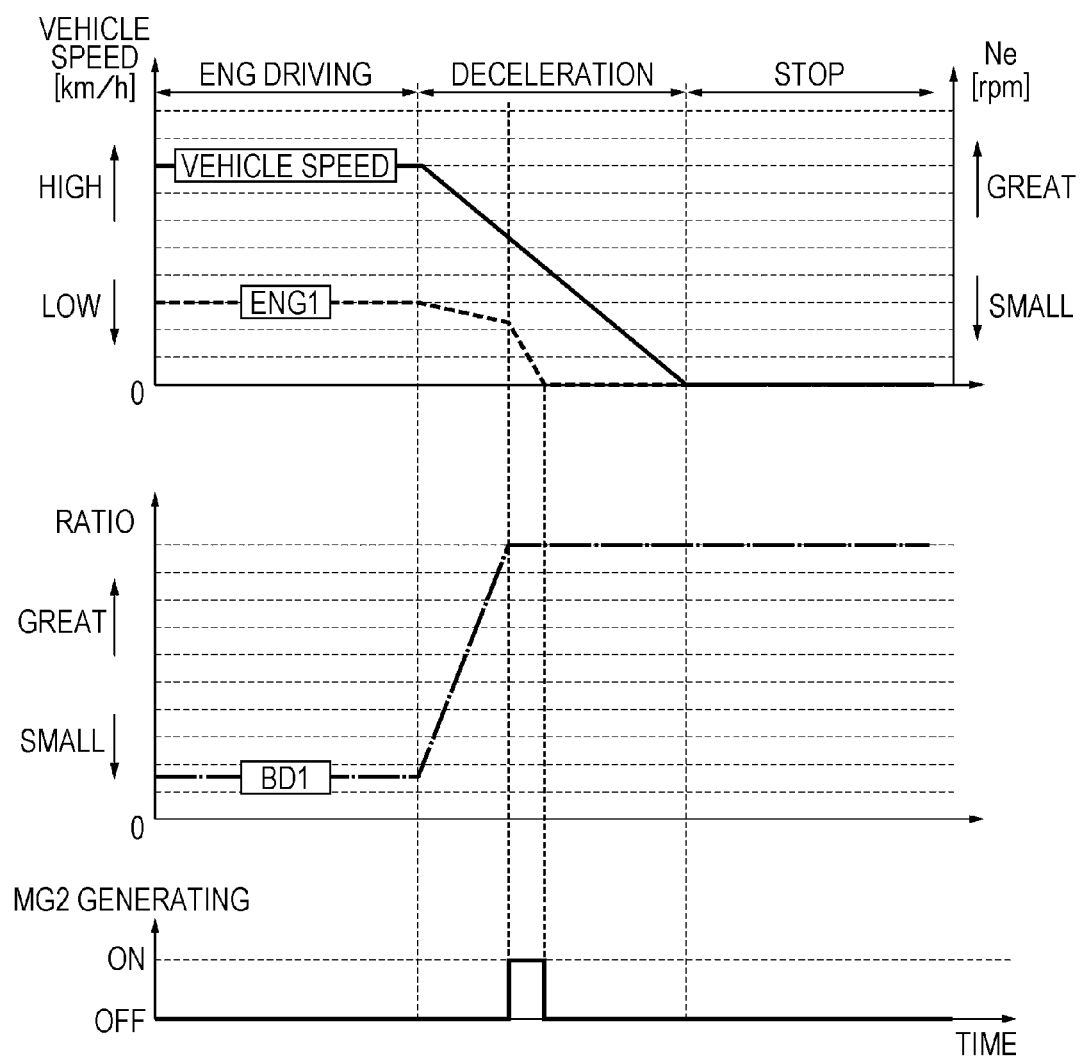
FIG. 10 is a time chart illustrating the control performed.

Looking at the above flow on the time chart in FIG. 10, first, upon deceleration being started in the state of driving with an engine (the first engine ENG1 in this case), the vehicle decelerates. Also, due to stopping control of the first engine ENG1 (cutting off fuel) being performed at the same time as starting deceleration, the rotations of the engine drop. At this time, the rotations of the input member 122 of the first one-way clutch OWC1 drop below the rotations of the output member 121 due to the rotations of the first engine ENG1 dropping, so the first one-way clutch OWC1 is in a disengaged state, and the upstream side of the first one-way clutch OWC1 is cut off from the downstream side.

Accordingly, the gear ratio of the first infinity variable transmission BD1 making up the first transmission TM1 is changed to infinity using the inertia from the crankshaft S1 of the first engine ENG1 to the input member 122 of the first one-way clutch OWC1.

Also, in the event that the first engine ENG1 is still rotating with remaining power after changing the gear ratio to infinity, the power generating of the sub motor generator MG2 is turned on to use the inertia from the rotations thereof to generate electricity by the sub motor generator MG2, thereby recovering the energy in the form of electric power.

With the first infinity variable transmission BD1 according to the present embodiment, in the event that the gear ratio has been established at a certain finite value, this means that the eccentric disc 104 at the input shaft 101 side has been performing eccentric rotation and the load on the bearings 102 and 103 bearing the input shaft 101 are increased according to the amount of eccentricity. Accordingly, changing the gear ratio to infinity allows the load on the bearings to be reduced, and energy which had been discarded as friction loss can be recovered. Also, using the inertia from the first engine ENG1 to the input member 122 of the first one-way clutch OWC1 as assisting force for driving operations of the actuator 180 to change the gear ratio of the first infinity variable transmission BD1 to infinity from the point that the engine stop command has been issued when decelerating up to the first engine ENG1 actually stopping enables reducing in energy for changing the gear ratio, so inertia from the first engine ENG1 to the input member 122 of the first one-way clutch OWC1 can be effectively used without waste.

Also, in the event that there is still remaining inertia from the first engine ENG1 to the input member 122 of the first one-way clutch OWC1 even after having used this as assisting force for diving operations to change the gear ratio, this inertia is regenerated by the sub motor generator MG2 as electric energy, so the inertia from the first engine ENG1 to the input member 122 of the first one-way clutch OWC1 can be effectively used without waste.

Note that while description has been made above regarding a case of changing the gear ratio to infinity, a certain degree of the advantages thereof can be expected by changing the gear ratio to a value close to infinity, even if not all the way to infinity.

Also, while description has been made in the present embodiment regarding a case of setting to infinity the gear ratio of the first transmission TM1 at the side of the first engine ENG1 to which the sub motor generator MG2 is connected, the same problem occurs in deceleration when driving with the second engine ENG2 as well (that is to say, the drop in engine revolutions results in the upstream side and downstream side of the second one-way clutch OWC2 being cut off, causing the inertia from the crankshaft S2 of the second engine ENG2 to the input member 122 of the second one-way clutch OWC2 to be wasted). Accordingly, the inertia from the crankshaft S2 of the second engine ENG2 to the input member 122 of the second one-way clutch OWC2 may be used to change the gear ratio of the second infinity variable transmission BD2 to infinity or a value close to infinity.

This would allow the load on the bearings 102 and 103 to be reduced, and energy which had been discarded as friction loss can be recovered. Also, energy for changing the gear ratio can be reduced, so inertia from the second engine ENG2 to the input member 122 of the second one-way clutch OWC2 can be effectively used without waste.

Figure 11:
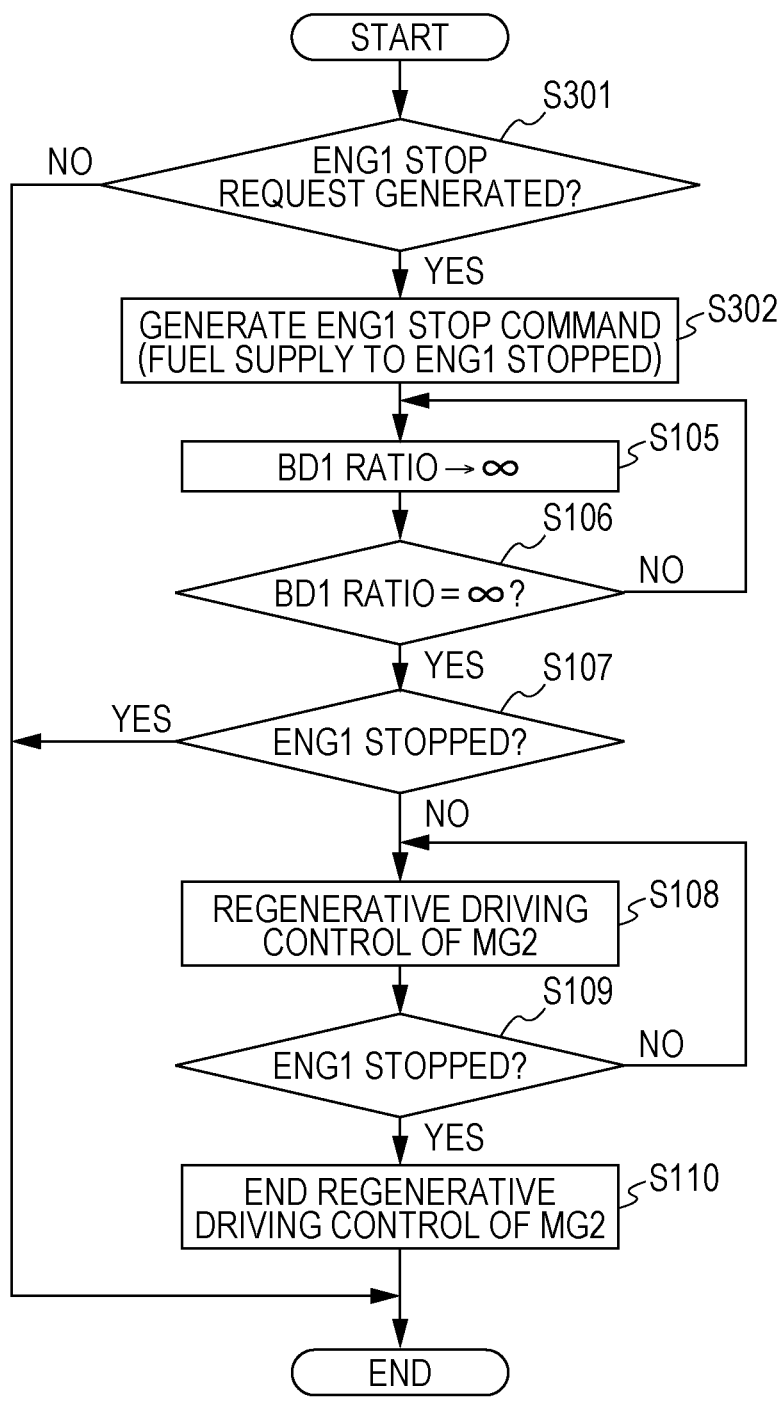
FIG. 11 is a flowchart illustrating the control performed when switching engines.

Also, in the event of switching driving from the first engine ENG1 to the second engine ENG2 in which the first engine ENG1 is stopped, the inertia from the first engine ENG1 to the input member 122 of the first one-way clutch OWC1 can be used in the same way as with the case of deceleration, as shown in the flowchart in FIG. 11. The flowchart in FIG. 11 is for describing the control in this case, with the range indicated by *1 in FIG. 9 being replaced with steps S301 and S302, and the remainder of the flowchart is the same as with the case of FIG. 9.

In step S301, determination is made regarding whether or not a stop request for the first engine ENG1 has been generated. In the event that a stop request has been generated, the flow advances to step S302, and otherwise, the flow ends.

In step S302, an engine stop command is generated, and the flow proceeds to step S105. The processing in step S105 and the subsequent steps is the same as that described above with reference to FIG. 9, and accordingly redundant description will be omitted here.

Operation Patterns

Next, operation patterns executed with the driving system according to the present embodiment will be described. FIGS. 12 through 26 are enlarged explanatory diagrams with operation patterns A through O extracted and illustrated, and FIGS. 27 through 36 are explanatory diagrams of control operations executed in accordance with the driving states or control operations when switching driving modes. Note that the symbols A through O at the upper right in the frames indicating the operation patterns in FIGS. 27 through 36 correspond to the symbols A through O of the operation patterns extracted and illustrated in FIGS. 12 through 26. Also, in the drawings illustrating operation patterns, the driving sources which are operating are indicated by shading, and the transmission paths of power and the flow of electricity are indicated by solid and dotted arrows and so forth.

Figure 12:
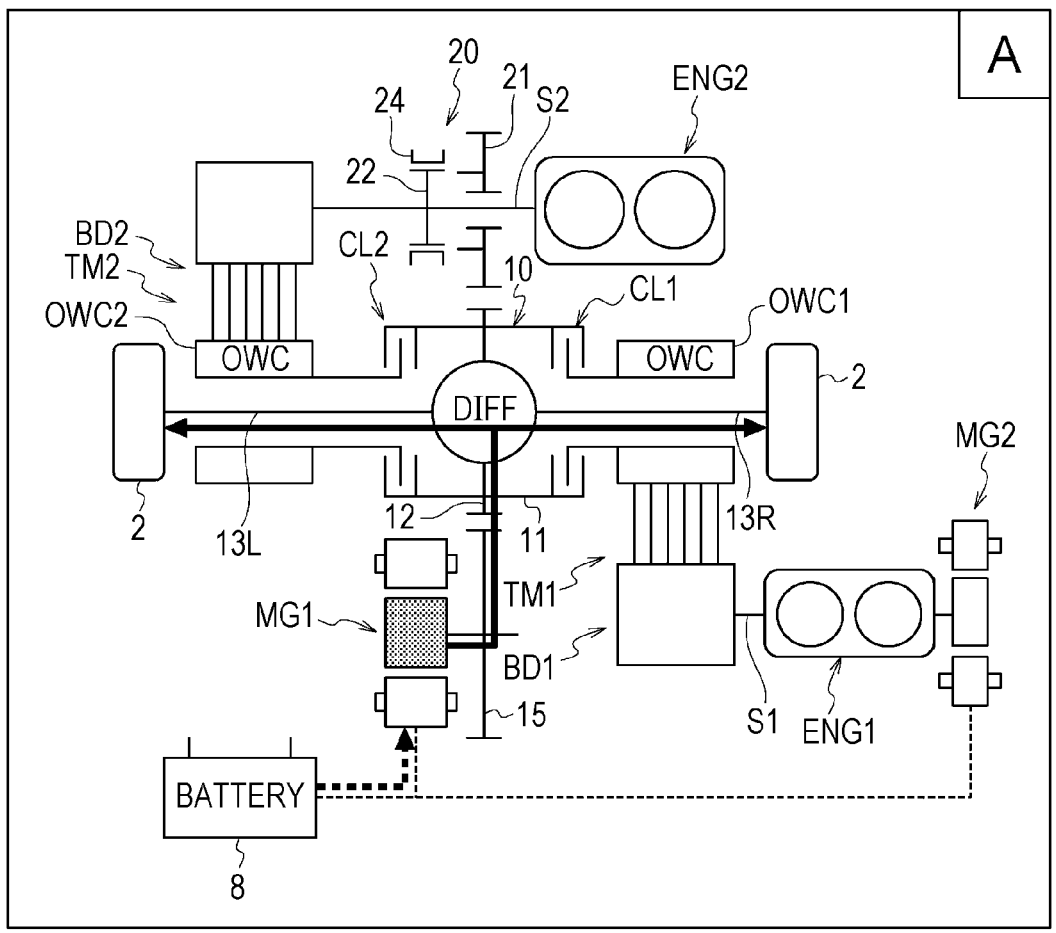
FIG. 12 is an explanatory diagram of an operation pattern A with the drive system according to the embodiment.

With the operation pattern A shown in FIG. 12, EV driving is performed with the driving power of the main motor generator MG1. That is to say, the main motor generator MG1 is driven by applying electricity from the battery 8 to the main motor generator MG1, and the driving power of the main motor generator MG1 is transmitted to the rotationally driven member 11 via a drive gear 15 and driven gear 12, and transmitted to driving wheels 2 via the differential device 10 and left and right axle shafts 13L and 13R, whereby the vehicle is driven. At this time, the clutch mechanisms CL1 and CL2 are disengaged (in an off state).

Figure 13:
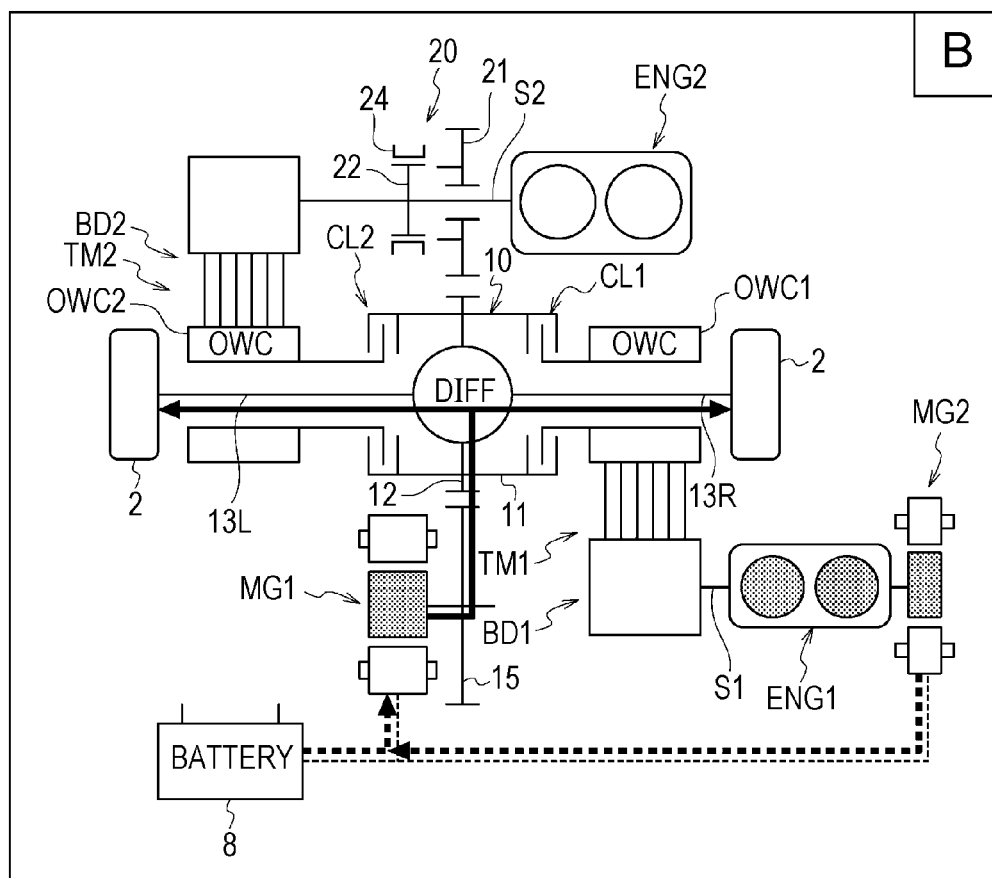
FIG. 13 is an explanatory diagram of an operation pattern B with the drive system according to the embodiment.

With the operation pattern B shown in FIG. 13, series driving is performed in which the sub motor generator MG2 generates electricity using the driving power of the first engine ENG1, and the generated electricity is supplied to the main motor generator MG1 and the battery 8. Starting of the first engine ENG1 is performed by the sub motor generator MG2. AT this time, the gear ratio of the first transmission TM1 is set to infinity.

Figure 14:
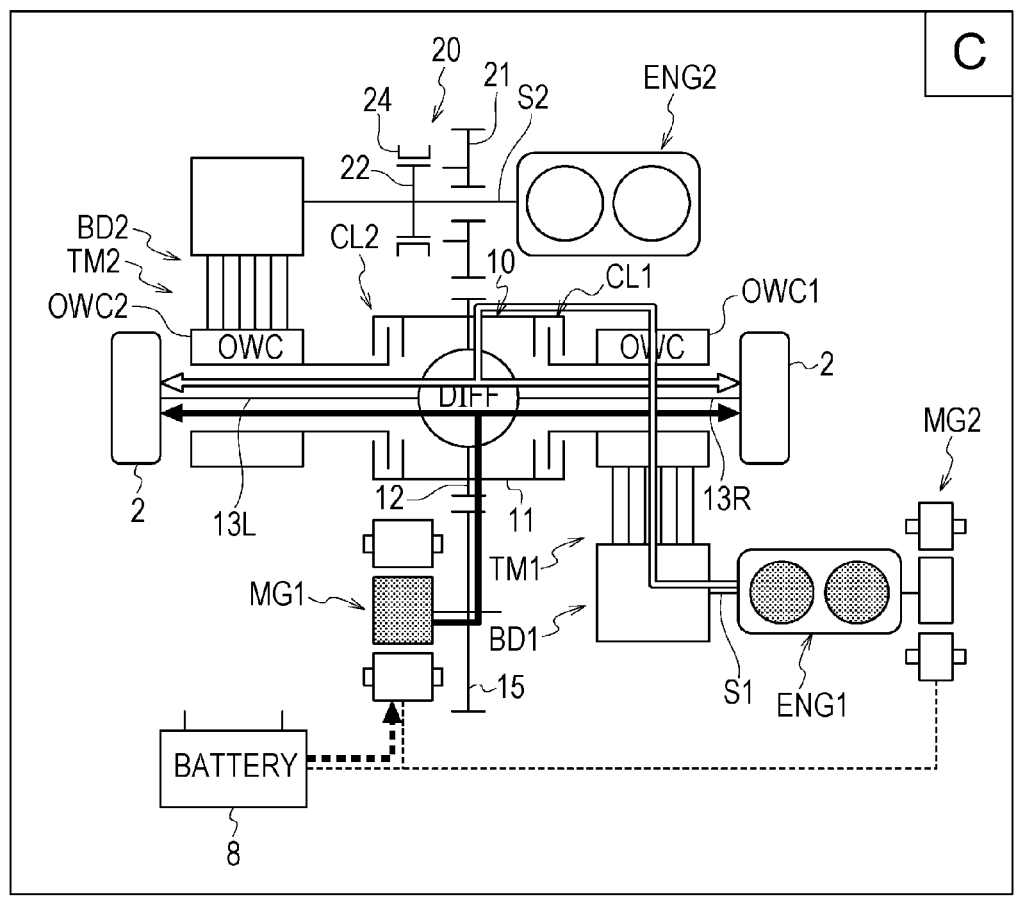
FIG. 14 is an explanatory diagram of an operation pattern C with the drive system according to the embodiment.

With the operation pattern C shown in FIG. 14, parallel driving is performed in which the driving power of both the main motor generator MG1 and the first engine ENG1 are used. In order to transmit the driving power of the first engine ENG1 to the rotationally driven member 11, the revolutions of the first engine ENG1 and/or the gear ratio of the first transmission TM1 are controlled such that the input revolutions of the first one-way clutch OWC1 exceed the output revolutions. Accordingly, the combined driving power of the main motor generator MG1 and first engine ENG1 can be transmitted to the rotationally driven member 11. This operation pattern C is executed in cases that the demanded driving power has increased, such as when accelerating or the like, while driving at low to medium speeds. At this time, the connection state of the clutch mechanism CL1 is maintained, and the clutch mechanism CL2 is maintained in a disengaged state. Accordingly, the driving power of the first engine ENG1 is transmitted to the rotationally driven member 11, while preventing dragging of the second one-way clutch OWC2.

Figure 15:
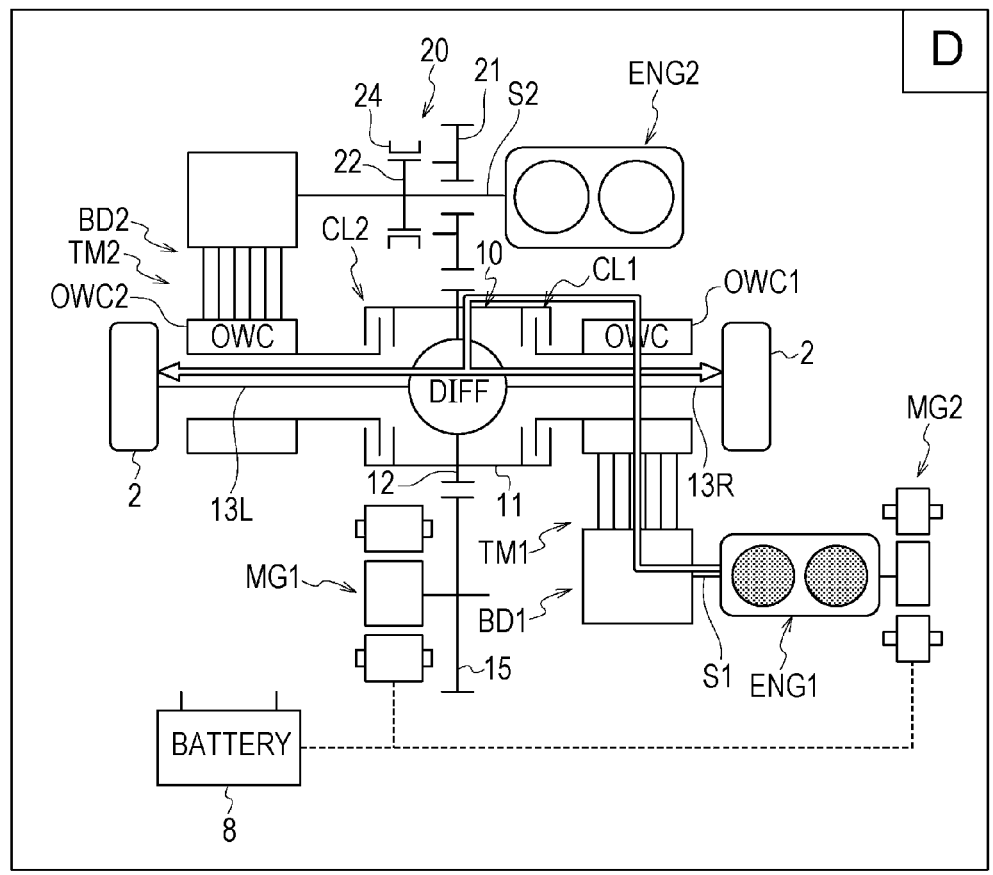
FIG. 15 is an explanatory diagram of an operation pattern D with the drive system according to the embodiment.

With the operation pattern D shown in FIG. 15, engine driving using the driving power of the first engine ENG1 is performed. This operation pattern D is used for conserving electric power of the battery 8, when the SOC is low such as when taking off.

Figure 16:
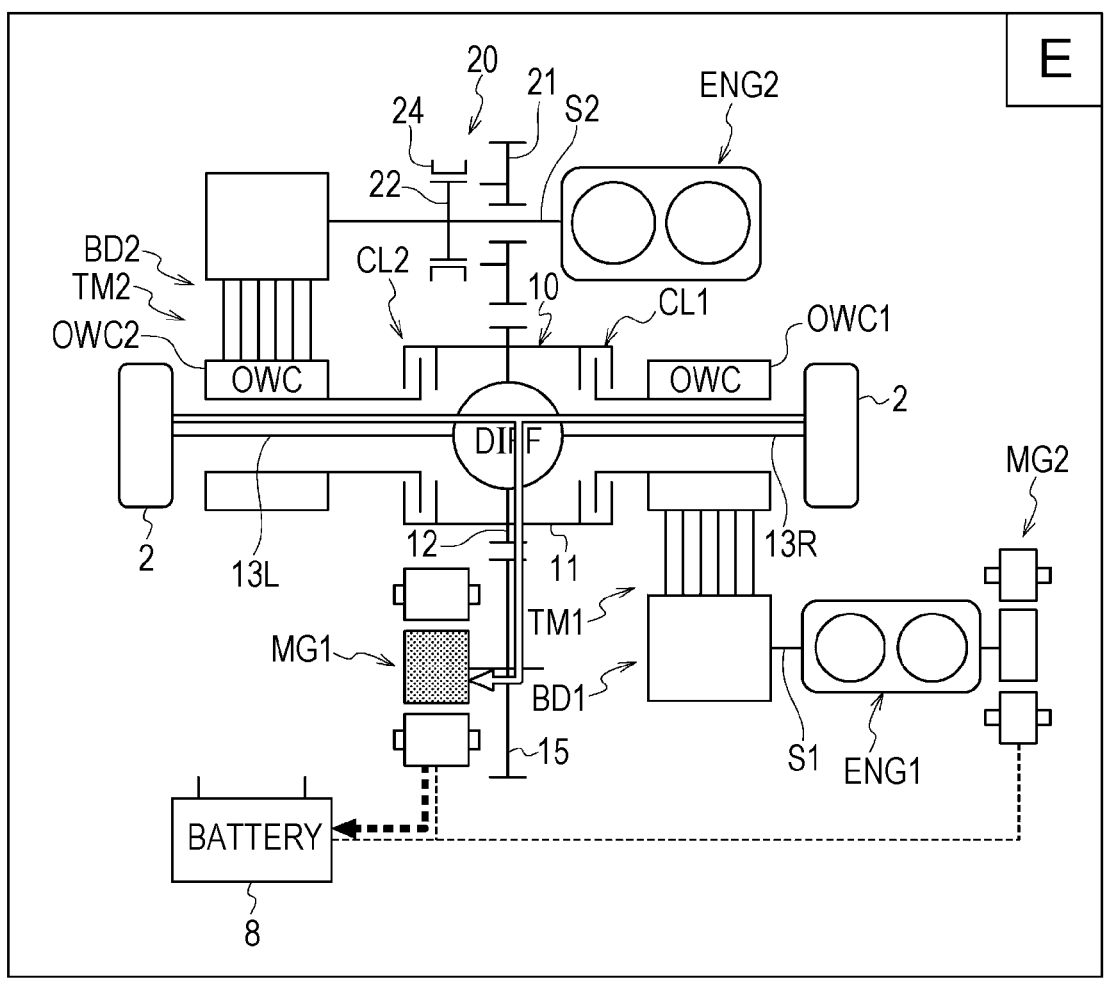
FIG. 16 is an explanatory diagram of an operation pattern E with the drive system according to the embodiment.

With the operation pattern E shown in FIG. 16, the main motor generator MG1 acts as a generator, by the regenerating operations of the main motor generator MG1 using the force transmitted from the driving wheels 2 via the rotationally driven member 11 when decelerating, with the mechanical energy input from the driving wheels 2 via the rotationally driven member 11 being converted into electrical energy. The regenerative braking force is transmitted to the driving wheels 2, and also the regenerative electric power is charged to the battery 8. When executing this operation pattern, the clutch mechanisms CL1 and CL2 are disengaged at a predetermined timing. At the time of stopping the first engine ENG1 which had been contributing to driving in order to execute this operation pattern E, the control in the flowchart shown in FIG. 9 is executed.

Figure 17:
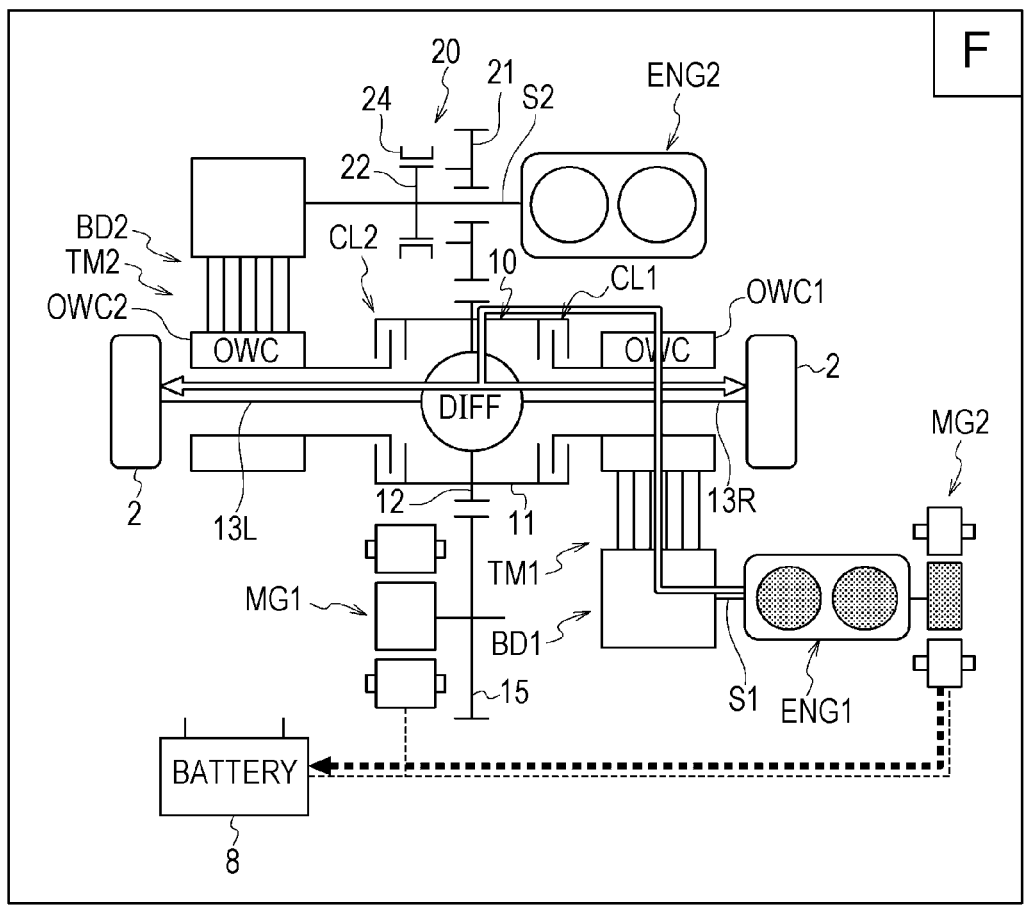
FIG. 17 is an explanatory diagram of an operation pattern F with the drive system according to the embodiment.

With the operation pattern F shown in FIG. 17, engine driving is being performed using only the driving power of the first engine ENG1, and also the driving force of the first engine ENG1 is being used to generate electricity at the sub motor generator MG2, the generated electric power being charged to the battery 8. Note that generating at the sub motor generator MG2 may be stopped depending on the SOC.

Figure 18:
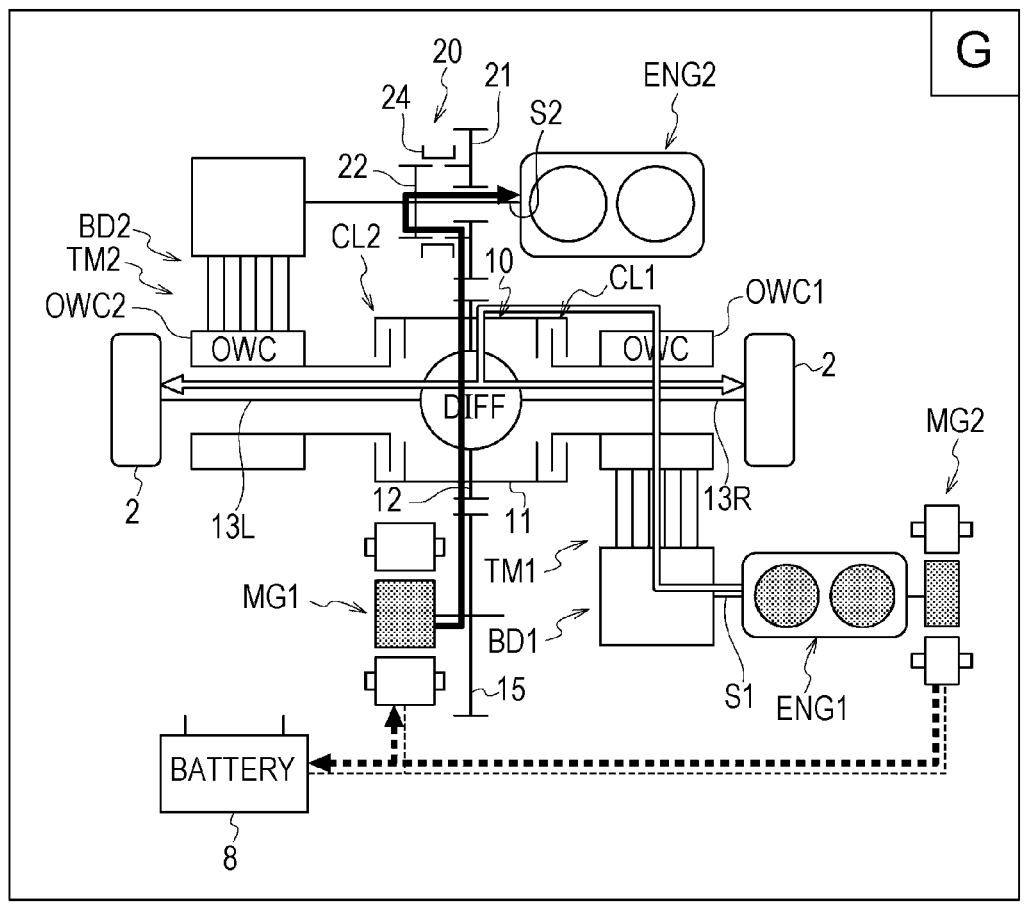
FIG. 18 is an explanatory diagram of an operation pattern G with the drive system according to the embodiment.

With the operation pattern G shown in FIG. 18, while traveling with the driving force of the first engine ENG1 the second engine ENG2 is started by power introduced to the rotationally driven member 11 (differential case) via the synch mechanism (starter-clutch unit) 20, with insufficient output to the driving wheels 2 due to the increased load at the time of starting being supplemented by the driving power of the main motor generator MG1. Also, the sub motor generator MG2 generates electric power using the driving power of the first engine ENG1, and supplies the generated power to the main motor generator MG1 or charges the battery 8.

Figure 19:
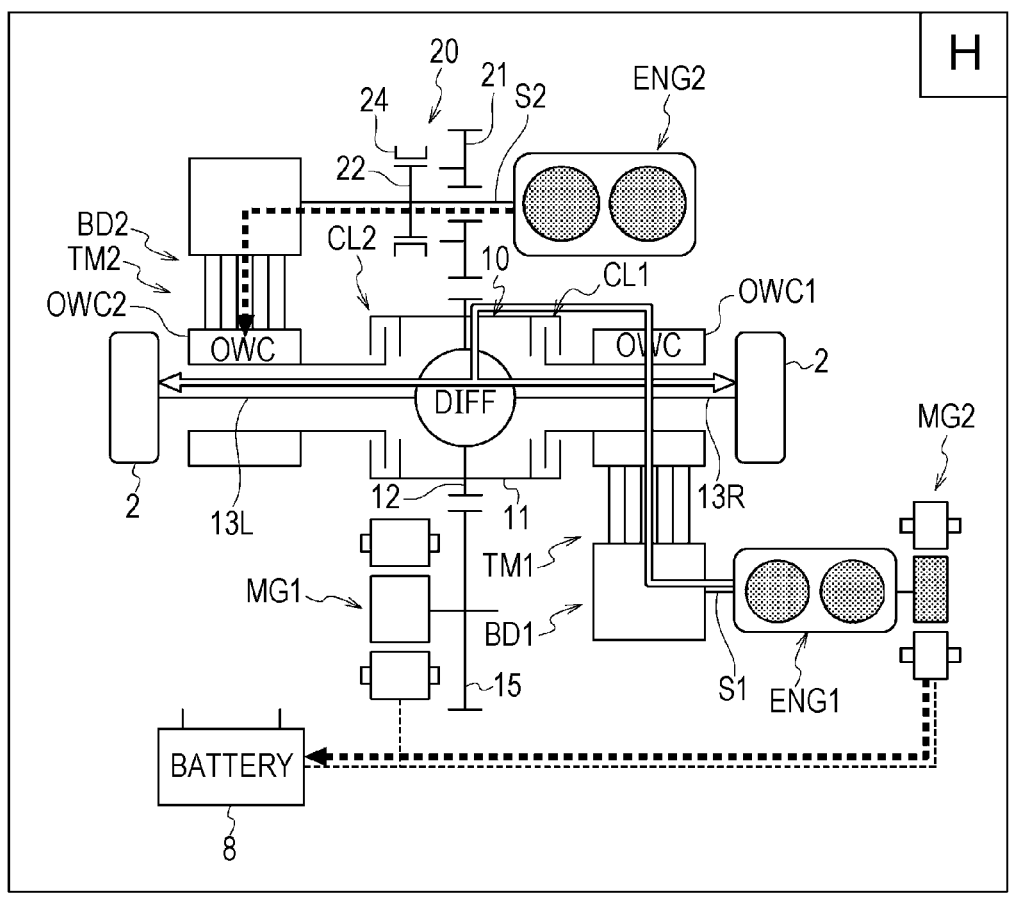
FIG. 19 is an explanatory diagram of an operation pattern H with the drive system according to the embodiment.

With the operation pattern H shown in FIG. 19, engine driving is being performed using the driving power of the first engine ENG1, and in this state the synch mechanism 20 connected in the operation pattern G is cut off (the meshing state is disengaged), whereby the rotationally driven member 11 (differential case) and the output shaft S2 of the second engine ENG2 are in a disengaged state. In this state, the power of the second engine ENG2 that has started is input to the second transmission TM2. Note however, at this stage the input revolutions of the second one-way clutch OWC2 have not yet exceeded the output revolutions, so the output of the second transmission TM2 is not input to the rotationally driven member 11. Also, the sub motor generator MG2 generates electricity using the driving power of the first engine ENG1, and charges the battery 8 with the generated electric power.

Figure 20:
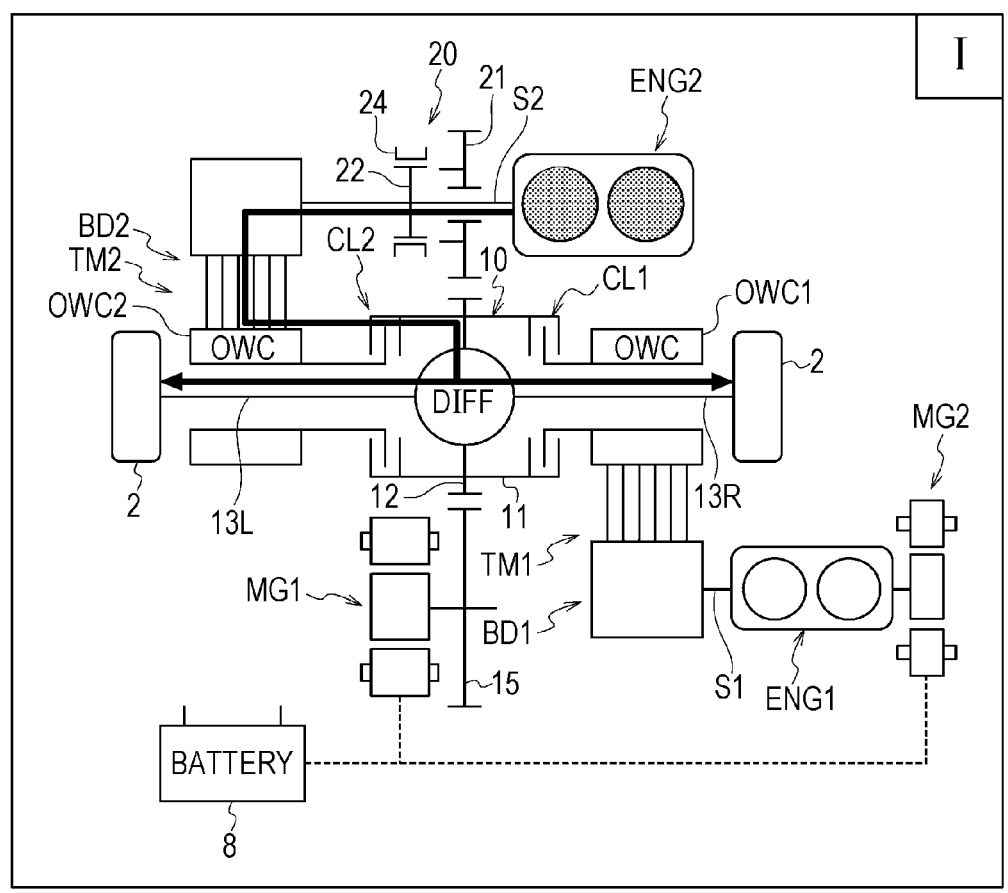
FIG. 20 is an explanatory diagram of an operation pattern I with the drive system according to the embodiment.

With the operation pattern I shown in FIG. 20, engine driving is being performed using the driving power of the second engine ENG2. This operation pattern I realizes engine driving using the driving power of the second engine ENG2 by changing, from the state in operation pattern H, the gear ratio of the second transmission TM2 to the OD (overdrive) side, controlling such that the revolutions of the input member 122 of the second one-way clutch OWC2 exceed the revolutions of the output member 121, and thereby transmitting the power of the second engine ENG2 to the rotationally driven member 11 (differential case) via the second transmission TM2. With this operation pattern I, the first engine ENG1 is stopped at the point that engagement with the second engine ENG2 is established (i.e., power transmission to the rotationally driven member 11 is established). At this time, the clutch mechanism CL2 is maintained in the connected state, and the clutch mechanism CL1 is maintained in the disengaged state. Accordingly, the driving power of the second engine ENG2 is transmitted to the rotationally driven member 11 while preventing dragging of the first one-way clutch OWC1.

Figure 21:
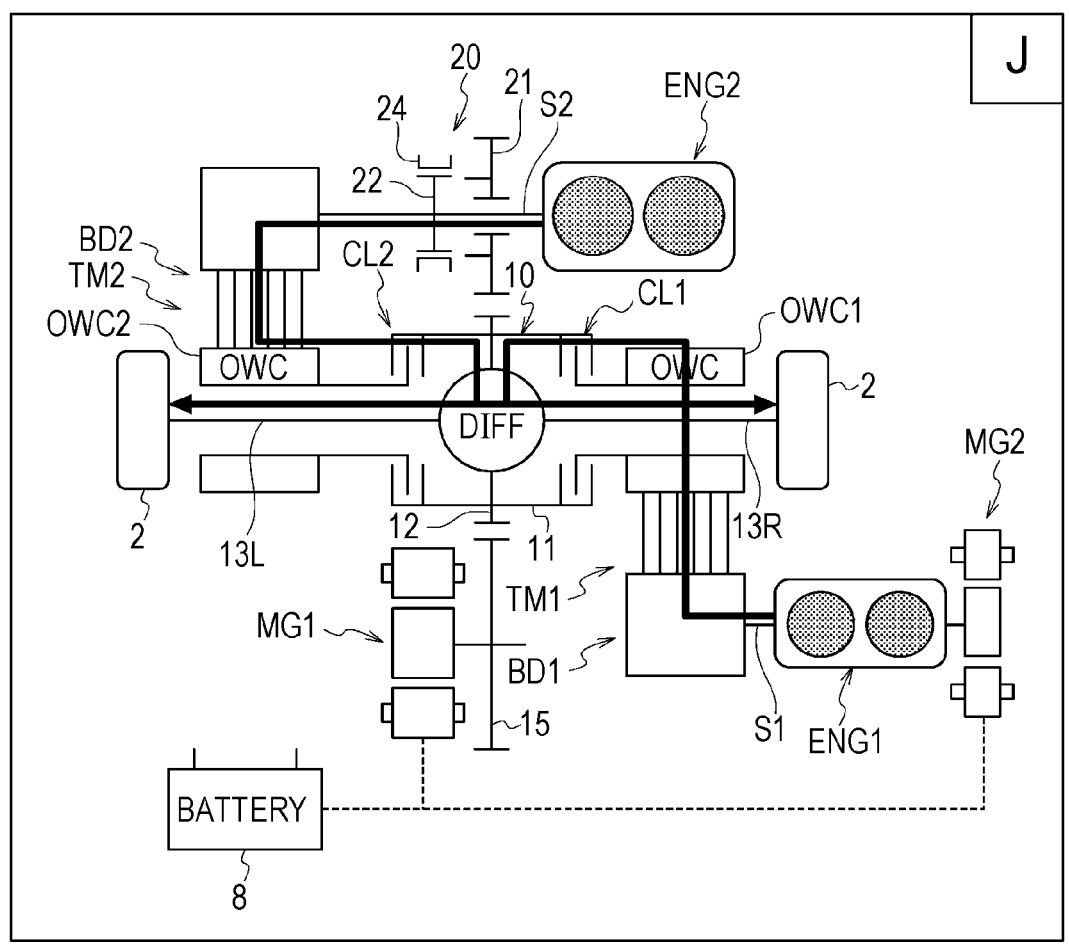
FIG. 21 is an explanatory diagram of an operation pattern J with the drive system according to the embodiment.

The operation pattern J shown in FIG. 21 is an operation pattern in a case of engine driving being performed using the driving power of the second engine ENG2, whereupon demand for output further increases. In this operation pattern J, in the state of engine driving being performed using the driving power of the second engine ENG2, the first engine ENG1 is further started, and the combined power of the second engine ENG2 and first engine ENG1 is transmitted to the rotationally driven member 11 (differential case). That is to say, the revolutions of the first and second engines ENG1 and ENG2 and/or the gear ratios of the first and second transmissions TM1 and TM2 are controlled such that the revolutions of input members 122 of the first and second one-way clutches OWC1 and OWC2 synchronously exceed the revolutions of the output members 121 (revolutions of the rotationally driven member 11).

Figure 22:
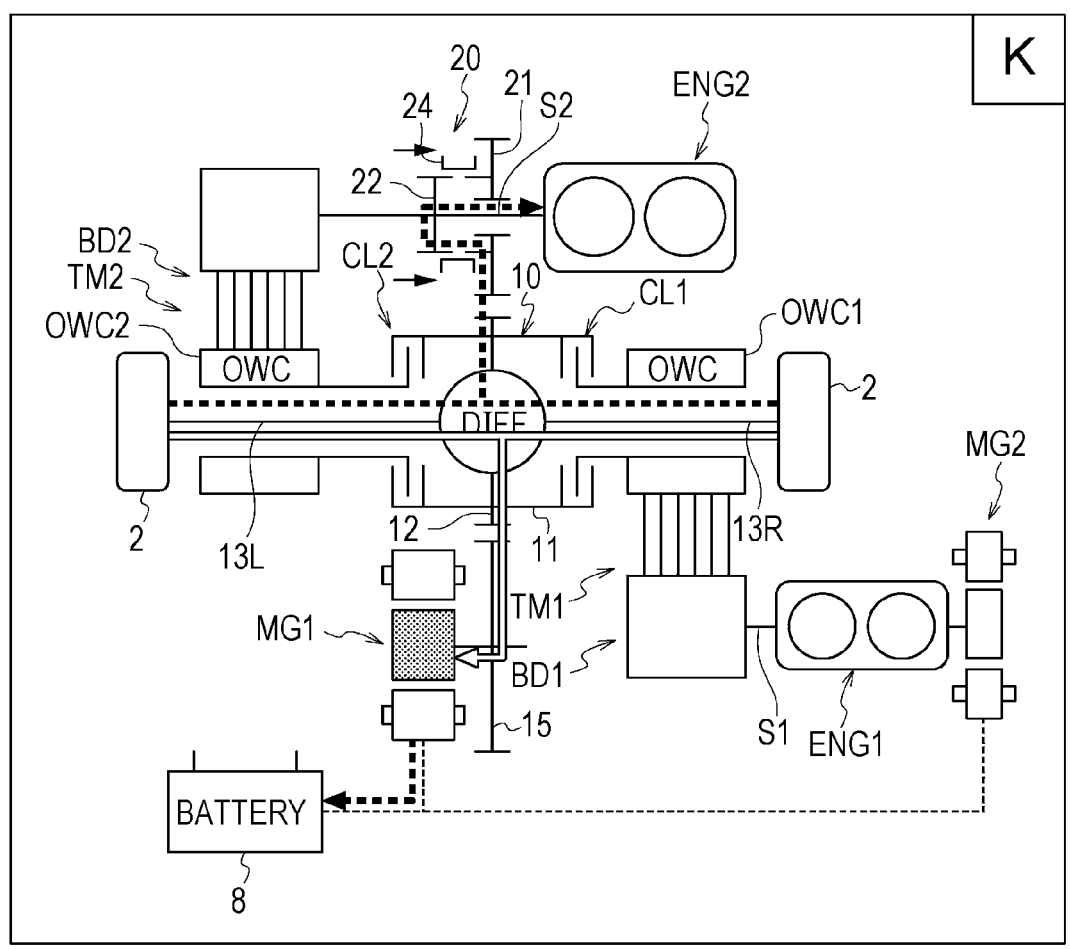
FIG. 22 is an explanatory diagram of an operation pattern K with the drive system according to the embodiment.

The operation pattern K shown in FIG. 22 is an operation pattern in a case of a deceleration request occurring when traveling at mid to high speeds, for example. With this operation pattern K, the first engine ENG1 and second engine ENG2 are stopped, the main motor generator MG1 generates electricity by the power transmitted from the driving wheels 2 via the rotationally driven member 11 due to deceleration, the regenerative power generated thereby is charged to the battery 8, and also the regenerative braking force is applied to the driving wheels 2. At the same time, the synch mechanism 20 is set in a connected state such that the engine braking with the second engine ENG2 is applied to the driving wheels 2 as braking force. With this regenerative driving as well, the clutch mechanisms CL1 and CL2 are disengaged at a predetermined timing.

Figure 23:
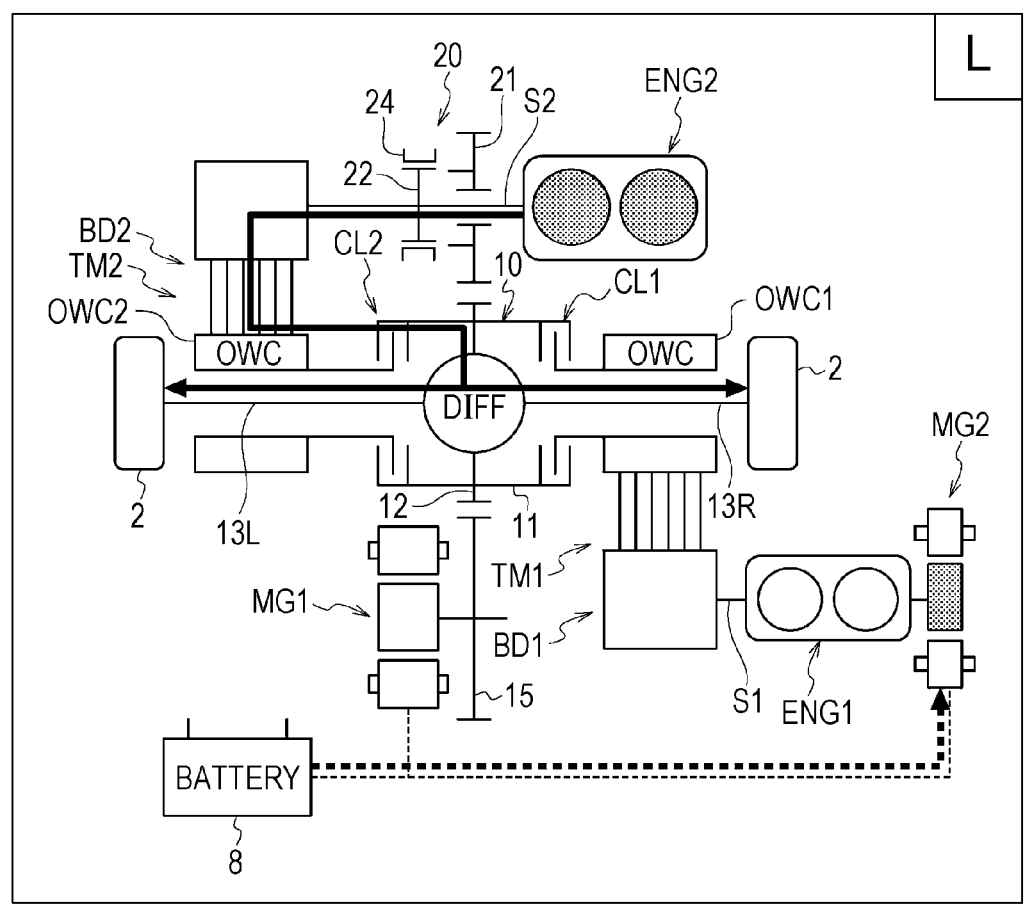
FIG. 23 is an explanatory diagram of an operation pattern L with the drive system according to the embodiment.

The operation pattern L shown in FIG. 23 is an operation pattern in a case of traveling with the driving power of the second engine ENG2, whereupon demand for output further increases, and engine switching is performed. With this operation pattern L, the sub motor generator MG2 is driven to start the first engine ENG1. Also, with this operation pattern, after the first engine ENG1 has started, the operation pattern is the operation pattern J where both driving powers of both engines ENG1 and ENG2 are transmitted to the rotationally driven member 11.

Figure 24:
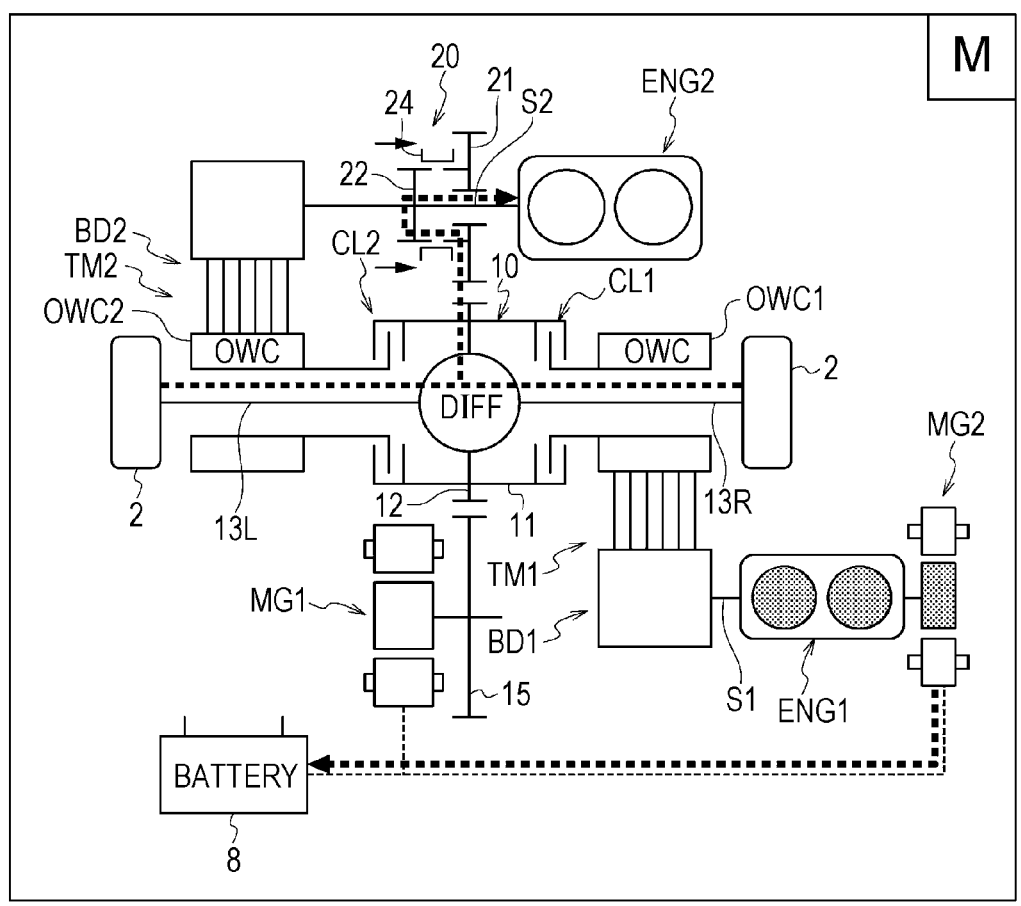
FIG. 24 is an explanatory diagram of an operation pattern M with the drive system according to the embodiment.

With the operation pattern M shown in FIG. 24, the synch mechanism 20 is set to a connected state so that engine braking with the second engine ENG2 can be used, and also the driving power of the first engine ENG1 is used to generate electricity with the sub motor generator MG2, and the generated electric power is charged to the battery 8.

Figure 25:
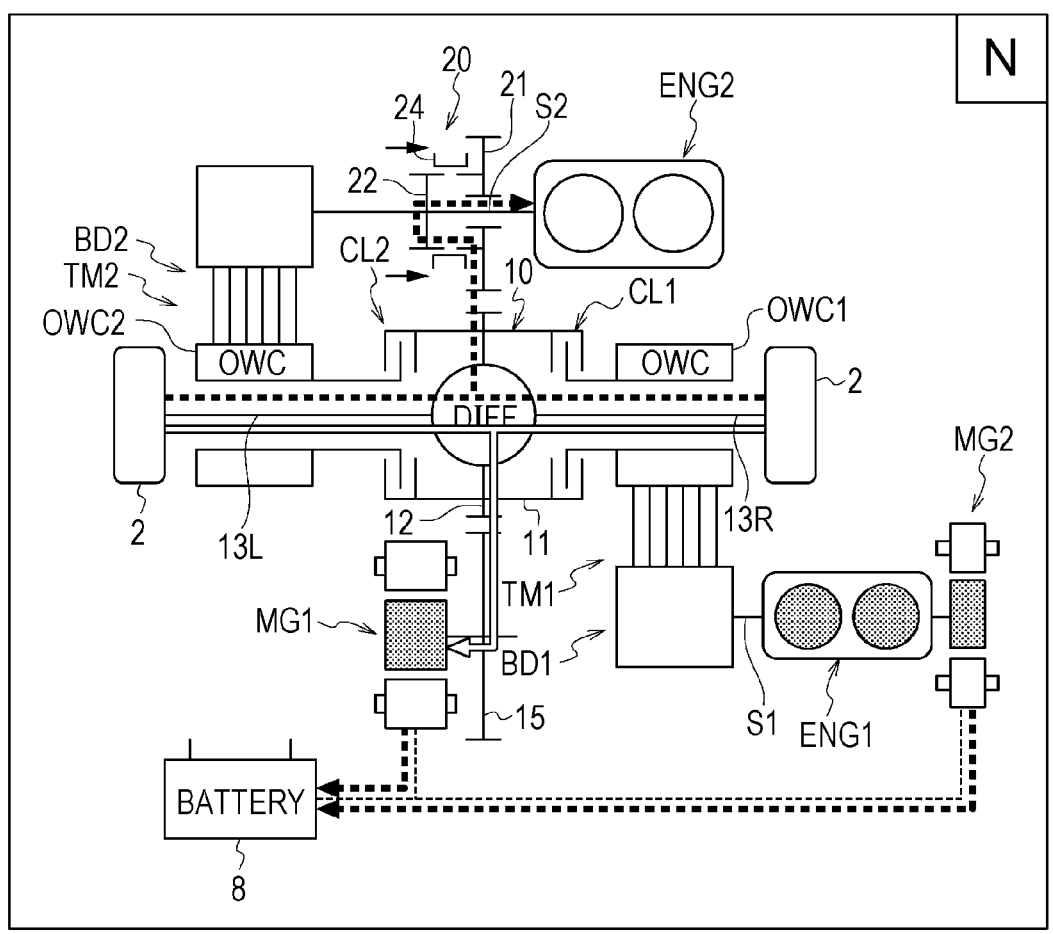
FIG. 25 is an explanatory diagram of an operation pattern N with the drive system according to the embodiment.

With the operation pattern N shown in FIG. 25, the synch mechanism 20 is set to a connected state so that engine braking with the second engine ENG2 can be used, and also the main motor generator MG1 generates regenerative electricity which is charged to the battery 8. At the same time, the driving power of the first engine ENG1 is used to generate electricity with the sub motor generator MG2, and the generated electric power is charged to the battery 8. Also, the synch mechanism 20 is maintained in a connected state, so the second engine ENG2 is in a cranking standby state. With this regenerative driving as well, the clutch mechanisms CL1 and CL2 are disengaged at a predetermined timing.

Figure 26:
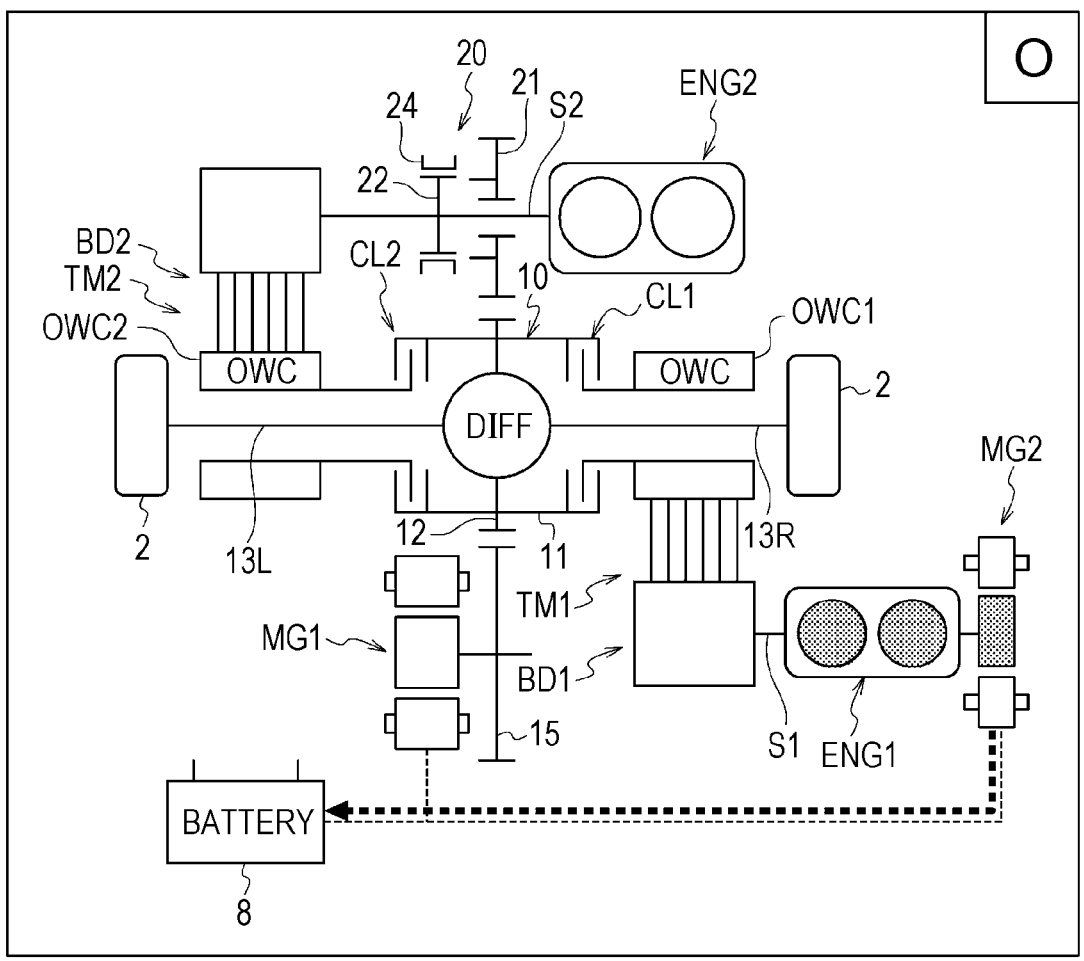
FIG. 26 is an explanatory diagram of an operation pattern O with the drive system according to the embodiment.

The operation pattern O shown in FIG. 26 is an operation pattern with the vehicle stopped, where the sub motor generator MG2 generates electricity using the driving power of the first engine ENG1, and the generated electric power is charged to the battery 8. At this time, the gear ratio of the first and second transmissions TM1 and TM2 is set to infinity ($\infty$) or the clutch mechanisms CL1 and CL2 are disengaged, thereby suppressing dragging torque loss.

Control Operations According to Driving State

Control operations under various driving states will now be described with reference to FIGS. 27 through 36. The driving states are shown in table format, with the following serial numbers in parentheses being shown in the lower left of the tables for the sake of facilitating description. Note that the symbols A through O to the upper right in the frames correspond to the enlarged drawings in FIGS. 12 through 26, which should be referred to as appropriate.

Starting

Figure 27:
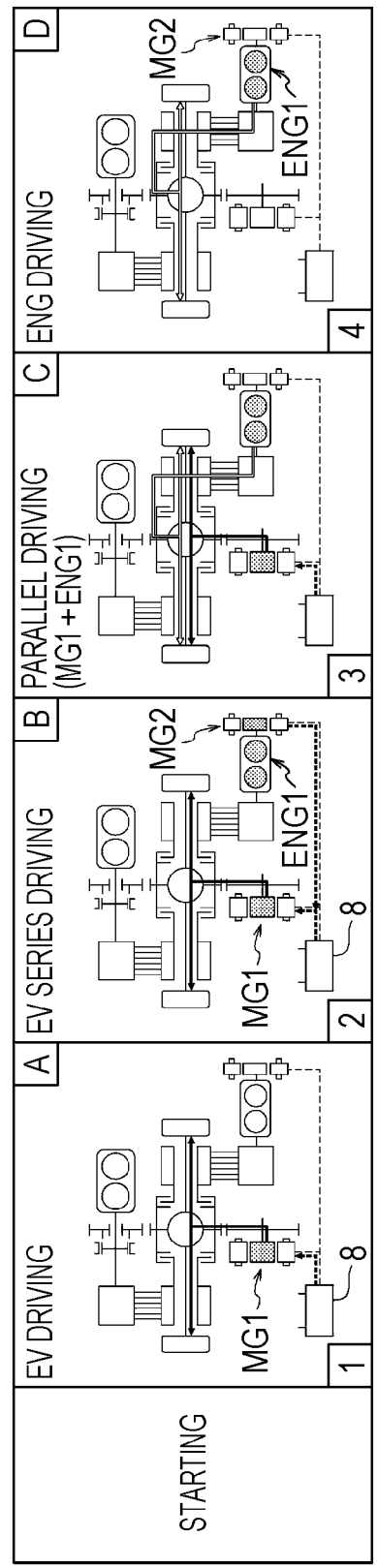
FIG. 27 is an explanatory diagram of a control operation executed in accordance with the state of driving at the time of starting, with the drive system according to the embodiment.

First, the control operations when starting will be described with reference to FIG. 27.

(1) At the time of slow acceleration cruise when starting, EV driving is basically performed with the operation pattern A. With EV driving, the main motor generator MG1 is driven with electric power supplied form the battery 8, and the vehicle travels under this driving power alone.

(2) Also, when accelerating, series driving is performed with the operation pattern B. With series driving, first, the first engine ENG1 is started by the sub motor generator MG2. Once the first engine ENG1 starts, the sub motor generator MG2 is used to function as a generator, and the generated electric power is supplied to the battery 8 and main motor generator MG1, whereby the electric power which the sub motor generator MG2 has generated under the driving power of the first engine ENG1 can be effectively used while continuing EV driving. At this time, the revolutions of the first engine ENG1 and/or the gear ratio of the first transmission TM1 are controlled such that the input revolutions of the first one-way clutch OWC1 are lower than the output revolutions.

(3) Also, when the revolutions of the first engine ENG1 have risen due to the control in accordance with the acceleration request, the gear ratio of the first transmission TM1 is changed such that the input revolutions of the first one-way clutch OWC1 exceeds the output revolutions, and parallel driving is performed where the driving power of both the main motor generator MG1 and first engine ENG1 are combined. Note that in the event that the SOC is low, the sub motor generator MG2 may be used as a generator to charge the battery 8.

(4) Further, when the SOC is low, starting is performed by engine driving using the first engine ENG1 shown in the operation pattern D. In this case as well, the sub motor generator MG2 may be used as a generator to charge the battery 8.

Thus, at the time of starting the vehicle, the EV driving mode using the driving power of the main motor generator MG1, the series driving mode using the first engine ENG1 and sub motor generator MG2 and main motor generator MG1, the parallel driving mode using the driving power of both the main motor generator MG1 and first engine ENG1, and the engine driving mode using the first engine ENG1, are selectively executed in accordance with the driving state.

Low Speed Driving (e.g., 0 to 30 km/h)

Figure 28:
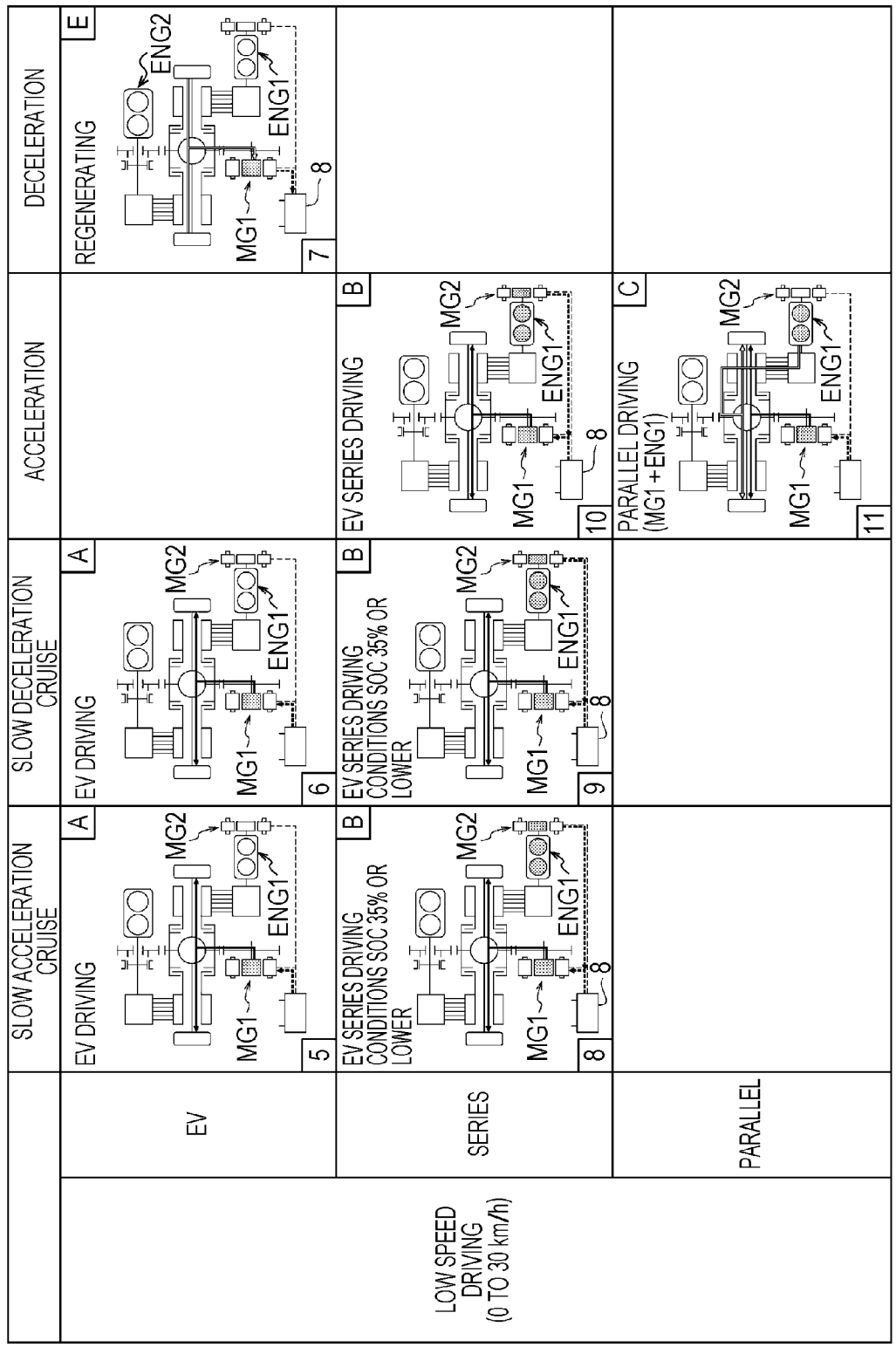
FIG. 28 is an explanatory diagram of control operations executed in accordance with the state of driving when driving at low speed, with the drive system according to the embodiment.

Next, the control operations for low speed driving will be described with reference to FIG. 28.

(5)-(6) With slow acceleration cruising or slow deceleration cruising due to having let up on the accelerator for example, EV driving with operation pattern A is performed.

(7) Also, at the time of deceleration due to having applied the brake or the like, regenerative driving with operation pattern E is performed. At this time, the clutch mechanisms CL1 and CL2 are disengaged. However, in the event of entering regenerative driving in the state of the driving power of the first engine ENG1 being transmitted to the rotationally driven member 11 (see (11) below), disengagement control of the first clutch mechanism CL1 is performed following the flowchart in FIG. 9.

(8)-(9) Even during slow acceleration cruising or slow deceleration cruising, if the remaining power in the battery 8 (SOC) is 35% or lower, series driving with operation pattern B is performed.

(10) Also, series driving with operation pattern B is performed for acceleration as well.

(11) In the event that request for acceleration is even higher, the operation pattern is switched to operation pattern C, so as to perform parallel driving using the driving power of the main motor generator MG1 and first engine ENG1.

Switching Driving Source from Main Motor Generator MG1 to First Engine ENG1

Figure 29:
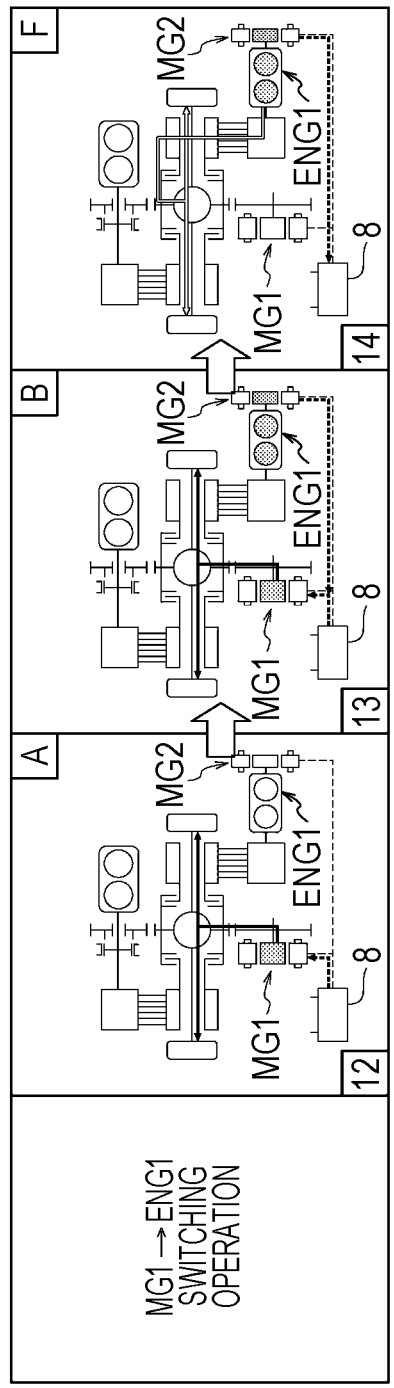
FIG. 29 is an explanatory diagram of control operations executed at the time of switching from EV driving mode to engine driving mode (switching operation), with the drive system according to the embodiment.

When switching the driving source from the main motor generator MG1 to the first engine ENG1, operation control is performed as shown in FIG. 29.

(12)-(13) First, the clutch mechanism CL1 is held in a disengaged state, and from a state of performing EV driving with the operation pattern A, the gear ratio of the first transmission TM1 is changed to infinity, and the first engine ENG1 is started by the sub motor generator MG2. At this time, the gear ratio of the first transmission TM1 is at infinity, so the output of the first engine ENG1 is not input to the rotationally driven member 11. After starting the first engine ENG1, the operation pattern is switched to the operation pattern B, and series driving is performed with the sub motor generator MG2.

(14) Next, transition is made to operation pattern F, where the revolutions of the first engine ENG1 and/or the gear ratio of the first transmission TM1 are controlled so that the input revolutions of the first one-way clutch OWC1 exceed the output revolutions, and the power of the first engine ENG1 is transmitted to the rotationally driven member 11. For example, after changing the gear ratio to infinity and temporarily entering the charging mode, the gear ratio is moved to the OD (overdrive) side, so as to smoothly transition from EV driving with the main motor generator MG1 to engine driving with the first engine ENG1 via series driving. At this time, the connection control of the clutch mechanism CL1 is performed at an appropriate timing so that there is no delay.

Upon power transmission to the rotationally driven member 11 from the first engine ENG1 is established (switching of driving source), the main motor generator MG1 is stopped. However, in the event that remaining power in the battery 8 (SOC) is low, generating and charging with the sub motor generator MG2 is continued, and in the event that SOC is sufficient, the sub motor generator MG2 is stopped.

Mid-Speed Driving (e.g., 20 to 70 km/h)

Figure 30:
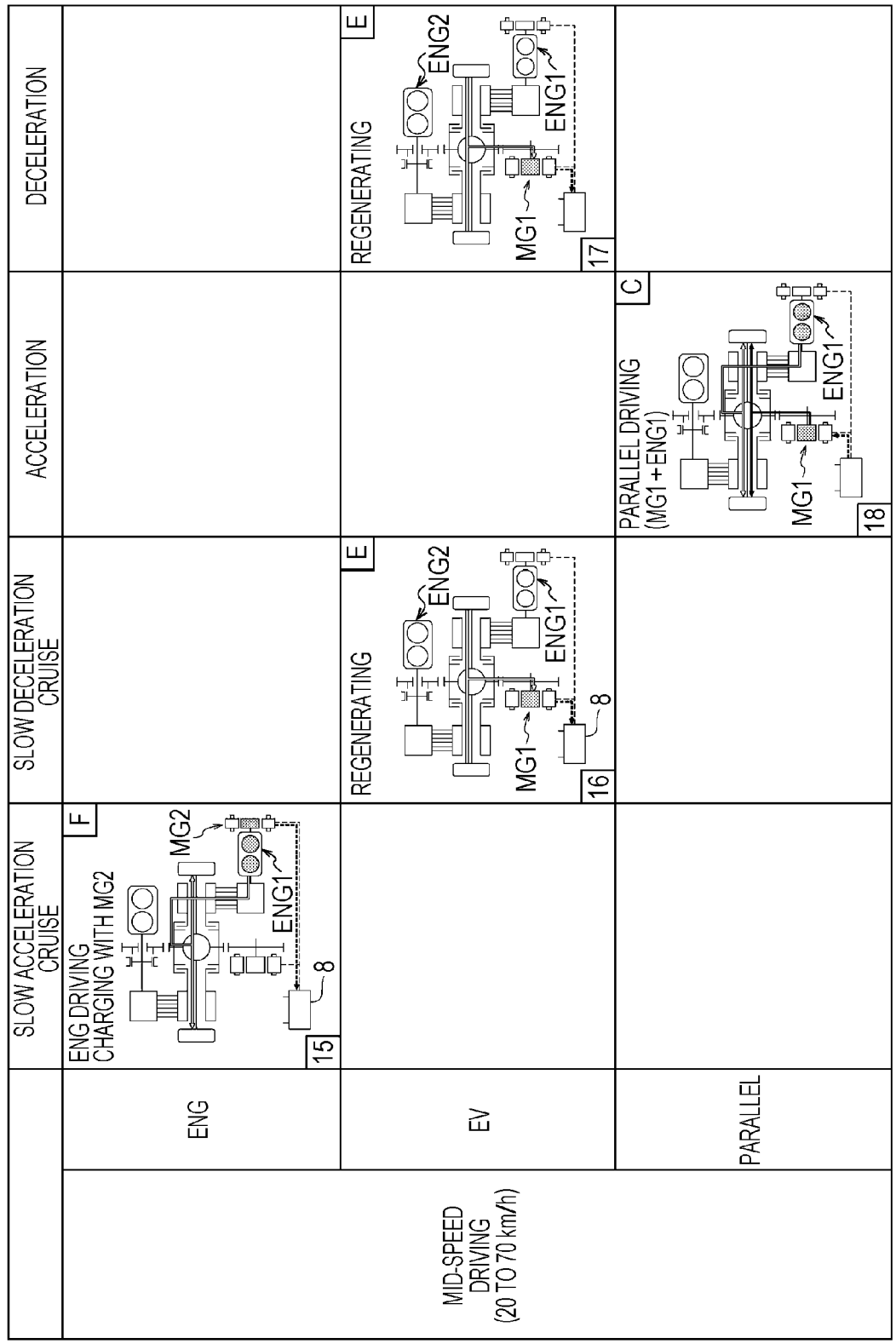
FIG. 30 is an explanatory diagram of control operations executed in accordance with the state of driving when driving at medium speed, with the drive system according to the embodiment.

Next, control operations at the time of mid-speed driving will be described with reference to FIG. 30.

(15) At the time of slow acceleration cruising, single engine driving is performed with the operation pattern F using only the driving power of the first engine ENG1. At this time, the battery 8 is charged with the electric power generated at the sub motor generator MG2. The first engine ENG1 is run at a high-efficiency running point, and driving conditions are handled by controlling the gear ratio of the first transmission TM1.

(16)-(17) When performing slow deceleration cruising or deceleration, the operation pattern E is used, the first engine ENG1 is stopped and the clutch mechanisms CL1 and CL2 are disengaged, and regenerative driving is performed with the main motor generator MG1. At the time of the first engine ENG1 being stopped, the control of the flowchart in FIG. 9 is performed.

(18) On the other hand, when accelerating, the operation pattern is switched to the operation pattern C, and parallel driving is performed using the driving force of both the first engine ENG1 and the main motor generator MG1. At this time, the driving is basically engine driving using the first engine ENG1, and the main motor generator MG1 provides assistance with requests for acceleration. This control operation is selected in the event that change in gear ratio of the first transmission TM1 cannot handle requests for acceleration when driving at medium speeds.

Switching Driving Source from First Engine ENG1 to Second Engine ENG2

Figure 31:
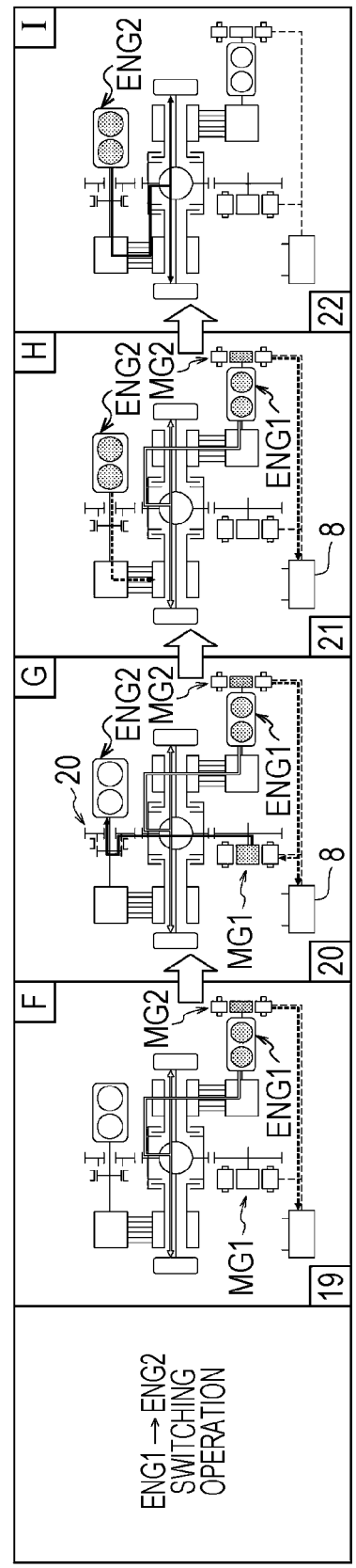
FIG. 31 is an explanatory diagram of control operations executed at the time of switching from engine driving mode with a first engine to engine driving mode with a second engine (switching operation), with the drive system according to the embodiment.

When switching from engine driving using the driving force of the first engine ENG1 to engine driving using the driving force of the second engine ENG2, operation control is performed such as shown in FIG. 31.

(19)-(20) First, from a state of driving with the first engine ENG1 with the operation pattern F, the operation pattern is switched to operation pattern G, and the second engine ENG2 is started. In this case, the synch mechanism 20 is set to a connected state and the output shaft S2 of the second engine ENG2 is cranked with the power of the rotationally driven member 11, thereby starting the second engine ENG2. At this time, the drop in rotations of the rotationally driven member 11 due to the starting shock is supplemented with the main motor generator MG1. That is to say, starting of the second engine ENG2 can be performed by the power from the first engine ENG1 being input to the rotationally driven member 11 alone, but can also be performed using the driving power of the main motor generator MG1 also. At this time, it is sufficient for the gear ratio of the second transmission TM2 to be set so that the input revolutions of the first one-way clutch OWC1 are lower than the output revolutions, and accordingly may be set to infinity or may be set to a value slightly smaller than the target gear ratio. In the event that the driving power of the first engine ENG1 is more than sufficient, the sub motor generator MG2 may be used to generate electricity and charge the battery 8.

(21) Subsequently, after the second engine ENG2 starts, the operation pattern is switched to operation pattern H, the synch mechanism 20 is set to a disengaged state, and the main motor generator MG1 is stopped. At this stage, the power of the second engine ENG2 has not yet been input to the rotationally driven member 11. Accordingly, the gear ratio of the second transmission TM2 is gradually changed to the OD side. AT this time, the control of the flowchart in FIG. 11 is executed in accordance with stopping the first engine ENG1.

(22) The gear ratio of the second transmission TM2 is changed to the OD side, and the input revolutions of the second one-way clutch OWC2 exceed the output revolutions, whereby the operation pattern switches to the operation pattern I, and the driving power of the second engine ENG2 is transmitted to the rotationally driven member 11 via the second one-way clutch OWC2.

Mid-to-High Speed Driving (50 to 110 km/h)

Figure 32:
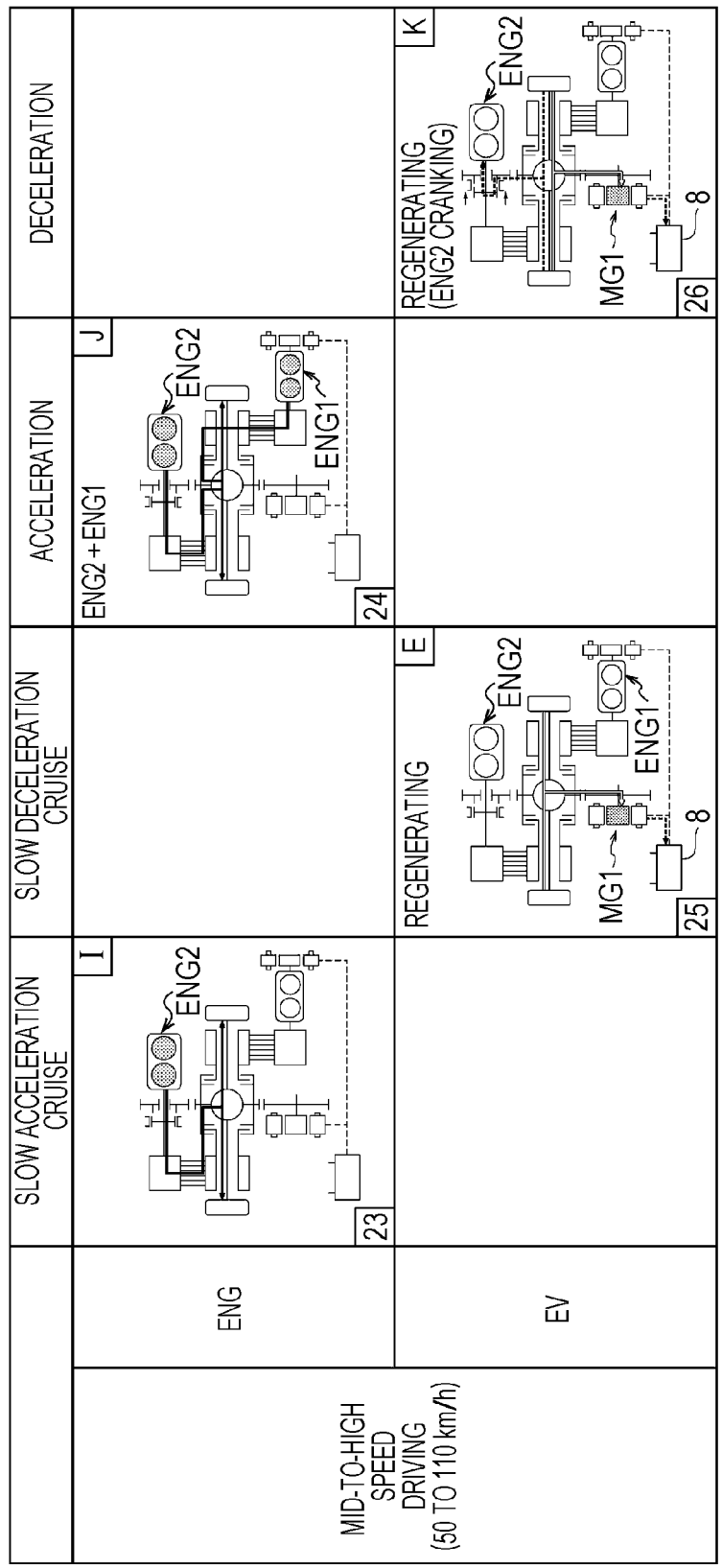
FIG. 32 is an explanatory diagram of control operations executed in accordance with the state of driving when driving at medium-to-high speed, with the drive system according to the embodiment.

Next, description of mid-to-high speed driving will be described with reference to FIG. 32.

(23) At the time of slow acceleration cruising, single engine driving is performed with the operation pattern I using the driving power of the second engine ENG2.

(24) When accelerating, the operation pattern is switched to the operation pattern J, and driving is performed using the driving force of both the second engine ENG2 and the first engine ENG1. Note that in the event that remaining power in the battery 8 (SOC) is low, the sub motor generator MG2 may be used as a generator to charge the battery 8.

(25) When performing slow deceleration cruising, regenerative driving with the main motor generator MG1 is performed with operation pattern E, and both engines ENG1 and ENG2 are stopped. At this time as well, the control of the flowchart in FIG. 9 is performed with the start of the regenerative driving. Also, in the event of returning to (23) from (25), the synch mechanism 20 is set to a connected state, and the second engine ENG2 is cranked.

(26) When decelerating, operation pattern K is used for regenerating driving of the main motor generator MG1, and at the same time the synch mechanism 20 is set to a connected state, thereby applying engine braking with the second engine ENG2.

Switching from Engine Driving with Second Engine ENG2 to Engine Driving with Second Engine ENG2 and First Engine ENG1

Figure 33:
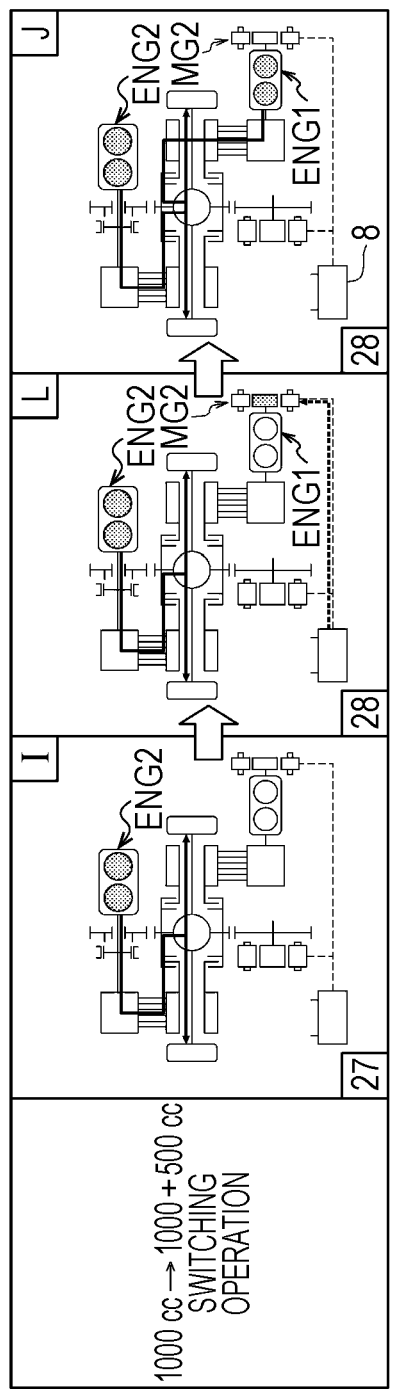
FIG. 33 is an explanatory diagram of control operations executed at the time of switching from engine driving mode with the second engine to parallel engine driving mode with the second engine and the first engine (switching operation), with the drive system according to the embodiment.

In the event of switching from engine driving using the second engine ENG2 to engine driving using the second engine ENG2 and the first engine ENG1, operation control is performed such as shown in FIG. 33.

(27)-(28) First, in a state of single engine driving being performed with the operation pattern I using the driving power of the second engine ENG2, the first engine ENG1 is started using the sub motor generator MG2 as indicated by operation pattern L.

(29) Subsequently, as indicated by operation pattern J, the revolutions of the first and second engines ENG1 and ENG2 and/or the gear ratios of the first and second transmissions TM1 and TM2 are controlled such that the revolutions of input members 122 of the first and second one-way clutches OWC1 and OWC2 synchronously exceed the revolutions of the output members 121 (revolutions of the rotationally driven member 11), and transition is made to engine driving with the combined driving power of the second engine ENG2 and the first engine ENG1.

High Speed Driving (100 to Vmax km/h)

Figure 34:
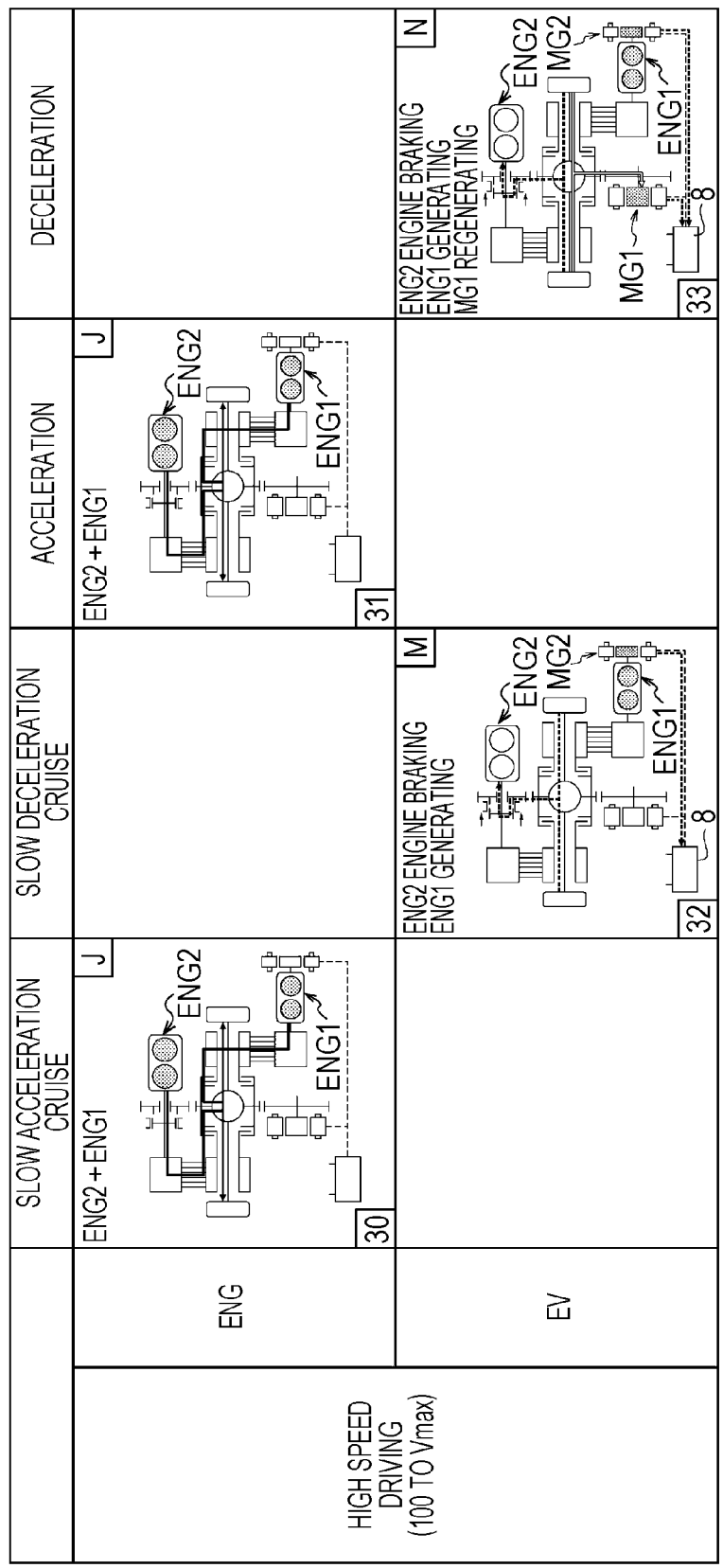
FIG. 34 is an explanatory diagram of control operations executed in accordance with the state of driving when driving at high speed, with the drive system according to the embodiment.

Next, control operations for high speed driving will be described with reference to FIG. 34.

(30)-(31) When performing slow acceleration cruising or when accelerating, engine driving using the combined driving force of the second engine ENG2 and first engine ENG1 is performed with operation pattern J. At this time, the first engine ENG1 of which the engine displacement is small and/or the first transmission TM1 are controlled so as to run under fixed driving conditions, such that the revolutions and torque of the first engine ENG1 are in the high efficiency driving region, and the second engine ENG2 of which the engine displacement is great and/or second transmission TM2 are controlled with regard to further demand for output. Note that in the event that the SOC is low, the sub motor generator MG2 may be used as a generator to charge the battery 8.

(32) Also, when performing slow deceleration cruising, the synch mechanism 20 is connected and engine braking is performed with the second engine ENG2, with operation pattern M. At this time, the first engine ENG1 which does not contribute to deceleration is used for generating driving of the sub motor generator MG2, so as to charge the battery 8.

(33) Also, when decelerating due to having applied the brake or the like, the operation pattern is switched to operation pattern N, and the synch mechanism 20 is connected and engine braking is performed with the second engine ENG2. At the same time, regenerative driving is performed with the main motor generator MG1 so as to apply powerful braking force. The regenerative electricity generated with the main motor generator MG1 is charged to the battery 8. The first engine ENG1 which does not contribute to deceleration is used for generating driving of the sub motor generator MG2, so as to charge the battery 8. This is switching to regenerative driving in a state where the driving power of both the first engine ENG1 and second engine ENG2 is transmitted to the rotationally driven member 11, so disengaging control is performed for the clutch mechanisms CL1 and CL2.

When in Reverse

Figure 35:
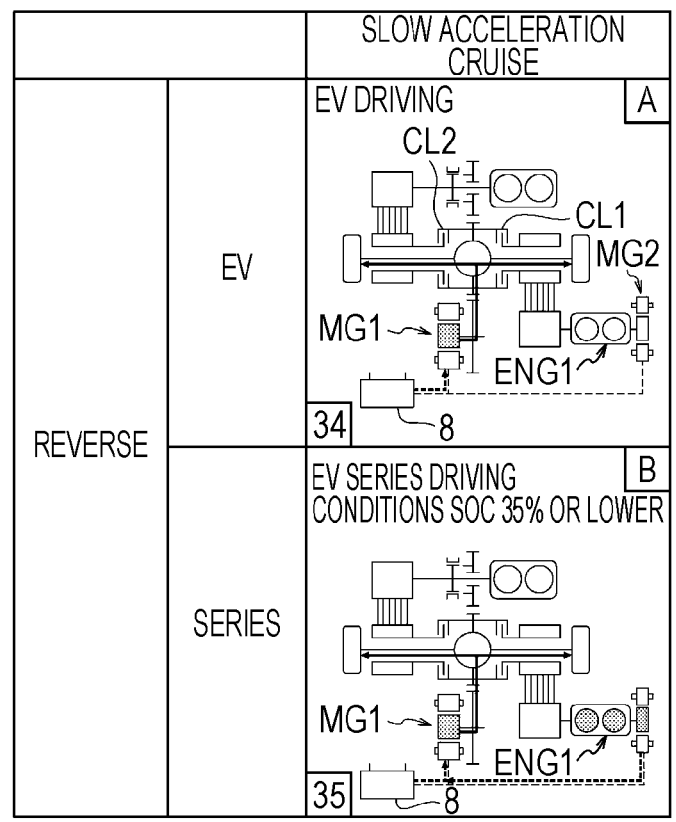
FIG. 35 is an explanatory diagram of control operations executed in accordance with the state of driving when driving in reverse, with the drive system according to the embodiment.

Next, control operations for reverse (backing up) will be described with reference to FIG. 35.

Figure 37A:
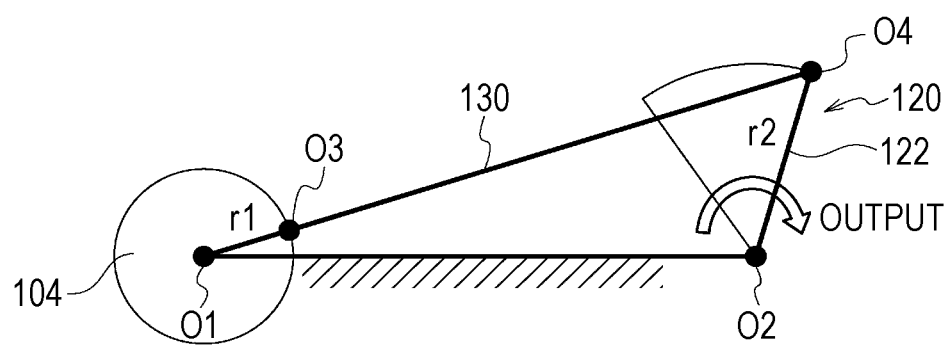
FIGS. 37A and 37B are explanatory diagrams of a reverse incapable state due to locking of the transmission.
Figure 37B:
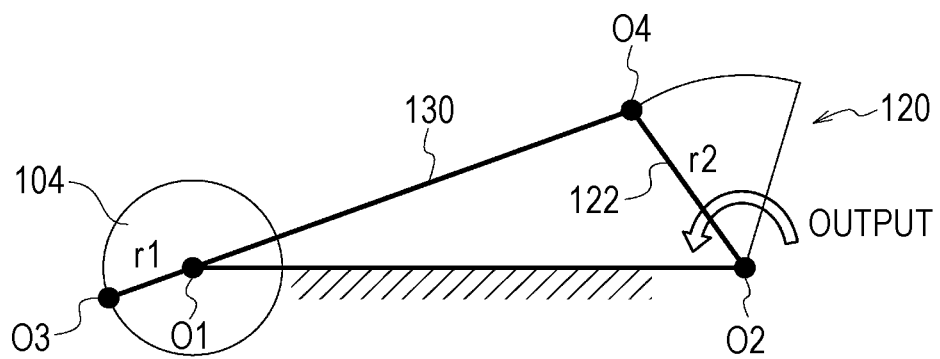

(34) When in reverse, EV driving is performed with operation pattern A, as slow acceleration cruising. When in reverse, the output members 121 of the first and second one-way clutches OWC1 and OWC2 connecting to the rotationally driven member 11 rotate on the opposite direction to the positive direction (the direction of the arrow RD2 in FIG. 3), so the input members 122 and output members 121 engage each other across the rollers 123. When an input member 122 and output member 121 engage each other, the reverse direction rotating force of the output member 121 acts on the input member 122. However, upon reaching a state where the input center axial line O1 and second supporting point O4 are the most distant, in which the input center axial line O1 is situated on an extrapolation of the linking member 130 as shown in FIG. 37A (or in the event that the direction of rotation reverse as to the positive direction is the direction of the arrow RD1 in FIG. 3, the position where the linking member 130 passes through the input center axial line O1 such that the input center axial line O1 and second supporting point O4 are the closest), the oscillating motion of the input member 122 is restricted due to the input member 122 being linked to the linking member 130, so further transmission of reverse direction motion is locked. Accordingly, even if the output member 121 attempts to further rotate in the reverse direction, a state in where reverse cannot be realized, and accordingly the vehicle cannot back up, will occur due to the first and second transmissions TM1 and TM2, which are made up of the infinity variable transmissions BD1 and BD2, locking. Accordingly, the clutch mechanisms CL1 and CL2 are set to a disengaged state beforehand to avoid locking, and in this state the main motor generator MG1 is rotated in reverse so as to back the vehicle up.

(35) Even in the event of driving in reverse with EV driving, in the event that the SOC of the battery 8 is 35% or lower, the operation pattern is switched to series driving of operation pattern B, and the main motor generator MG1 is rotated in reverse while charging the battery 8.

When Stopped

Figure 36:
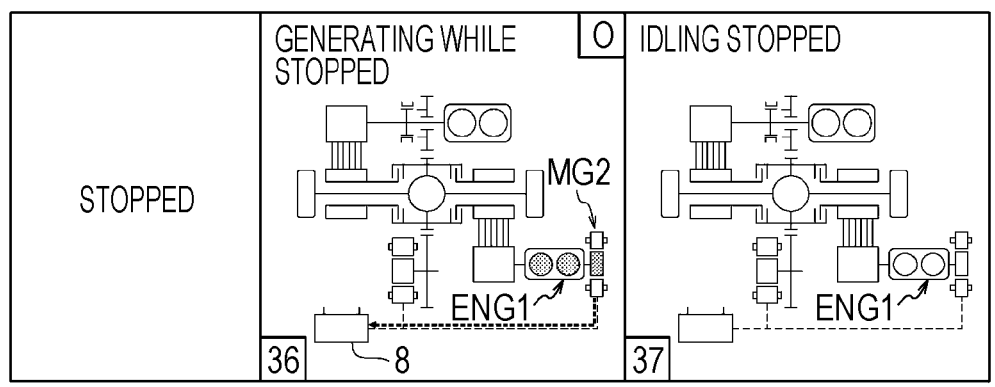
FIG. 36 is an explanatory diagram of control operations executed in accordance with the state of driving when stopped, with the drive system according to the embodiment.

Next, control operations for when stopped will be described with reference to FIG. 36.

(36) When the vehicle is stopped and idling, the operation pattern is switched to operation pattern O, where the first engine ENG1 alone is driven, and electricity is generated with the sub motor generator MG2 with the gear ratio of the first transmission TM1 at infinity for example, such that the driving force is not transmitted to the rotationally driven member 11, thereby charging the battery 8 with the generated electricity.

(37) Also, when idling is stopped, and power sources are stopped.

Second Embodiment

With the flowchart shown in FIG. 9 that is executed in the first embodiment described above, a case was described in which first, the gear ratio is changed to infinity using the inertia force at the first engine ENG1 side, following which, in the event that there is still remaining power at the first engine ENG1 side, the inertia of the rotations thereof are used to generate at the sub motor generator MG2. However, an arrangement may be made wherein changing of gear ratio and regeneration are performed in parallel, as with the second embodiment described next.

The flow of control will be described following the flowchart in FIG. 38 and the time chart in FIG. 39. With this embodiment as well, regeneration of inertia of the vehicle when decelerating is performed using the main motor generator MG1, and regeneration of inertia of the force transmission system from the crankshaft S1 of the first engine ENG1 up to the input member 122 of the first one-way clutch OWC1 is performed at the sub motor generator MG2.

Figure 38:
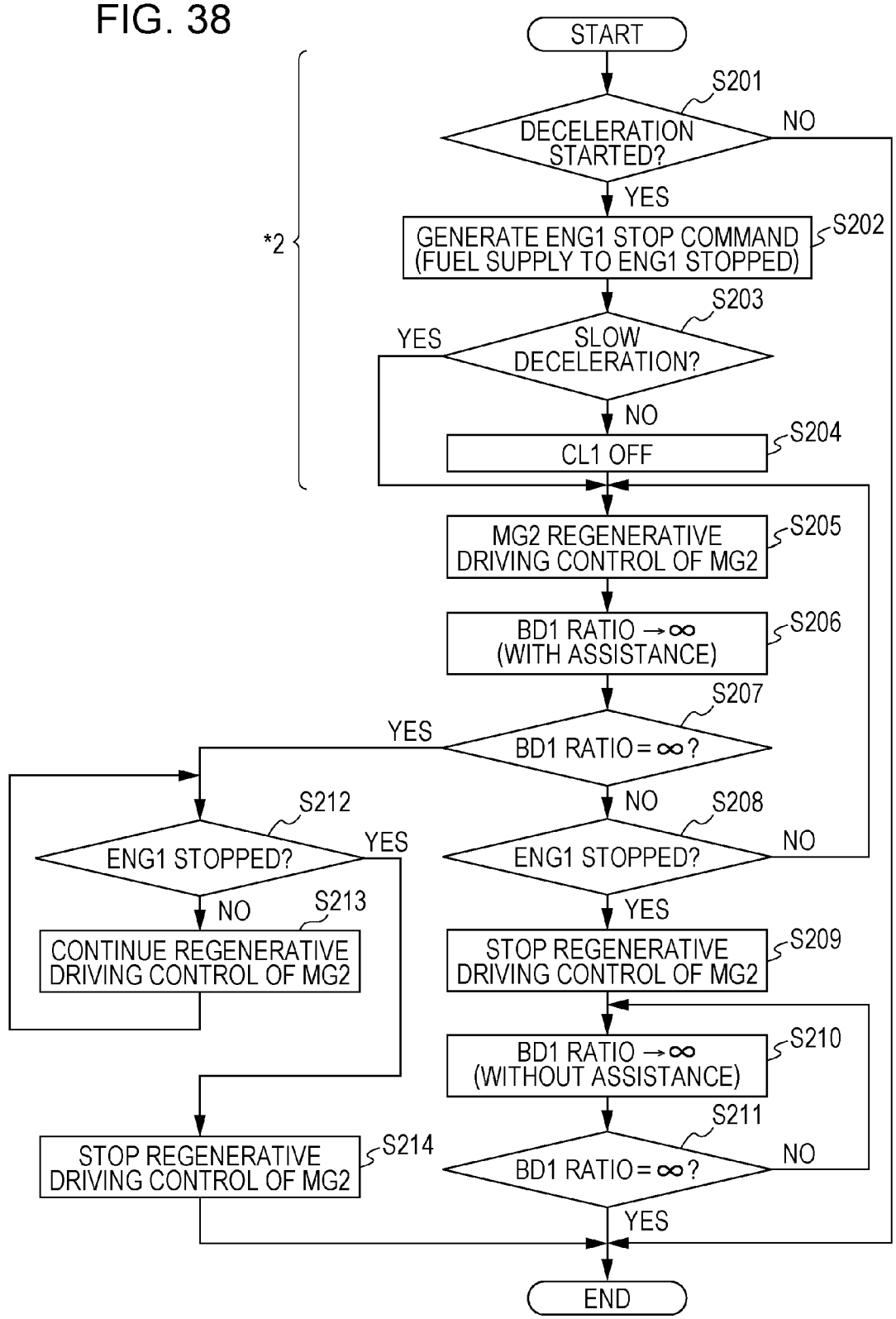
FIG. 38 is a flowchart illustrating clutch mechanism cutoff control performed during deceleration regeneration, according to a second embodiment of the present invention.

The flowchart in FIG. 38 illustrates the control performed regarding the driving system at the first engine ENG1 side when the vehicle decelerates.

In step S201 which is the first step, confirmation is made regarding whether or not deceleration has been started. Whether or not deceleration has been started is determined by, for example, the opening angle of the throttle, whether or not the brake pedal has been depressed, and so forth. In the event the deceleration has not been started, the processing ends. In the event that deceleration has been started, the flow advances to step S202.

In step S202, a stop command is generated for the first engine ENG1. Examples of a stop command for the first engine ENG1 includes a command to stop supplying fuel to the first engine ENG1.

In step S203, determination is made regarding whether the degree of deceleration is slow or rapid. In the event of rapid deceleration, the flow advances to step S204.

In step S204, the first clutch mechanism CL1 is turned off, and the flow advances to step S205.

On the other hand, in the event that determination is made in step S203 that deceleration is slow, there is a high chance that demand for driving will come quickly, so step S204 in which the first clutch mechanism CL1 is turned off is skipped, and the flow advances to step S205.

Regardless of whether the clutch mechanism CL1 is on or off, regenerative driving is performed with the sub motor generator MG2 in step S205.

Also, in parallel with this, in step S206 processing is performed to change the gear ratio of the first infinity variable transmission BD1 to infinity. As described above, the gear ratio of the first infinity variable transmission BD1 is changed to infinity by using the inertia of the force transmitting components from the first engine ENG1 to the input member 122 of the first one-way clutch OWC1 as assisting force.

In step S207 determination is made regarding whether or not the gear ratio of the first infinity variable transmission BD1 has reached infinity. In the event that determination is made that the gear ratio of the first infinity variable transmission BD1 has not reached infinity, the flow advances to step S208.

In step S208, determination is made regarding whether or not the first engine ENG1 has stopped. In the event that determination is made that the first engine ENG1 has completely stopped, the flow advances to step S209. Otherwise, the flow loops back to step S205, and the loop of steps S205 through S208 are repeated until a result of YES is obtained in step S208.

If the flow has advances to step S209, this means that the first engine ENG1 has stopped in a state without the gear ratio having reached infinity. In this case, regenerative driving of the sub motor generator MG2 ends, and the flow advances to step S210.

In step S210 the gear ratio of the infinity variable transmission BD1 is set to infinity using the actuator 180, without assistance from the inertia of the first engine ENG1, and the flow advances to step S211.

In step S211, determination is made regarding whether or not the gear ratio of the infinity variable transmission BD1 has reached infinity. In the event that determination is made here that the gear ratio has reached infinity, the flow ends. Otherwise, the flow loops back to step S210, and the loop of steps S210 and S211 is repeated until determination is made that the gear ratio has reached infinity.

On the other hand, in the event that determination is made in step S207 within the loop of steps S205 through S208 that the gear ratio has reached infinity, the flow branches to step S212.

In step S212, determination is made regarding whether or not the first engine ENG1 has actually stopped and is no longer rotating. In the event that determination is made that the first engine ENG1 has not stopped and is still rotating, the flow advances to step S213. On the other hand, in the event that determination is made that the first engine ENG1 has completely stopped, the flow advances to step S214.

In step S213, regenerative driving with the sub motor generator MG2 is continued, and the flow loops back to step S212. This loop is repeated until a result of YES is obtained in step S212.

In step S214, regenerative driving with the sub motor generator MG2 is stopped and the processing ends.

Figure 39:
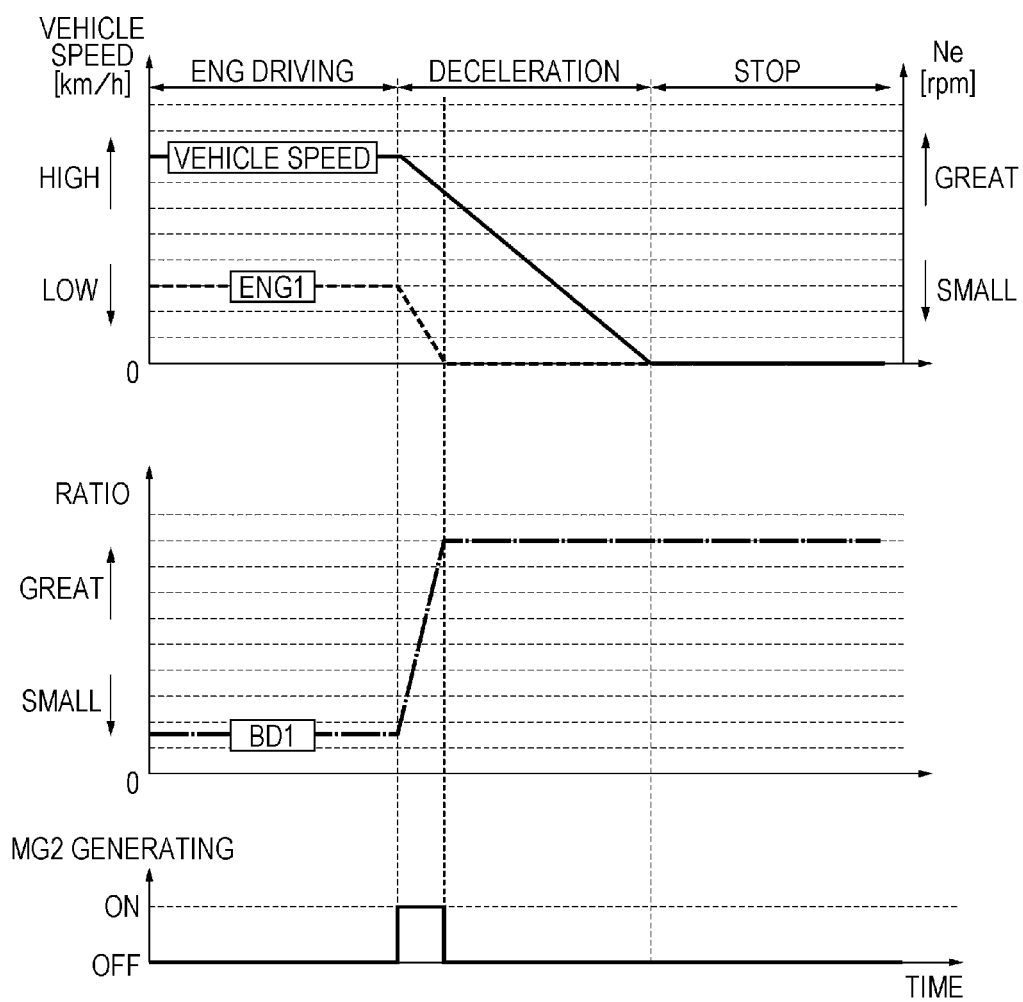
FIG. 39 is a time chart illustrating the control performed.

Looking at the above flow on the time chart in FIG. 39, first, upon deceleration being started in the state of driving with an engine (the first engine ENG1 in this case), the vehicle decelerates. Also, due to stopping control of the first engine ENG1 (cutting off fuel) being performed at the same time as starting deceleration, the rotations of the engine drop. At this time, the rotations of the input member 122 of the first one-way clutch OWC1 drop below the rotations of the output member 121 due to the rotations of the first engine ENG1 dropping, so the first one-way clutch OWC1 is in a disengaged state, and the upstream side of the first one-way clutch OWC1 is cut off from the downstream side.

Accordingly, the inertia from the crankshaft S1 of the first engine ENG1 up to the input member 122 of the first one-way clutch OWC1 is used to change the gear ratio of the infinity variable transmission BD1 making up the first transmission TM1 to infinity. At the same time, in parallel, the inertia of the range from the crankshaft S1 of the first engine ENG1 up to the input member 122 of the first one-way clutch OWC1 is regenerated by generating driving of the sub motor generator MG2, thereby recovering the energy in the form of electricity.

With the first infinity variable transmission BD1 according to the present embodiment, in the event that the gear ratio has been established at a certain finite value, this means that the eccentric disc 104 at the input shaft 101 side has been performing eccentric rotation and the load on the bearings 102 and 103 bearing the input shaft 101 are increased according to the amount of eccentricity. Accordingly, changing the gear ratio to infinity allows the load on the bearings to be reduced, and energy which had been discarded as friction loss can be recovered. Also, using the inertia from the first engine ENG1 to the input member 122 of the first one-way clutch OWC1 as assisting force for driving operations of the actuator 180 to change the gear ratio of the first infinity variable transmission BD1 to infinity from the point that the engine stop command has been issued when decelerating up to the first engine ENG1 actually stopping enables reducing in energy for changing the gear ratio, so inertia from the first engine ENG1 to the input member 122 of the first one-way clutch OWC1 can be effectively used without waste.

Also, at the same time using the inertia from the crankshaft S1 of the first engine ENG1 up to the input member 122 of the first one-way clutch OWC1 as assisting force for driving operations to change the gear ratio, this is also regenerated as electric energy by the sub motor generator MG2, so the inertia from the from the first engine ENG1 to the input member 122 of the first one-way clutch OWC1 can be effectively used without waste.

Particularly, in the event of transitioning to generating after waiting for the gear ratio to change to infinity as with the first embodiment, inertia energy is excessively discarded due to the friction loss at the engine side during the time of transitioning to generating, but with the second embodiment, changing of the gear ratio and generating with the sub motor generator MG2 are performed in parallel, so the amount of energy that can be recovered is maximized.

Note that with the present embodiment as well, description has been made above regarding a case of changing the gear ratio to infinity, but a certain degree of the advantages thereof can be expected by changing the gear ratio to a value close to infinity, even if not all the way to infinity.

Figure 40:
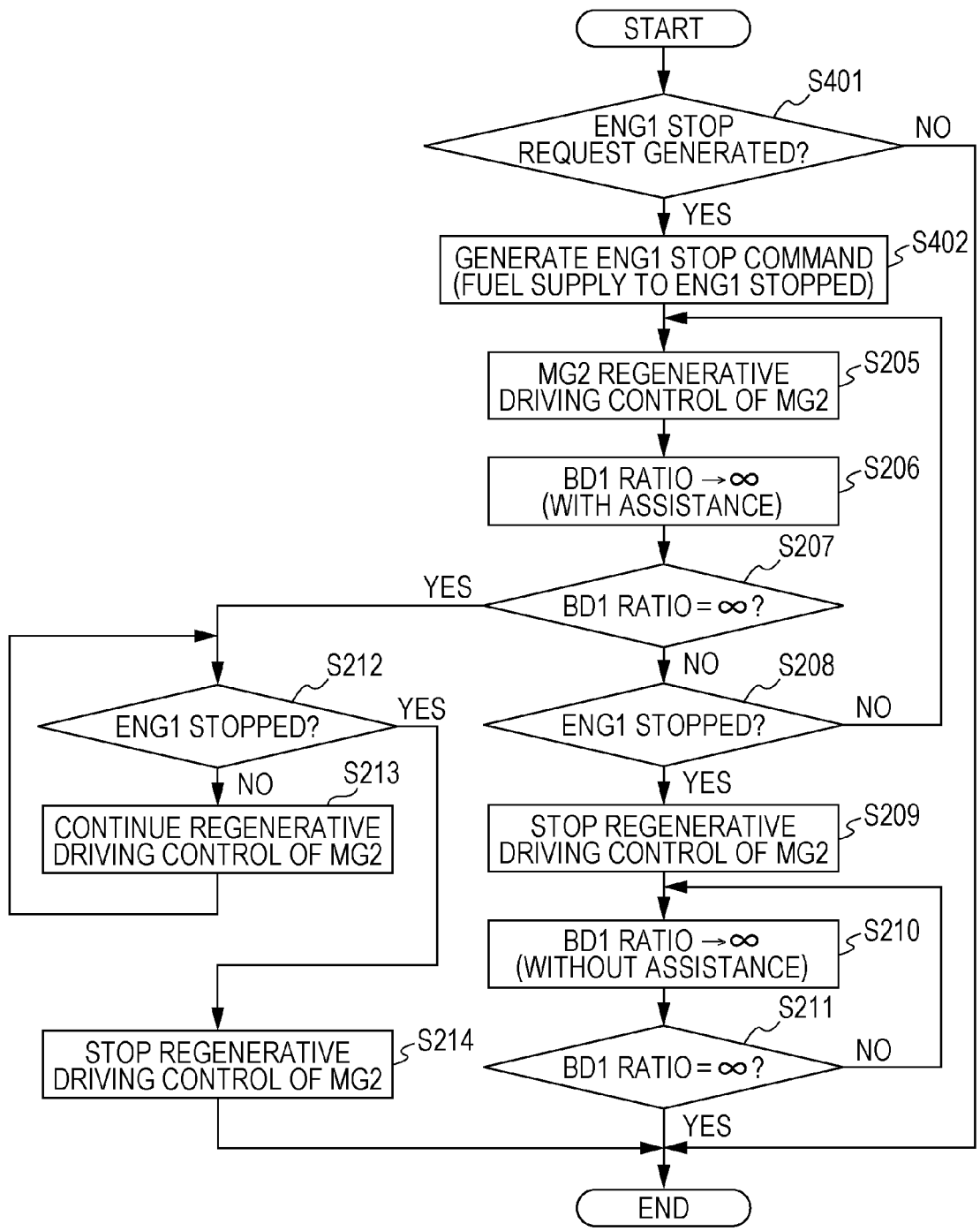
FIG. 40 is a flowchart illustrating the control performed when switching engines according to the second embodiment.

Also, in the same way as with the first embodiment, in the event of switching the driving source from the first engine ENG1 to the second engine ENG2 in which the first engine ENG1 is stopped, the inertia from the first engine ENG1 to the input member 122 of the first one-way clutch OWC1 can be used in the same way as with the case of deceleration, as shown in the flowchart in FIG. 40. The flowchart in FIG. 40 is for describing the control in this case, with the range indicated by *2 in FIG. 38 being replaced with steps S401 and S402, and the remainder of the flowchart is the same as with the case of FIG. 38.

In step S401, determination is made regarding whether or not a stop request for the first engine ENG1 has been generated. In the event that a stop request has been generated, the flow advances to step S402, and otherwise, the flow ends.

In step S402, an engine stop command is generated, and the flow proceeds to step S205. The processing in step S205 and the subsequent steps is the same as that described above with reference to FIG. 38, and accordingly redundant description will be omitted here.

Note that the present invention is not restricted to the above-described embodiments, and that various alterations, modifications, and the like may be made as appropriate. The materials, shapes, dimensions, numbers, locations, and so forth, of the components of the above-described embodiments are optionally selectable as long as the present invention can be carried out, and are not restricted.

For example, while the embodiments described above involve description of a case in which the present invention is applied to stopping an engine when decelerating or when switching the driving source from the first engine ENG1 to the second engine ENG2, the present invention is also applicable to a case of demand for stopping the engine for some other reason.

Figure 41:
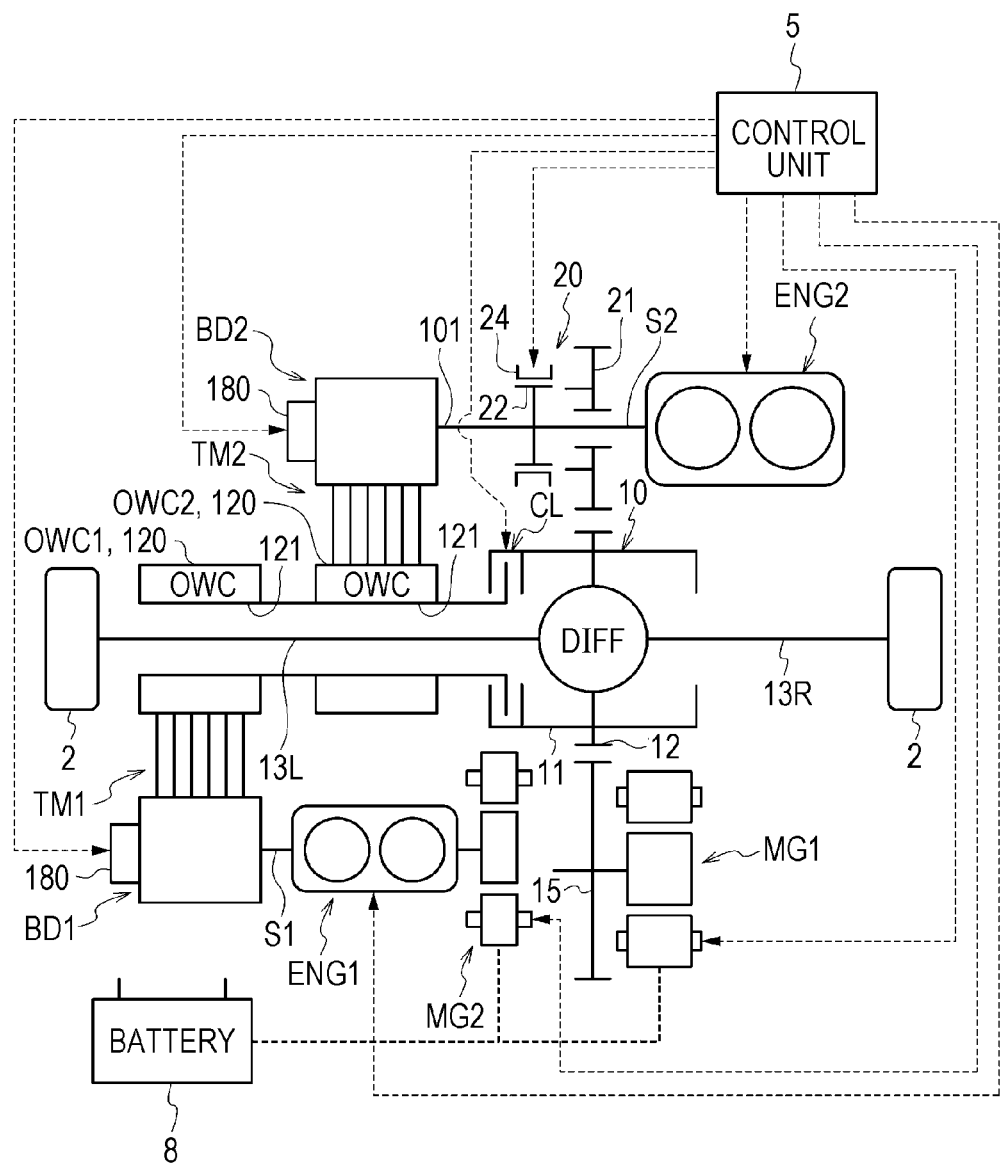
FIG. 41 is a skeleton drawing of an automobile drive system according to another embodiment of the present invention.

Also, with the above embodiments, an arrangement has been described wherein the first one-way clutch OWC1 and second one-way clutch OWC2 are disposed on the left and right sides of the differential device 10, and the output members 121 of the first and second one-way clutches OWC1 and OWC2 are connected to the rotationally driven member 11 via the clutch mechanisms CL1 and CL2, but an arrangement may be made such as shown in FIG. 41 wherein the first and second one-way clutches OWC1 and OWC2 are disposed on one side of the differential device 10, and the output members thereof are linked and then connected to the rotationally driven member 11 through a single clutch mechanism CL.

Also, while description has been made with the above embodiments regarding a configuration having two engines ENG1 and ENG2, two transmissions TM1 and TM2, two one-way clutches OWC1 and OWC2, two motor generators MG1 and MG2, and two clutch mechanisms CL1 and CL2, the present invention is also applicable to a configuration having one each of an engine, transmission, one-way clutch, and clutch mechanism.

Also, the main motor generator MG1 may be of a configuration to provide rotational force to the driving wheels 2 driven by the engines ENG1 and ENG2 as with the above embodiments, or may be of a configuration to provide rotational force to other driving wheels 2B (the rear wheels in the event that the driving wheels 2 are the front wheels, and the front wheels in the event that the driving wheels 2 are the rear wheels).

Further, while a configuration has been described in the embodiments having two engines and two transmissions, a configuration may be used having three or more engines and three or more transmissions. Also, the engines may be a combination of different types, including diesel, hydrogen, and gasoline.

An automobile driving system (e.g., a driving system 1 in the later-described embodiments) according to an embodiment of the invention includes: an engine (e.g., an first engine ENG1 and/or second engine ENG2 in the later-described embodiments) configured to generate rotational force; a transmission (e.g., a first transmission TM1 and/or second transmission TM2 in the later-described embodiments) configured to shift and output the rotational force generated at the engine; a one-way clutch (e.g., a first one-way clutch OWC1 and/or second one-way clutch OWC2 in the later-described embodiments) situated at an output portion of the transmission, including an input member (e.g., an input member 122 in the later-described embodiments), an output member (e.g., an output member 121 in the later-described embodiments), and an engaging member (e.g., a roller 123 in the later-described embodiments) configured to place the input member and the output member into a locked state or an unlocked state, configured such that, in the event that positive rotational speed of the input member exceeds the positive rotational speed of the output member upon receiving rotational force from the transmission, the input member and the output member are placed in a locked state, thereby transmitting to the output member the rotational force input to the input member; driving wheels (e.g., driving wheels 2 in the later-described embodiments); a rotationally driven member (e.g., a rotationally driven member 11 in the later-described embodiments) linked to the output member of the one-way clutch, configured to transmit the rotational force transmitted to the output member to the driving wheels, and to integrally rotate with the driving wheels; an engine stopping control unit (e.g., a control unit 5 in the later-described embodiments) configured to effect control to stop the engine in the event that an engine stopping request is generated; and a transmission-and-control unit (e.g., infinity variable transmissions BD1 and/or BD2 and control unit 5 in the later-described embodiments); the transmission being configured as a four-bar linkage mechanism type infinity variable transmission (e.g., infinity variable transmissions BD1 and/or BD2) in the later-described embodiments) including an input shaft (e.g., input shaft 101 in the later-described embodiments) configured to rotate on an input center axial line (e.g., an input center axial line O1 in the later-described embodiments) by receiving rotational force, a plurality of first supporting points (e.g., first support points O3 in the later-described embodiments) provided at equal intervals in the circumferential direction of the input shaft, so as to rotate around the input center axial line along with the input shaft while each maintaining a variable eccentricity (e.g., eccentricity r1 in the later-described embodiments) as to the input center axial line, a plurality of eccentric discs (e.g., eccentric discs 104 in the later-described embodiments), each having the first supporting points as the center thereof, configured to rotate around the input center axial line, a one-way clutch (e.g., a one-way clutch 120 in the later-described embodiments) including an output member (e.g., an output member 121 in the later-described embodiments) configured to rotate around an output center axial line (e.g., an output center axial line O2) which is distanced from the input center axial line, an input member (e.g., an input member 122 in the later-described embodiments) configured to oscillate around the output center axial line by receiving external rotational force, and an engaging member (e.g., a roller 123 in the later-described embodiments) configured to place the input member and the output member into a locked state or an unlocked state, configured such that, in the event that positive rotational speed of the input member exceeds the positive rotational speed of the output member, the rotational force input to the input member is transmitted to the output member, thereby converting oscillating motion of the input member into rotational motion of the output member, a second supporting point (e.g., a second supporting point O4 in the later-described embodiments) provided on the input member at a position distanced from the output center axial line, a plurality of linking members (e.g., linking members 130 in the later-described embodiments) rotatably linked at one end (e.g., a ring portion 131 in the later-described embodiments) thereof to the first supporting points on the perimeter of the eccentric discs, and the other end (e.g., an other end portion 132 in the later-described embodiments) rotatably linked to the second supporting point provided on the input member of the one-way clutch, such that rotational motion provided from the input shaft to the eccentric discs is transmitted to the input member of the one-way clutch as oscillating motion of the input member, and a variable gear ratio mechanism (e.g., a variable gear mechanism 112 in the later-described embodiments), configured to change an angle of oscillation of oscillating motion transmitted from the eccentric discs to the input member of the one-way clutch by adjusting the eccentricity of the first supporting points as to the input center axial line, thereby changing the gear ratio at the time of rotational force input to the input shaft being transmitted to the output member of the one-way clutch via the eccentric discs and the linking members as rotational force, wherein the gear ratio of the transmission can be set to infinity by setting the eccentricity to zero; and wherein the output shaft (e.g., an output shaft S1 in the later-described embodiments) of the engine is linked to the input shaft of the infinity variable transmission; and wherein the one-way clutch which is a component of the infinity variable transmission also serves as the one-way clutch provided between the transmission and the rotationally driven member; and wherein, at the time of the engine stopping control unit effecting control to stop the engine, the transmission-and-control unit uses inertia from the engine up to the input member of the one-way clutch as assisting force for driving operations of the variable gear ratio mechanism to change the gear ratio at the transmission to infinity or close to infinity, until the engine actually stops. Accordingly, inertia from the engine to the input member of the one-way clutch can be used effectively without waste.

An automobile driving system according to another embodiment of the present invention includes: an engine configured to generate rotational force; a transmission configured to shift and output the rotational force generated at the engine; a one-way clutch situated at an output portion of the transmission, including an input member, an output member, and an engaging member configured to place the input member and the output member into a locked state or an unlocked state, configured such that, in the event that positive rotational speed of the input member exceeds the positive rotational speed of the output member upon receiving rotational force from the transmission, the input member and the output member are placed in a locked state, thereby transmitting to the output member the rotational force input to the input member; driving wheels; a rotationally driven member linked to the output member of the one-way clutch, configured to transmit the rotational force transmitted to the output member to the driving wheels, and to integrally rotate with the driving wheels; a motor generator connected to the output shaft of the engine; a motor generator control unit (e.g., the control unit 5 in the later-described embodiments); and an engine stopping control unit configured to effect control to stop the engine in the event that an engine stopping request is generated; the transmission being configured as a four-bar linkage mechanism type infinity variable transmission including an input shaft configured to rotate on an input center axial line by receiving rotational force, a plurality of first supporting points provided at equal intervals in the circumferential direction of the input shaft, so as to rotate around the input center axial line along with the input shaft while each maintaining a variable eccentricity as to the input center axial line, a plurality of eccentric discs, each having the first supporting points as the center thereof, configured to rotate around the input center axial line, a one-way clutch including an output member configured to rotate around an output center axial line which is distanced from the input center axial line, an input member configured to oscillate around the output center axial line by receiving external rotational force, and an engaging member configured to place the input member and the output member into a locked state or an unlocked state, configured such that, in the event that positive rotational speed of the input member exceeds the positive rotational speed of the output member, the rotational force input to the input member is transmitted to the output member, thereby converting oscillating motion of the input member into rotational motion of the output member, a second supporting point provided on the input member at a position distanced from the output center axial line, a plurality of linking members rotatably linked at one end thereof to the first supporting points on the perimeter of the eccentric discs, and the other end rotatably linked to the second supporting point provided on the input member of the one-way clutch, such that rotational motion provided from the input shaft to the eccentric discs is transmitted to the input member of the one-way clutch as oscillating motion of the input member, and a variable gear ratio mechanism, configured to change an angle of oscillation of oscillating motion transmitted from the eccentric discs to the input member of the one-way clutch by adjusting the eccentricity of the first supporting points as to the input center axial line, thereby changing the gear ratio at the time of rotational force input to the input shaft being transmitted to the output member of the one-way clutch via the eccentric discs and the linking members as rotational force, wherein the gear ratio of the transmission can be set to infinity by setting the eccentricity to zero; and wherein the output shaft of the engine is linked to the input shaft of the infinity variable transmission; and wherein the one-way clutch which is a component of the infinity variable transmission also serves as the one-way clutch provided between the transmission and the rotationally driven member; and wherein, at the time of the engine stopping control unit effecting control to stop the engine, the motor generator control unit regenerates inertia from the engine up to the input member of the one-way clutch as electric energy using the motor generator, until the engine actually stops. Accordingly, inertia from the engine to the input member of the one-way clutch can be used effectively without waste.

An automobile driving system according to another embodiment of the present invention includes: an engine configured to generate rotational force; a transmission configured to shift and output the rotational force generated at the engine; a one-way clutch situated at an output portion of the transmission, including an input member, an output member, and an engaging member configured to place the input member and the output member into a locked state or an unlocked state, configured such that, in the event that positive rotational speed of the input member exceeds the positive rotational speed of the output member upon receiving rotational force from the transmission, the input member and the output member are placed in a locked state, thereby transmitting to the output member the rotational force input to the input member; driving wheels; a rotationally driven member linked to the output member of the one-way clutch, configured to transmit the rotational force transmitted to the output member to the driving wheels, and to integrally rotate with the driving wheels; a motor generator connected to the output shaft of the engine; a motor generator control unit; an engine stopping control unit configured to effect control to stop the engine in the event that an engine stopping request is generated; and a transmission-and-control unit; the transmission being configured as a four-bar linkage mechanism type infinity variable transmission including an input shaft configured to rotate on an input center axial line by receiving rotational force, a plurality of first supporting points provided at equal intervals in the circumferential direction of the input shaft, so as to rotate around the input center axial line along with the input shaft while each maintaining a variable eccentricity as to the input center axial line, a plurality of eccentric discs, each having the first supporting points as the center thereof, configured to rotate around the input center axial line, a one-way clutch including an output member configured to rotate around an output center axial line which is distanced from the input center axial line, an input member configured to oscillate around the output center axial line by receiving external rotational force, and an engaging member configured to place the input member and the output member into a locked state or an unlocked state, configured such that, in the event that positive rotational speed of the input member exceeds the positive rotational speed of the output member, the rotational force input to the input member is transmitted to the output member, thereby converting oscillating motion of the input member into rotational motion of the output member, a second supporting point provided on the input member at a position distanced from the output center axial line, a plurality of linking members rotatably linked at one end thereof to the first supporting points on the perimeter of the eccentric discs, and the other end rotatably linked to the second supporting point provided on the input member of the one-way clutch, such that rotational motion provided from the input shaft to the eccentric discs is transmitted to the input member of the one-way clutch as oscillating motion of the input member, and a variable gear ratio mechanism, configured to change an angle of oscillation of oscillating motion transmitted from the eccentric discs to the input member of the one-way clutch by adjusting the eccentricity of the first supporting points as to the input center axial line, thereby changing the gear ratio at the time of rotational force input to the input shaft being transmitted to the output member of the one-way clutch via the eccentric discs and the linking members as rotational force, wherein the gear ratio of the transmission can be set to infinity by setting the eccentricity to zero; and wherein the output shaft of the engine is linked to the input shaft of the infinity variable transmission; and wherein the one-way clutch which is a component of the infinity variable transmission also serves as the one-way clutch provided between the transmission and the rotationally driven member; and wherein, at the time of the engine stopping control unit effecting control to stop the engine, the transmission-and-control unit uses inertia from the engine up to the input member of the one-way clutch as assisting force for driving operations of the variable gear ratio mechanism to change the gear ratio at the transmission to infinity or close to infinity, and the motor generator control unit regenerates inertia from the engine up to the input member of the one-way clutch as electric energy using the motor generator, until the engine actually stops. Accordingly, inertia from the engine to the input member of the one-way clutch can be used effectively without waste.

At the time of the engine stopping control unit effecting control to stop the engine, the generator control unit may use inertia from the engine up to the input member of the one-way clutch as assisting force for driving operations of the variable gear ratio mechanism, and then subsequently regenerate the inertia as electric energy using the motor generator, until the engine actually stops. Accordingly, inertia from the engine to the input member of the one-way clutch can be used effectively.

At the time of the engine stopping control unit effecting control to stop the engine, the generator control unit may use inertia from the engine up to the input member of the one-way clutch as assisting force for driving operations of the variable gear ratio mechanism, and in parallel therewith, regenerate the inertia as electric energy using the motor generator, until the engine actually stops.

According to this configuration, the recovered inertia energy of the engine and transmission can be maximized. That is to say, in the event that the gear ratio has been established at a certain finite value, the eccentric disc at the input shaft side has been performing eccentric rotation and the load on the bearings bearing the input shaft are increased according to the amount of eccentricity. Accordingly, changing the gear ratio to infinity or a value close to infinity allows the load on the bearings to be reduced, and energy which had been discarded as friction loss can be recovered, whereas performing generating after the gear ratio changes to infinity or near infinity, inertia energy will go to waste due to friction loss at the engine side during that time. This is why the recovered inertia energy of the engine and transmission can be maximized by changing the gear ratio and generating electricity with the sub motor generator.

According to another embodiment of the present invention, with a control method of an automobile driving system, including an engine configured to generate rotational force, a transmission configured to shift and output the rotational force generated at the engine, a one-way clutch situated at an output portion of the transmission, including an input member, an output member, and an engaging member configured to place the input member and the output member into a locked state or an unlocked state, configured such that, in the event that positive rotational speed of the input member exceeds the positive rotational speed of the output member upon receiving rotational force from the transmission, the input member and the output member are placed in a locked state, thereby transmitting to the output member the rotational force input to the input member, driving wheels, a rotationally driven member linked to the output member of the one-way clutch, configured to transmit the rotational force transmitted to the output member to the driving wheels, and to integrally rotate with the driving wheels, a motor generator connected to the output shaft of the engine, a motor generator control unit, an engine stopping control unit configured to effect control to stop the engine in the event that an engine stopping request is generated, and a transmission-and-control unit, the transmission being configured as a four-bar linkage mechanism type infinity variable transmission including an input shaft configured to rotate on an input center axial line by receiving rotational force, a plurality of first supporting points provided at equal intervals in the circumferential direction of the input shaft, so as to rotate around the input center axial line along with the input shaft while each maintaining a variable eccentricity as to the input center axial line, a plurality of eccentric discs, each having the first supporting points as the center thereof, configured to rotate around the input center axial line, a one-way clutch including an output member configured to rotate around an output center axial line which is distanced from the input center axial line, an input member configured to oscillate around the output center axial line by receiving external rotational force, and an engaging member configured to place the input member and the output member into a locked state or an unlocked state, configured such that, in the event that positive rotational speed of the input member exceeds the positive rotational speed of the output member, the rotational force input to the input member is transmitted to the output member, thereby converting oscillating motion of the input member into rotational motion of the output member, a second supporting point provided on the input member at a position distanced from the output center axial line, a plurality of linking members rotatably linked at one end thereof to the first supporting points on the perimeter of the eccentric discs, and the other end rotatably linked to the second supporting point provided on the input member of the one-way clutch, such that rotational motion provided from the input shaft to the eccentric discs is transmitted to the input member of the one-way clutch as oscillating motion of the input member, and a variable gear ratio mechanism, configured to change an angle of oscillation of oscillating motion transmitted from the eccentric discs to the input member of the one-way clutch by adjusting the eccentricity of the first supporting points as to the input center axial line, thereby changing the gear ratio at the time of rotational force input to the input shaft being transmitted to the output member of the one-way clutch via the eccentric discs and the linking members as rotational force, in which the gear ratio of the transmission can be set to infinity by setting the eccentricity to zero, the output shaft of the engine is linked to the input shaft of the infinity variable transmission, and the one-way clutch which is a component of the infinity variable transmission also serves as the one-way clutch provided between the transmission and the rotationally driven member, the method includes the steps of: using, with the transmission-and-control unit, inertia from the engine up to the input member of the one-way clutch as assisting force for driving operations of the variable gear ratio mechanism to change the gear ratio at the transmission to infinity or close to infinity, at the time of the engine stopping control unit effecting control to stop the engine; regenerating, with the motor generator control unit, inertia from the engine up to the input member of the one-way clutch as electric energy using the motor generator, at the time of the engine stopping control unit effecting control to stop the engine; until the engine actually stops. Accordingly, inertia from the engine to the input member of the one-way clutch can be used effectively without waste.

At the time of the engine stopping control unit effecting control to stop the engine, in the event that there is remaining inertia after using inertia from the engine up to the input member of the one-way clutch as assisting force for driving operations of the variable gear ratio mechanism, the inertia may be regenerated as electric energy using the motor generator, until the engine actually stops. Accordingly, inertia from the engine to the input member of the one-way clutch can be used effectively without waste.

At the time of the engine stopping control unit effecting control to stop the engine, inertia from the engine up to the input member of the one-way clutch may be used as assisting force for driving operations of the variable gear ratio mechanism, and in parallel therewith, the inertia may be regenerated as electric energy using the motor generator, until the engine actually stops.

According to this configuration as well, the recovered inertia energy of the engine and transmission can be maximized, for the same reason as with that described above.

Obviously, numerous modifications and variations of the present invention are possible in light of the above teachings. It is therefore to be understood that within the scope of the appended claims, the invention may be practiced otherwise than as specifically described herein.

What is claimed is:

1. An automobile driving system comprising:
   an engine to generate rotational force;
   a transmission to shift and output the rotational force generated by said engine;
   a one-way clutch provided at an output portion of said transmission and comprising:
     an input member;
     an output member; and
     an engaging member to place said input member and said output member into a locked state or an unlocked state, in the event that positive rotational speed of said input member exceeds positive rotational speed of said output member upon receiving rotational force from said transmission, said input member and said output member being placed in the locked state to transmit the rotational force input to said input member to said output member;
   driving wheels;
   a rotationally driven member to rotate integrally with said driving wheels and connected to said output member of said one-way clutch to transmit the rotational force transmitted to said output member to said driving wheels;
   an engine stopping controller configured to stop said engine in the event that an engine stopping request is generated; and
   a transmission-and-control device;
   said transmission including a four-bar linkage mechanism infinity variable transmission comprising:
     an input shaft to rotate on an input center axial line by receiving rotational force;
     a plurality of first supporting points provided at equal intervals in a circumferential direction of said input shaft so as to rotate around said input center axial line along with said input shaft while each maintaining a variable eccentricity as to said input center axial line;
     a plurality of eccentric discs, each having said first supporting points as a center thereof to rotate around said input center axial line;
     the one-way clutch comprising:
       the output member to rotate around an output center axial line which is distanced from said input center axial line;
       the input member to oscillate around said output center axial line by receiving external rotational force; and
       the engaging member to place said input member and said output member into a locked state or an unlocked state, in the event that positive rotational speed of said input member exceeds the positive rotational speed of said output member, the rotational force input to said input member being transmitted to said output member to convert oscillating motion of said input member into rotational motion of said output member;
     a second supporting point provided on said input member at a position distanced from said output center axial line;
     a plurality of linking members rotatably linked at one end thereof to said first supporting points on the perimeter of said eccentric discs and another end rotatably linked to said second supporting point provided on said input member of said one-way clutch, such that rotational motion provided from said input shaft to said eccentric discs is transmitted to said input member of said one-way clutch as oscillating motion of said input member; and
     a variable gear ratio mechanism to change an angle of oscillation of oscillating motion transmitted from said eccentric discs to the input member of said one-way clutch by adjusting the eccentricity of said first supporting points as to said input center axial line, thereby changing a gear ratio at a time of rotational force input to said input shaft being transmitted to said output member of said one-way clutch via said eccentric discs and said linking members as rotational force,
   wherein the gear ratio of said transmission can be set to infinity by setting said eccentricity to zero,
   wherein an output shaft of said engine is linked to the input shaft of said infinity variable transmission,
   wherein said one-way clutch which is a component of said infinity variable transmission also serves as said one-way clutch provided between said transmission and said rotationally driven member, and
   wherein, at a time of said engine stopping controller controlling to stop said engine, said transmission-and-control device uses inertia from said engine up to the input member of said one-way clutch as assisting force for driving operations of said variable gear ratio mechanism to change the gear ratio at said transmission to infinity or close to infinity, before said engine actually stops.

2. An automobile driving system comprising:
   an engine to generate rotational force;
   a transmission to shift and output the rotational force generated by said engine;
   a one-way clutch provided at an output portion of said transmission and comprising:
     an input member;
     an output member; and
     an engaging member to place said input member and said output member into a locked state or an unlocked state, in the event that positive rotational speed of said input member exceeds positive rotational speed of said output member upon receiving rotational force from said transmission, said input member and said output member being placed in the locked state to transmit the rotational force input to said input member to said output member;
driving wheels;
a rotationally driven member to rotate integrally with said driving wheels and connected to said output member of said one-way clutch to transmit the rotational force transmitted to said output member to said driving wheels;
a motor generator connected to an output shaft of said engine;
a motor generator controller;
an engine stopping controller configured to stop said engine in the event that an engine stopping request is generated; and
a transmission-and-control device;
said transmission including a four-bar linkage mechanism infinity variable transmission comprising:
an input shaft to rotate on an input center axial line by receiving rotational force;
a plurality of first supporting points provided at equal intervals in a circumferential direction of said input shaft so as to rotate around said input center axial line along with said input shaft while each maintaining a variable eccentricity as to said input center axial line;
a plurality of eccentric discs, each having said first supporting points as a center thereof to rotate around said input center axial line;
the one-way clutch comprising:
the output member to rotate around an output center axial line which is distanced from said input center axial line;
the input member to oscillate around said output center axial line by receiving external rotational force; and
the engaging member to place said input member and said output member into a locked state or an unlocked state, in the event that positive rotational speed of said input member exceeds the positive rotational speed of said output member, the rotational force input to said input member being transmitted to said output member to convert oscillating motion of said input member into rotational motion of said output member;
a second supporting point provided on said input member at a position distanced from said output center axial line;
a plurality of linking members rotatably linked at one end thereof to said first supporting points on the perimeter of said eccentric discs and another end rotatably linked to said second supporting point provided on said input member of said one-way clutch, such that rotational motion provided from said input shaft to said eccentric discs is transmitted to said input member of said one-way clutch as oscillating motion of said input member; and
a variable gear ratio mechanism to change an angle of oscillation of oscillating motion transmitted from said eccentric discs to the input member of said one-way clutch by adjusting the eccentricity of said first supporting points as to said input center axial line, thereby changing a gear ratio at a time of rotational force input to said input shaft being transmitted to said output member of said one-way clutch via said eccentric discs and said linking members as rotational force,
wherein the gear ratio of said transmission can be set to infinity by setting said eccentricity to zero,
wherein the output shaft of said engine is linked to the input shaft of said infinity variable transmission,
wherein said one-way clutch which is a component of said infinity variable transmission also serves as said one-way clutch provided between said transmission and said rotationally driven member, and
wherein, at a time of said engine stopping controller controlling to stop said engine, said transmission-and-control device uses inertia from said engine up to the input member of said one-way clutch as assisting force for driving operations of said variable gear ratio mechanism to change the gear ratio at said transmission to infinity or close to infinity, and said motor generator controller regenerates electric energy from inertia from said engine up to the input member of said one-way clutch using said motor generator, before said engine actually stops.

3. The automobile driving system according to claim 2, wherein, at the time of said engine stopping controller controlling to stop said engine, said motor generator controller uses inertia from said engine up to the input member of said one-way clutch as assisting force for driving operations of said variable gear ratio mechanism, and then subsequently regenerates electric energy from the inertia using said motor generator, before said engine actually stops.

4. The automobile driving system according to claim 2, wherein, at the time of said engine stopping controller controlling to stop said engine, said motor generator controller uses inertia from said engine up to the input member of said one-way clutch as assisting force for driving operations of said variable gear ratio mechanism, and in parallel therewith, regenerates electric energy from the inertia using said motor generator, before said engine actually stops.

5. A control method of an automobile driving system, the automobile driving system comprising:
an engine to generate rotational force;
a transmission to shift and output the rotational force generated by said engine;
a one-way clutch provided at an output portion of said transmission and comprising:
an input member;
an output member; and
an engaging member to place said input member and said output member into a locked state or an unlocked state, in the event that positive rotational speed of said input member exceeds positive rotational speed of said output member upon receiving rotational force from said transmission, said input member and said output member being placed in the locked state to transmit the rotational force input to said input member to said output member;
driving wheels;
a rotationally driven member to rotate integrally with said driving wheels and connected to said output member of said one-way clutch to transmit the rotational force transmitted to said output member to said driving wheels;
a motor generator connected to an output shaft of said engine;
a motor generator controller;
an engine stopping controller configured to stop said engine in the event that an engine stopping request is generated; and
a transmission-and-control device;
said transmission including a four-bar linkage mechanism infinity variable transmission comprising:
an input shaft to rotate on an input center axial line by receiving rotational force;

a plurality of first supporting points provided at equal intervals in a circumferential direction of said input shaft so as to rotate around said input center axial line along with said input shaft while each maintaining a variable eccentricity as to said input center axial line;

a plurality of eccentric discs, each having said first supporting points as a center thereof to rotate around said input center axial line;

the one-way clutch comprising:

the output member to rotate around an output center axial line which is distanced from said input center axial line;

the input member to oscillate around said output center axial line by receiving external rotational force; and the engaging member to place said input member and said output member into the locked state or the unlocked state, in the event that positive rotational speed of said input member exceeds the positive rotational speed of said output member, the rotational force input to said input member being transmitted to said output member to convert oscillating motion of said input member into rotational motion of said output member;

a second supporting point provided on said input member at a position distanced from said output center axial line;

a plurality of linking members rotatably linked at one end thereof to said first supporting points on the perimeter of said eccentric discs and another end rotatably linked to said second supporting point provided on said input member of said one-way clutch, such that rotational motion provided from said input shaft to said eccentric discs is transmitted to said input member of said one-way clutch as oscillating motion of said input member; and a variable gear ratio mechanism to change an angle of oscillation of oscillating motion transmitted from said eccentric discs to the input member of said one-way clutch by adjusting the eccentricity of said first supporting points as to said input center axial line, thereby changing the gear ratio at a time of rotational force input to said input shaft being transmitted to said output member of said one-way clutch via said eccentric discs and said linking members as rotational force, wherein the gear ratio of said transmission can be set to infinity by setting said eccentricity to zero, the output shaft of said engine is linked to the input shaft of said infinity variable transmission, and said one-way clutch which is a component of said infinity variable transmission also serves as said one-way clutch provided between said transmission and said rotationally driven member, said method comprising:

using, with said transmission-and-control device, inertia from said engine up to the input member of said one-way clutch as assisting force for driving operations of said variable gear ratio mechanism to change the gear ratio at said transmission to infinity or close to infinity, at a time of said engine stopping controller controlling to stop said engine, before said engine actually stops; and regenerating, with said motor generator controller, electric energy from inertia from said engine up to the input member of said one-way clutch using said motor generator, at the time of said engine stopping controller controlling to stop said engine, before said engine actually stops.

6. The control method for an automobile driving system according to claim 5, wherein, at the time of said engine stopping controller controlling to stop said engine, in the event that there is remaining inertia after using inertia from said engine up to the input member of said one-way clutch as assisting force for driving operations of said variable gear ratio mechanism, electric energy is regenerated from the inertia using said motor generator, before said engine actually stops.

7. The automobile driving system according to claim 5, wherein, at the time of said engine stopping controller controlling to stop said engine, inertia from said engine up to the input member of said one-way clutch is used as assisting force for driving operations of said variable gear ratio mechanism, and in parallel therewith, electric energy is regenerated from the inertia using said motor generator, before said engine actually stops.

* * * * *